United States Patent [19]

Nilsen et al.

[11] Patent Number: 6,081,665
[45] Date of Patent: Jun. 27, 2000

[54] METHOD FOR EFFICIENT SOFT REAL-TIME EXECUTION OF PORTABLE BYTE CODE COMPUTER PROGRAMS

[75] Inventors: Kelvin D. Nilsen; Simanta Mitra, both of Ames; Steven J. Lee, Slater, all of Iowa

[73] Assignee: Newmonics Inc., Ames, Iowa

[21] Appl. No.: 08/994,393

[22] Filed: Dec. 19, 1997

Related U.S. Application Data

[60] Provisional application No. 60/034,072, Dec. 21, 1996.
[51] Int. Cl.[7] .................................................... G06F 9/45
[52] U.S. Cl. ......................... 395/705; 395/704; 395/705; 395/706
[58] Field of Search .................................... 395/701, 703, 395/705, 706, 702, 704, 707; 707/103, 206; 364/134; 709/201

[56] References Cited

U.S. PATENT DOCUMENTS

| 4,463,423 | 7/1984 | Potash et al. ............................ 395/705 |
| 5,367,685 | 11/1994 | Gosling . |

(List continued on next page.)

OTHER PUBLICATIONS

Singhal et al., Building high performance applications and services in Java: An experimental study, ACM, pp. 16–20, 1997.

Buss et al., "Discrete event simulation on the world wide web using Java", Proc of 1996 winter simulation conf., ACM, pp. 780–785, 1996.

Sundaresen et al., "Java paradigms for mobile agent facilities", OOPSLA ACM, pp. 133–135, 1997.

Lee et al, "Optimizing ML with run time code generation", PLDI ACM, pp. 137–148, May 1996.

Casotto "Run time requirment tracing", IEEE, pp. 350–355, 1993.

Evans et al, "Garbage collection and memeory management", ACM 138–143, 1997.

Nair et al, "Java based query driven simulation environment", Proc. of 1996 winter simulation conf., pp. 786–793, 1996.

Don Brutzman, "The virtual rality modeling language and Java", Comm. of the ACM, vol. 41, No. 6, pp. 57–64, Jun. 1998.

*Primary Examiner*—Tariq R. Hafiz
*Assistant Examiner*—Anil Khatri
*Attorney, Agent, or Firm*—Robert E. Malm

[57] ABSTRACT

The invention is a method for use in executing portable virtual machine computer programs under real-time constraints. The invention includes a method for implementing a single abstract virtual machine execution stack with multiple independent stacks in order to improve the efficiency of distinguishing memory pointers from non-pointers. Further, the invention includes a method for rewriting certain of the virtual machine instructions into a new instruction set that more efficiently manipulates the multiple stacks. Additionally, using the multiple-stack technique to identify pointers on the run-time stack, the invention includes a method for performing efficient defragmenting real-time garbage collection using a mostly stationary technique. The invention also includes a method for efficiently mixing a combination of byte-code, native, and JIT-translated methods in the implementation of a particular task, where byte-code methods are represented in the instruction set of the virtual machine, native methods are written in a language like C and represented by native machine code, and JIT-translated methods result from automatic translation of byte-code methods into the native machine code of the host machine. Also included in the invention is a method to implement a real-time task dispatcher that supports arbitrary numbers of real-time task priorities given an underlying real-time operating system that supports at least three task priority levels. Finally, the invention includes a method to analyze and preconfigure virtual memory programs so that they can be stored in ROM memory prior to program.

89 Claims, 46 Drawing Sheets

U.S. PATENT DOCUMENTS

| | | | |
|---|---|---|---|
| 5,418,964 | 5/1995 | Conner et al. | 395/685 |
| 5,740,441 | 4/1998 | Yellin et al. | 395/704 |
| 5,761,477 | 6/1998 | Wahbe et al. | 709/1 |
| 5,784,553 | 7/1998 | Kolawa et al. | 714/38 |
| 5,787,431 | 7/1998 | Shaughnessy | 707/100 |
| 5,848,274 | 12/1998 | Hamby et al. | 395/705 |
| 5,848,423 | 12/1998 | Ebrahim et al. | 707/206 |
| 5,857,197 | 1/1999 | Mullins et al. | 707/103 |
| 5,864,862 | 1/1999 | Kriens et al. | 707/103 |
| 5,907,707 | 5/1999 | Ramalington et al. | 395/701 |
| 5,913,065 | 6/1999 | Faustini | 395/703 |

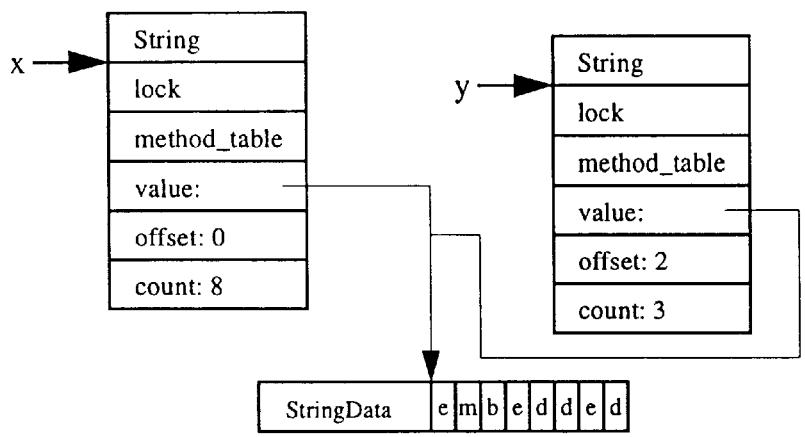

FIGURE 7.

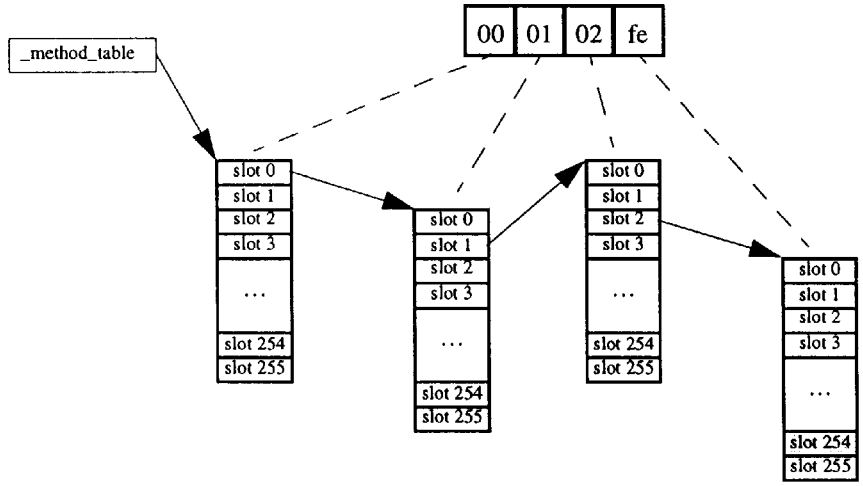

FIGURE 8.

typedef struct _Array Array;
typedef enum _Boolean Boolean;
typedef struct _Class Class;
typedef struct _ClassfileMemoryImage ClassfileMemoryImage;
typedef struct _Exception Exception;
typedef struct _Field Field;
typedef struct _HashLock HashLock;
typedef struct _HashCache HashCache;
typedef struct _Method Method;
typedef struct _MethodTable MethodTable;
typedef struct _Object Object;
typedef struct _Signature Signature;
typedef struct _String String;
typedef struct _Thread Thread;
typedef struct _PointerStack PointerStack;

FIGURE 9.

typedef struct _NonPointerStack NonPointerStack;
typedef struct _PERCEnvironment PERCEnvironment;

FIGURE 9.

| | |
|---|---|
| PointerStack *_psbase; | // Points to current thread's pointer stack |
| NonPointerStack *_npsbase; | // Points to current thread's pointer stack |
| void **_psp; | // Current thread's pointer stack pointer |
| void **_pfp; | // Current thread's pointer stack frame pointer |
| int *_npsp; | // Current thread's non-pointer stack pointer |
| int *_npfp; | // Current thread's non-pointer stack frame pointer |
| void **_gc_ps_low_water; | // The lowest pointer stack height during the // current time slice |
| Thread *_current_thread; | // Points to the currently executing thread |
| Method *****_method_table; | // A sparse hash table representing each // byte-code method |
| Object **_runtime_exceptions; | // An array of pre-allocated exceptions |
| Class *_classes[NUM_CLASSES]; | // An array of pre-allocated fundamental classes |
| static Lock *_lock_freelist; | // A list of pre-allocated lock objects |
| static Class **_class_hash_table; | // A hash table representing all loaded classes |
| static int atomic_count; | // How many times has the current thread executed // enterAtomic() without a matching exitAtomic()? |

FIGURE 10.

| | |
|---|---|
| #define NUM_CLASSES | 11 |
| #define OBJECT | 0 |
| #define STRING | 1 |
| #define EXECUTIVE | 2 |
| #define BOOLEAN_ARRAY | 3 |
| #define CHAR_ARRAY | 4 |
| #define FLOAT_ARRAY | 5 |
| #define DOUBLE_ARRAY | 6 |
| #define BYTE_ARRAY | 7 |
| #define SHORT_ARRAY | 8 |
| #define INT_ARRAY | 9 |
| #define LONG_ARRAY | 10 |

FIGURE 11.

/* Access flags used for Method, Class, and Field Objects */

| | | |
|---|---|---|
| #define ACC_PUBLIC | 0x0001 | /* class, field, method */ |
| #define ACC_PRIVATE | 0x0002 | /* field, method */ |
| #define ACC_PROTECTED | 0x0004 | /* field, method */ |
| #define ACC_STATIC | 0x0008 | /* field, method */ |
| #define ACC_FINAL | 0x0010 | /* class, field, method */ |
| #define ACC_SYNCHRONIZED | 0x0020 | /* method */ |
| #define ACC_SUPER | 0x0020 | /* class */ |
| #define ACC_VOLATILE | 0x0040 | /* field */ |
| #define ACC_TRANSIENT | 0x0080 | /* field */ |
| #define ACC_NATIVE | 0x0100 | /* method */ |

FIGURE 12.

```
#define ACC_INTERFACE      0x0200    /* class */
define ACC_ABSTRACT       0x0400    /* class, method */ define ACC_JIT            0x0800    /* method */
define ACC_ARRAY          0x0002    /* class */
#define ACC_CONSTRUCTOR    0x0040    /* method */

/* The type returned from method is encoded in the flag's high-order bits */
#define RET_VOID           0x0000
#define RET_PTR            0x1000
#define RET_NONPTR_32      0x2000
#define RET_NONPTR_64      0x3000
```

FIGURE 12.

```
#define NOP            0
#define ACONST_NULL    1
#define ICONST_M1      2
#define ICONST_0       3
#define ICONST_1       4
#define ICONST_2       5
#define ICONST_3       6
#define ICONST_4       7
#define ICONST_5       8
#define LCONST_0       9
#define LCONST_1       10
#define FCONST_0       11
#define FCONST_1       12
#define FCONST_2       13
#define DCONST_0       14
#define DCONST_1       15
#define BIPUSH         16
#define SIPUSH         17
#define LDC1           18
#define LDC2           19
#define LDC2W          20
#define ILOAD          21
#define LLOAD          22
#define FLOAD          23
#define DLOAD          24
#define ALOAD          25
#define ILOAD_0        26
#define ILOAD_1        27
#define ILOAD_2        28
#define ILOAD_3        29
#define LLOAD_0        30
#define LLOAD_1        31
#define LLOAD_2        32
#define LLOAD_3        33
#define FLOAD_0        34
#define FLOAD_1        35
#define FLOAD_2        36
```

FIGURE 13.

| | |
|---|---|
| #define FLOAD_3 | 37 |
| #define DLOAD_0 | 38 |
| #define DLOAD_1 | 39 |
| #define DLOAD_2 | 40 |
| #define DLOAD_3 | 41 |
| #define ALOAD_0 | 42 |
| #define ALOAD_1 | 43 |
| #define ALOAD_2 | 44 |
| #define ALOAD_3 | 45 |
| #define IALOAD | 46 |
| #define LALOAD | 47 |
| #define FALOAD | 48 |
| #define DALOAD | 49 |
| #define AALOAD | 50 |
| #define BALOAD | 51 |
| #define CALOAD | 52 |
| #define SALOAD | 53 |
| #define ISTORE | 54 |
| #define LSTORE | 55 |
| #define FSTORE | 56 |
| #define DSTORE | 57 |
| #define ASTORE | 58 |
| #define ISTORE_0 | 59 |
| #define ISTORE_1 | 60 |
| #define ISTORE_2 | 61 |
| #define ISTORE_3 | 62 |
| #define LSTORE_0 | 63 |
| #define LSTORE_1 | 64 |
| #define LSTORE_2 | 65 |
| #define LSTORE_3 | 66 |
| #define FSTORE_0 | 67 |
| #define FSTORE_1 | 68 |
| #define LLOAD_2 | 32 |
| #define LLOAD_3 | 33 |
| #define FLOAD_0 | 34 |
| #define FLOAD_1 | 35 |
| #define FLOAD_2 | 36 |
| #define FLOAD_3 | 37 |
| #define DLOAD_0 | 38 |
| #define DLOAD_1 | 39 |
| #define DLOAD_2 | 40 |
| #define DLOAD_3 | 41 |
| #define ALOAD_0 | 42 |
| #define ALOAD_1 | 43 |
| #define ALOAD_2 | 44 |
| #define ALOAD_3 | 45 |
| #define IALOAD | 46 |
| #define LALOAD | 47 |
| #define FALOAD | 48 |
| #define DALOAD | 49 |
| #define AALOAD | 50 |

FIGURE 13.

| | |
|---|---|
| #define BALOAD | 51 |
| #define CALOAD | 52 |
| #define SALOAD | 53 |
| #define ISTORE | 54 |
| #define LSTORE | 55 |
| #define FSTORE | 56 |
| #define DSTORE | 57 |
| #define ASTORE | 58 |
| #define ISTORE_0 | 59 |
| #define ISTORE_1 | 60 |
| #define ISTORE_2 | 61 |
| #define ISTORE_3 | 62 |
| #define LSTORE_0 | 63 |
| #define LSTORE_1 | 64 |
| #define LSTORE_2 | 65 |
| #define LSTORE_3 | 66 |
| #define FSTORE_0 | 67 |
| #define FSTORE_1 | 68 |
| #define FSTORE_2 | 69 |
| #define FSTORE_3 | 70 |
| #define DSTORE_0 | 71 |
| #define DSTORE_1 | 72 |
| #define DSTORE_2 | 73 |
| #define DSTORE_3 | 74 |
| #define ASTORE_0 | 75 |
| #define ASTORE_1 | 76 |
| #define ASTORE_2 | 77 |
| #define ASTORE_3 | 78 |
| #define IASTORE | 79 |
| #define LASTORE | 80 |
| #define FASTORE | 81 |
| #define DASTORE | 82 |
| #define AASTORE | 83 |
| #define BASTORE | 84 |
| #define CASTORE | 85 |
| #define SASTORE | 86 |
| #define POP | 87 |
| #define POP2 | 88 |
| #define DUP | 89 |
| #define DUP_X1 | 90 |
| #define DUP_X2 | 91 |
| #define DUP2 | 92 |
| #define DUP2_X1 | 93 |
| #define DUP2_X2 | 94 |
| #define SWAP | 95 |
| #define IADD | 96 |
| #define LADD | 97 |
| #define FADD | 98 |
| #define DADD | 99 |
| #define ISUB | 100 |
| #define LSUB | 101 |

FIGURE 13.

| | |
|---|---|
| #define FSUB | 102 |
| #define DSUB | 103 |
| #define IMUL | 104 |
| #define LMUL | 105 |
| #define FMUL | 106 |
| #define DMUL | 107 |
| #define IDIV | 108 |
| #define LDIV | 109 |
| #define FDIV | 110 |
| #define DDIV | 111 |
| #define IREM | 112 |
| #define LREM | 113 |
| #define FREM | 114 |
| #define DREM | 115 |
| #define INEG | 116 |
| #define LNEG | 117 |
| #define FNEG | 118 |
| #define DNEG | 119 |
| #define ISHL | 120 |
| #define LSHL | 121 |
| #define ISHR | 122 |
| #define LSHR | 123 |
| #define IUSHR | 124 |
| #define LUSHR | 125 |
| #define IAND | 126 |
| #define LAND | 127 |
| #define IOR | 128 |
| #define LOR | 129 |
| #define IXOR | 130 |
| #define LXOR | 131 |
| #define IINC | 132 |
| #define I2L | 133 |
| #define I2F | 134 |
| #define I2D | 135 |
| #define L2I | 136 |
| #define L2F | 137 |
| #define L2D | 138 |
| #define F2I | 139 |
| #define F2L | 140 |
| #define F2D | 141 |
| #define D2I | 142 |
| #define D2L | 143 |
| #define D2F | 144 |
| #define INT2BYTE | 145 |
| #define INT2CHAR | 146 |
| #define INT2SHORT | 147 |
| #define LCMP | 148 |
| #define FCMPL | 149 |
| #define FCMPG | 150 |
| #define DCMPL | 151 |
| #define DCMPG | 152 |

FIGURE 13.

| | |
|---|---|
| #define IFEQ | 153 |
| #define IFNE | 154 |
| #define IFLT | 155 |
| #define IFGE | 156 |
| #define IFGT | 157 |
| #define IFLE | 158 |
| #define IF_ICMPEQ | 159 |
| #define IF_ICMPNE | 160 |
| #define IF_ICMPLT | 161 |
| #define IF_ICMPGE | 162 |
| #define IF_ICMPGT | 163 |
| #define IF_ICMPLE | 164 |
| #define IF_ACMPEQ | 165 |
| #define IF_ACMPNE | 166 |
| #define GOTO | 167 |
| #define JSR | 168 |
| #define RET | 169 |
| #define TABLESWITCH | 170 |
| #define LOOKUPSWITCH | 171 |
| #define IRETURN | 172 |
| #define LRETURN | 173 |
| #define FRETURN | 174 |
| #define DRETURN | 175 |
| #define ARETURN | 176 |
| #define RETURN | 177 |
| #define GETSTATIC | 178 |
| #define PUTSTATIC | 179 |
| #define GETFIELD | 180 |
| #define PUTFIELD | 181 |
| #define INVOKEVIRTUAL | 182 |
| #define INVOKESPECIAL | 183 |
| #define INVOKESTATIC | 184 |
| #define INVOKEINTERFACE | 185 |
| /* Code 186 not currently defined */ | |
| #define NEW | 187 |
| #define NEWARRAY | 188 |
| #define ANEWARRAY | 189 |
| #define ARRAYLENGTH | 190 |
| #define ATHROW | 191 |
| #define CHECKCAST | 192 |
| #define INSTANCEOF | 193 |
| #define MONITORENTER | 194 |
| #define MONITOREXIT | 195 |
| #define WIDE | 196 |
| #define MULTIANEWARRAY | 197 |
| #define IFNULL | 198 |
| #define IFNONNULL | 199 |
| #define GOTO_W | 200 |
| #define JSR_W | 201 |
| #define BREAKPOINT | 202 |

FIGURE 13.

| | |
|---|---|
| #define LDC1_NP | 18 |
| #define LDC2_NP | 19 |
| #define POP_0 | 87 |
| #define POP2_00 | 88 |
| #define DUP_0 | 89 |
| #define DUP_X1_00 | 90 |
| #define DUP_X2_000 | 91 |
| #define DUP2_00 | 92 |
| #define DUP2_X1_000 | 93 |
| #define DUP2_X2_0000 | 94 |
| #define SWAP_00 | 95 |
| | |
| #define GETFIELD_Q | 180 |
| #define PUTFIELD_Q | 181 |
| #define INVOKEVIRTUAL_Q | 182 |
| #define INVOKESPECIAL_Q | 183 |
| #define INVOKESTATIC_Q | 184 |
| #define INVOKEINTERFACE_Q | 185 |
| #define NEW_Q | 187 |
| #define CHECKCAST_Q | 192 |
| #define INSTANCEOF_Q | 193 |
| #define ANEWARRAY_Q | 189 |
| #define MULTIANEWARRAY_Q | 197 |
| | |
| #define INTERFACE_QROM | 216 |
| #define SWAP_11 | 217 |
| #define DUP2_X2_1111 | 218 |
| #define DUP2_X2_1101 | 219 |
| #define DUP2_X2_0101 | 220 |
| #define DUP2_X2_0001 | 221 |
| #define DUP2_X1_111 | 222 |
| #define DUP2_X1_101 | 223 |
| #define DUP2_X1_001 | 224 |
| #define DUP_X2_111 | 225 |
| #define DUP_X1_11 | 226 |
| #define DUP2_11 | 227 |
| #define DUP2_10 | 228 |
| #define DUP_1 | 229 |
| #define POP2_11 | 230 |
| #define POP2_10 | 231 |
| #define POP_1 | 232 |
| #define INVOKEVIRTUAL_FQ | 233 |
| #define GETSTATIC_QP | 234 |
| #define GETSTATIC_QNP64 | 235 |
| #define GETSTATIC_QNP32 | 236 |
| #define GETSTATIC_QNP16 | 237 |
| #define GETSTATIC_QNP8 | 238 |
| #define PUTSTATIC_QP | 239 |
| #define PUTSTATIC_QNP64 | 240 |
| #define PUTSTATIC_QNP32 | 241 |
| #define PUTSTATIC_QNP16 | 242 |

FIGURE 14.

| | |
|---|---|
| #define PUTSTATIC_QNP8 | 243 |
| #define GETFIELD_QP | 244 |
| #define GETFIELD_QNP64 | 245 |
| #define GETFIELD_QNP32 | 246 |
| #define GETFIELD_QNP16 | 247 |
| #define GETFIELD_QNP8 | 248 |
| #define PUTFIELD_QP | 249 |
| #define PUTFIELD_QNP64 | 250 |
| #define PUTFIELD_QNP32 | 251 |
| #define PUTFIELD_QNP16 | 252 |
| #define PUTFIELD_QNP8 | 253 |
| #define LDC2_P | 254 |
| #define LDC1_P | 255 |

FIGURE 14.

```
struct _Array {
  HashLock *lock;
  MethodTable *mtable;
  int length;
  char data[1];
};
```

FIGURE 15.

```
struct _Class {
  HashLock *lock;           /* lock must be first member (to match Object) */
  MethodTable *mtable;
  Signature *sig;           /* gc signature */
  String *name;
  Class *next;              /* used for storing within the hash table */
  Class *head_init;         /* the init list for this class */
  Class *next_init;         /* the next class in the init list */
  Class *prev_init;         /* the previous class in the init list */
  Class *super;
  Class **interfaces;
  /* tags can be set to NULL after class initialization (in order to free
   * memory) it is used to distinguish if the entry has been fixed up or
   * not after its use as a "tag" is done
   */
  int *tags;
  unsigned int *constants;
  Field **fields;
  Method **methods;
  union {
    unsigned char *static_data;    // Points to region allocated for static variables
    Signature *static_sig;;        // For ROMed Class, signature of static region
  } u;
  unsigned short constants_count;
```

FIGURE 16.

```
    unsigned short access_flags;
    unsigned short interfaces_count;
    unsigned short fields_count;
    unsigned short methods_count;
    unsigned short table_size;
    unsigned char state;
};
```

FIGURE 16.

```
struct _ClassfileMemoryImage {
    Array *buf;          // Points to array of bytes (substring data)
    int pos;
    int size;
};
```

FIGURE 17.

```
struct _Exception {
    Class *catch_type;
    unsigned short start_pc;
    unsigned short end_pc;
    unsigned short handler_pc;
};
```

FIGURE 18.

```
struct _Field {
    String *name;
    Class *class;
    unsigned int is_ptr: 1;
    unsigned int size: 2;
    unsigned int offset : 29;
    unsigned short constantvalue_index;
    unsigned short access_flags;
};
```

FIGURE 19.

```
struct _HashLock {
    int hash_value;      // zero means object's hash value has not yet been requested
    union {
        Thread *owner;   // the thread that owns the lock */
        HashLock *next;  // next Lock on free list */
    } u;
    Thread *waiting_list;  // list of threads waiting for lock
    /* count is the number of times this lock has been set by the u.owner thread;
     * when count reaches zero, the next thread on the list obtains the lock.
```

FIGURE 20.

```
    */
    int count;
};
```

FIGURE 20.

```
struct _HashCache {
    int hash_values[3];      // zero means no hash value has been assigned
    HashCache *next;         // points to next HashCache object in list of recycled hash values
};
```

FIGURE 21.

```
struct _Method {
    String *name;            /* its name and signature combined */
    StringOfBytes *bytecode;
    Class *class;
    Exception **exception_table;
    void (*jit_interface)();    /* not a garbage-collected pointer */
    void (*native)();           /* not a garbage-collected pointer */
    unsigned short offset;      /* offset into the method table */
    unsigned short exception_table_len;
    /* two bits of access_flags signify the return type */
    unsigned short access_flags;
    unsigned short max_stack;
    unsigned short max_locals;
    unsigned short max_ptr_stack;
    unsigned short max_ptr_locals;
    unsigned short num_p_args;
    unsigned short max_non_ptr_stack;
    unsigned short max_non_ptr_locals;
    unsigned short num_np_args;
};
```

FIGURE 22.

```
struct _MethodTable {
    Class *class;
    Method **methods;
    void (*jit_interfaces[1])();    /* not a garbage-collected pointer */
};
```

FIGURE 23.

```
struct _Object {
    HashLock *lock;
```

FIGURE 24.

```
  MethodTable *mtable;
  char data[1];
};
```

FIGURE 24.

```
struct _NonPointerStack {
  Thread *thread;
  int stack_size;
  int stack[stack_size];
}
```

FIGURE 25.

```
struct _PERCEnvironment {
  union {
    struct {
      jmp_buf registers;
      int psp, pfp, npsp, npfp;    /* saved as integer offsets with respective stacks */
    } c_state;
    struct {
      jit_jmp_buf registers;
      void *c_sp;                  /* not a garbage-collected pointer */
      int psp, npsp;               /* saved as integer offsets within respective stacks */
    } jit_state;
  } u;
  PERCEnvironment *outer_context;  /* not a garbage-collected pointer */
  boolean jit_handler;             /* non-zero means the handler is implemented in jit */
};
```

FIGURE 26.

```
SetJmp(pep, code);             /* set code to result of setjmp() */
if (code) {
  /* do the exception handling stuff here */
  x = GetException();          /* x now points to the thrown exception */
  /* Check to see if the thrown exception is one that I handle before
   * executing any exception handling code...
   */

/* if it necessary to rethrow the exception to an outer context:
   * UnsetJmp();
   * throwException(exception);
   */
  /* Otherwise, inform the system that we have handled the exception */
  ExceptionHandled();
}
```

FIGURE 27.

```
else {
    /* insert the body of the try statement here */

}
UnsetJmp();
```

FIGURE 27.

```
#define SetJmp(env, ret_value) { \
    env.prev = GetHeapNonPtr(_current_thread, ->env, Thread *, PERCEnvironment *);\
    SetHeapNonPtr(_current_thread, ->env, Thread *, PERCEnvironment *, &env);\
    env.u.c_state.psp = GetSPOffset(_psbase, _psp); \
    env.u.c_state.pfp = GetSPOffset(_psbase, _pfp); \
    env.u.c_state.npsp = GetSPOffset(_npsbase, _npsp); \
    env.u.c_state.npfp = GetSPOffset(_npsbase, _npfp); \
    ret_value = setjmp(env.jump_buffer); \
}
```

FIGURE 28.

```
#define UnsetJmp() { \
    PERCEnvironment *threads_env; \
    threads_env = GetHeapNonPtr(_current_thread, ->env, Thread *, PERCEnvironment *); \
    SetHeapNonPtr(_current_thread, ->env, Thread *, \
                  PERCEnvironment *, threads_env->prev);\
}
```

FIGURE 29.

```
#define LongJmp(env) { \
    if (env->jit_handler) { \
        _psp = GetSP(_psbase, env->u.jit_state.psp); \
        _npsp = GetSP(_npsbase, env->u.jit_state.npsp); \
        SetHeapNonPtr(_current_thread, ->c_sp, Thread *, void *, env->u.jit_state.c_sp); \
        perclongjmp(env->u.jit_state.registers, _psp, _npsp, 1); \
    } \
    else { \
        _psp = GetSP(_psbase, env->u.c_state.psp); \
        _pfp = GetSP(_psbase, env->u.c_state.pfp); \
        _npsp = (int *) GetSP(_npsbase, env->u.c_state.npsp); \
        _npfp = (int *) GetSP(_npsbase, env->u.c_state.npfp); \
        longjmp(env->u.c_state.registers, 1); \
    } \
}
```

FIGURE 30.

```
struct _PointerStack {
  Thread *thread;
  int stack_size;
  void *stack[stack_size];
}
```

FIGURE 31.

```
struct _Signature {
  int total_length;
  unsigned int type_code;
  unsigned int bitmap[1];     /* Size of this array is extended as necessary */
};
```

FIGURE 32.

```
/* Signature type tag encodings (4 most significant bits of type_code) */
#define FINALIZABLE_TAG       0x80000000
#define STRING_DATA_TAG       0x10000000
#define STRING_OBJECT_TAG     0x20000000
#define RECORD_TAG            0x30000000
#define WEAK_POINTER_TAG      0x40000000
#define POINTER_STACK_TAG     0x50000000
define HASHLOCK_TAG          0x60000000 define SIG_TAG_MASK          0xf0000000
define SIG_OFFSET_MASK       (~SIG_TAG_MASK)

/* Special flags for the Activity pointer field */
#define FINAL_LINK            0x1
#define FINAL_OBJ             0x2
#define FLAGS_MASK            (0x3)
#define ADDRESS_MASK          (~FLAGS_MASK)

/* Special values for the Scan List pointer field */
#define SCAN_FREE             (~0)
#define SCAN_CLEAR            0
#define SCAN_END              0x1
```

FIGURE 33.

```
#define GetSigTypeTag(sig)      (((Signature *)sig)->type_code & (SIG_TAG_MASK))
#define GetSigTypeOffset(sig)   (((Signature *)sig)->type_code & (~SIG_TAG_MASK))
#define SetSigTypeTag(sig, tag) \
                (((Signature *)sig)->type_code = GetSigTypeOffset(sig) | (tag))
#define SetSigTypeOffset(sig, off) \
                (((Signature *)sig)->type_code = GetSigTypeTag(sig) | (off))
```

FIGURE 34.

```
/* Words of the object described by this signature are numbered starting from 1 to represent
 * the first word. The word number is provided as input into the following three macros, to
 * determine the corresponding word and bit within the bitmap array.
 */
#define CalcBitmapWordOffset(num) ((num-1) / (int)(sizeof(int)*8))
#define CalcBitmapBitOffset(num)  ((num-1) % (int)(sizeof(int)*8))
#define CalcNoBitmapWords(num)    (CalcBitmapWordOffset(num) + 1)
```

FIGURE 34.

```
struct _String {
  HashLock *lock;
  MethodTable *mtable;
  unsigned char *value;
  int offset;
  int count;
};
```

FIGURE 35.

```
struct _Thread {
  HashLock *lock;
  MethodTable *mtable;
  Object *target;             /* the Runnable object */
  String *name;
  Object *current_exception;  /* the exception being handled (or NULL) */
  Object *activity;           /* activity to which thread belongs (or NULL) */
  Thread *next;
  NonPointerStack *npsbase;
  PointerStack *psbase;
  void *c_sp;                 /* saved value of c stack pointer */
  PERCEnvironment *env;       /* points to exception handler context */
  int npsp;                   /* non-pointer stack pointer offset */
  int npfp;                   /* non-pointer frame pointer offset */
  int psp;                    /* pointer stack pointer offset */
  int pfp;                    /* pointer frame pointer offset */
  void *handle;
  unsigned int state;         /* See Figure 37 */
  char handling_exception;    /* non-zero if we're handling an exception */
};
```

FIGURE 36.

```
#define RUNNING        0
#define RELINQUISHING  1
#define MAY_BLOCK      2
```

FIGURE 37.

```
#define OK_TO_PREEMPT      3
#define SUSPENDING         4
#define SLEEPING           5
#define JIT_EXECUTING      6         /* preemptible */
```
FIGURE 37.

```
struct HeapSegmentHdr {
   void *scan_ptr;
   void *indirection_ptr;
   void *activity_ptr;
   void *signature_ptr;
};
union HeapHdr {
   struct HeapSegmentHdr heap_hdr;
   union Align a;
};

#define ObjToHdr(obj)         ((char *)(((union HeapHdr *) (obj)) - 1))
#define HdrToObj(hdr)         ((char *)(((union HeapHdr *) (hdr)) + 1))
#define GetIndirectPtr(hdr)   (((struct HeapSegmentHdr *) (hdr))->indirection_ptr)
#define SetIndirectPtr(hdr, val) \
            (((struct HeapSegmentHdr *) (hdr))->indirection_ptr = (void *) (val))
#define GetSignaturePtr(hdr)  (((struct HeapSegmentHdr *) (hdr))->signature_ptr)
#define SetSignaturePtr(hdr,val) \
            (((struct HeapSegmentHdr *) (hdr))->signature_ptr = (void *) (val))
```
FIGURE 38.

```
#define GetActualAddr(p)      ((p == NULL) ? NULL : GetIndirectPtr(ObjToHdr(p)))
#define SameObjects(p1,p2)    (GetActualAddr(p1) == GetActualAddr(p2))
```
FIGURE 39.

```
#define GetSP(base, offset)    (((void **)(GetActualAddr(base))) + offset)
#define GetSPOffset(base, sp)  ((void **)(sp) - (void **)(GetActualAddr(base)))
#define GetPC(base, pc_offset)\
            ((char *)(GetActualAddr(GetHeapPtr(base, ->value, String *, char *))) +\
            pc_offset + GetHeapNonPtr(base, ->offset, String *, int))
#define GetPCOffset(base, pc) \
            ((unsigned char *)(pc) - GetHeapNonPtr(base, ->offset, String *, int) - \
            (unsigned char *) \
            GetActualAddr(GetHeapPtr(base, ->value, String *, unsigned char *)))
#define GetCP(cp)             (unsigned int *)(GetActualAddr(cp))
```
FIGURE 40.

```
#define GetHeapPtr(base, field_expr, base_type, field_type) \
        ((field_type)(((base_type)(GetIndirectPtr(ObjToHdr(base))))field_expr))
#define GetHeapNonPtr(base, field_expr, base_type, field_type) \
        ((field_type)(((base_type)(GetIndirectPtr(ObjToHdr(base))))field_expr))
#define SetHeapPtr(base, field_expr, base_type, field_type, val) \
        (((base_type)(GetIndirectPtr(ObjToHdr(base))))field_expr = \
        (field_type) ((val) ? tendPtr(val) : 0 ))
#define SetHeapNonPtr(base, field_expr, base_type, field_type, val) \
        (((base_type)(GetIndirectPtr(ObjToHdr(base))))field_expr = (field_type) (val))

#define GetHeapInArrayPtr(base, field_expr, base_type, field_type) \
        (*(field_type *) (&(((base_type)(GetIndirectPtr(ObjToHdr(base))))field_expr)))
#define GetHeapInArrayNonPtr(base, field_expr, base_type, field_type) \
        (*(field_type *) (&(((base_type)(GetIndirectPtr(ObjToHdr(base))))field_expr)))
#define SetHeapInArrayPtr(base, field_expr, base_type, field_type, val) \
        ((*(field_type *) \
        (&(((base_type)(GetIndirectPtr(ObjToHdr(base))))field_expr))) = \
        (field_type) ((val) ? tendPtr(val): 0))
#define SetHeapInArrayNonPtr(base, field_expr, base_type, field_type, val) \
        ((*(field_type *) \
        (&(((base_type)(GetIndirectPtr(ObjToHdr(base))))field_expr))) = \
        (field_type) (val))
```

FIGURE 41.

| | |
|---|---|
| #define SetPreemptionFlag() | (_preemption_flag = true) |
| #define ClearPreemptionFlag() | (_preemption_flag = false) |
| #define GetEventCause(t) | (GetHeapNonPtr(t, ->state, Thread *, unsigned int)) |

FIGURE 42.

```
#define CheckPreemption()    (_preemption_flag && (atomic_count == 0))
#define PreemptTask() { \
  PreemptionEnter(OK_TO_PREEMPT); \
  SetEvent(_event);        /* WIN32 system call */ \
  PreemptionReturn(); \
}
#define PrepareBlockCall() { \
  PreemptionEnter(MAY_BLOCK); \
}
#define ResumeAfterBlockCall() { \
  PreemptionReturn(); \
}
```

FIGURE 43.

```
#define PreemptionEnter(cause) { \
    SetEventCause(_current_thread, cause); \
}
#define PreemptionReturn() { \
    SetEventCause(_current_thread, RUNNING); \
    ExceptionCheck(); \
}
#define SetEventCause(t, cause) { \
    SetHeapNonPtr(t, ->state, Thread *, unsigned int, cause); \
}
#define ExceptionCheck() { \
    Object *e = GetHeapPtr(_current_thread, ->current_exception, Thread *, Object *); \
    if (e != NULL) { \
        Boolean handling_exception = \
            GetHeapNonPtr(_current_thread, ->handling_exception, Thread *, char); \
        if (!handling_exception) {\
            throwException(e); \
        }\
    }\
}
extern void scanPointerStackAtPreemptTask();
#define TendPointerStack() scanPointerStackAtPreemptTask()
#define SaveThreadState() { \
    SetHeapNonPtr(_current_thread, ->psp, Thread *, int, GetSPOffset(_psbase, _psp)); \
    SetHeapNonPtr(_current_thread, ->pfp, Thread *, int, GetSPOffset(_psbase, _pfp)); \
    SetHeapNonPtr(_current_thread, ->npsp, Thread *, int, GetSPOffset(_npsbase, _npsp)); \
    SetHeapNonPtr(_current_thread, ->npfp, Thread *, int, GetSPOffset(_npsbase, _npfp)); \
    SetHeapPtr(_current_thread, ->psbase, Thread *, PointerStack *, _psbase); \
    SetHeapPtr(_current_thread, ->npsbase, Thread *, NonPointerStack *, _npsbase); \
    TendPointerStack(); \
}
#define RestoreThreadState() { \
    _psbase = GetHeapNonPtr(_current_thread, ->psbase, Thread *, PointerStack *); \
    _npsbase = GetHeapNonPtr(_current_thread, ->npsbase, Thread *, NonPointerStack *); \
    _psp = GetSP(_psbase, GetHeapNonPtr(_current_thread, ->psp, Thread *, int)); \
    _pfp = GetSP(_psbase, GetHeapNonPtr(_current_thread, ->pfp, Thread *, int)); \
    _npsp = (int *)(GetSP(_npsbase, GetHeapNonPtr(_current_thread, ->npsp, Thread *, int))); \
    _npfp = (int *)(GetSP(_npsbase, GetHeapNonPtr(_current_thread, ->npfp, Thread *, int))); \
    _gc_ps_low_water = _pfp;\
}
```

FIGURE 44.

```
#define FastInvokeStatic(method) fastInvoke(method)
#define FastInvokeSpecial(method) fastInvoke(method)
```

FIGURE 45.

```
#define FastInvokeVirtual(num_ptr_args, offset) { \
    Method *method, **methods; \
    Object *obj; \
    MethodTable *mtable; \
    obj = PeekPtr(num_ptr_args - 1); \
    CheckNull(obj); \
    mtable = GetHeapPtr(obj, ->mtable, Object *, MethodTable *); \
    methods = GetHeapPtr(mtable, ->methods, MethodTable *, Method **);\
    method = GetHeapPtr(methods, [offset], Method **, Method *); \
    fastInvoke(method); \
}
#define FastInvokeInterface(num_ptr_args, offset_guess, base_method) { \
    Method *method, **methods; \
    Object *obj; \
    MethodTable *mtable; \
    String *base_name, *name; \
    obj = PeekPtr(num_ptr_args - 1); \
    CheckNull(obj); \
    mtable = GetHeapPtr(obj, ->mtable, Object *, MethodTable *); \
    methods = GetHeapPtr(mtable, ->methods, MethodTable *, Method **);\
    method = GetHeapPtr(methods, [offset_guess], Method **, Method *); \
    base_name = GetHeapPtr(base_method, ->name, Method *, String *);\
    name = GetHeapPtr(method, ->name, Method *, String *);\
    if (fastCompareTo(base_name, name) != 0) \
        method = interfaceMethodSearch(methods, base_method); \
    fastInvoke(method); \
}
```

FIGURE 45.

```
void fastInvoke(Method *method) {
    int num_p_args, num_p_locals, num_np_args, num_np_locals, access_flags;
    int num_p = 0, num_np = 0, max_p_stack, max_np_stack;
    void (*native)(), (*jit)();
    Boolean native_flag, synchronized_flag;
    Object *so;
    /* NOTE: the following are specially used by the frame creation/deletion macros */
    int saved_pfp_offset, saved_npfp_offset;
    access_flags = GetHeapNonPtr(method, ->access_flags, Method *, unsigned short);
    /* figure out if we're calling bytecode, native, or jit */
    if (access_flags & ACC_JIT) {
        jit = GetHeapNonPtr(method, ->jit_interface, Method *, void (*)());
        /* doJit switches from the C stack to the PERC stacks and branches to jit */
        doJit(jit);
    }
    else {
        native_flag = access_flags & ACC_NATIVE;
        num_p_args = GetHeapNonPtr(method, ->num_p_args, Method *, unsigned short);
        num_np_args = GetHeapNonPtr(method, ->num_np_args, Method *, unsigned short);
        if (native_flag) {
            PrepareNativeFrames(num_p_args, num_np_args);
        }
```

FIGURE 46.

```
    else {
      num_p_locals = GetHeapNonPtr(method, ->max_ptr_locals, Method *, unsigned short);
      num_np_locals =
          GetHeapNonPtr(method, ->max_non_ptr_locals, Method *, unsigned short);
      max_p_stack = GetHeapNonPtr(method, ->max_ptr_stack, Method *, unsigned short);
      max_np_stack =
          GetHeapNonPtr(method, ->max_non_ptr_stack, Method *, unsigned short);
      PrepareJavaFrames(num_p_args, num_p_locals,
                        max_p_stack, num_np_args, num_np_locals, max_np_stack);
    }
    synchronized_flag = access_flags & ACC_SYNCHRONIZED;
    if (synchronized_flag) {
      if (access_flags & ACC_STATIC) {
        /* if static, then the class' lock needs to be obtained */
        so = (Object *)GetHeapPtr(method, ->class, Method *, Class *);
      }
      else {
        /* if non-static, then the object's lock needs to be obtained */
        so = (Object *)GetLocalPtr(0);        /* this */
      }
      PushPtr(so);          /* save the synchronized object so we can unsynch it */
      ShrinkPS(-1);         /* make sure there is a space for a returned pointer */
      PushPtr(method);      /* save */
      enterMonitor(so);
      method = PopPtr();    /* restore */
    }
    if (native_flag) {
      native = GetHeapNonPtr(method, ->native, Method *, void (*)())
      native();
    }
    else {
      pvm(method);
    }
    /* if synchronized, release lock */
    if (synchronized_flag) {
      so = GetLocalPtr(num_p_locals + num_p_args);
      exitMonitor(so);
    }
    if (access_flags & RET_PTR) {
      num_p = 1;
    }
    else if (access_flags & RET_NONPTR_32) {
      num_np = 1;
    }
    else if (access_flags & RET_NONPTR_64) {
      num_np = 2;
    }
    ReclaimFrames(num_p, num_np);
  }
} /* end fastInvoke() */
```

FIGURE 46.

```
/* PREEMPTIBLE */
void invokeStatic(String *class_name, String *method_name) {
  Method *method;
  method = getMethodPtr(class_name, method_name);
  FastInvokeStatic(method);
}
```

FIGURE 47.

```
/* PREEMPTIBLE */
void invokeSpecial(String *class_name, String *method_name) {
  Method *method;
  method = getMethodPtr(class_name, method_name);
  FastInvokeSpecial(method);
}
```

FIGURE 48.

```
/* PREEMPTIBLE */
void invokeVirtual(String *class_name, String *method_name) {
  Method *method;
  int num_p_args, offset;
  method = getMethodPtr(class_name, method_name);
  /* get num_p_args and offset */
  num_p_args = GetHeapNonPtr(method, ->num_p_args, Method *, unsigned short);
  offset = GetHeapNonPtr(method, ->offset, Method *, unsigned short);
  FastInvokeVirtual(num_p_args, offset);
}
```

FIGURE 49.

```
/* PREEMPTIBLE */
void invokeInterface(String *class_name, String *method_name) {
  Method *method;
  int num_p_args, offset;
  method = getMethodPtr(class_name, method_name);
  /* get num_p_args and offset */
  num_p_args = GetHeapNonPtr(method, ->num_p_args, Method *, unsigned short);
  offset = GetHeapNonPtr(method, ->offset, Method *, unsigned short);
  FastInvokeInterface(num_p_args, offset, method);
}
```

FIGURE 50.

```
/* PREEMPTIBLE */
/* search methods table for a match with base_method and return that method */
Method *interfaceMethodSearch(Method **methods, Method *base_method) {
  Method *method;
```

FIGURE 51.

```
    String *base_name, *name;
    int i;
    BuildFrames(0, 0, 1, 0, 0, 0);
    base_name = GetHeapPtr(base_method, ->name, Method *, String *);
    /* loop until method is found; it is guaranteed to be in here by the bytecode verifier */
    for (i = 0; ; ++i) {
        method = GetHeapPtr(methods, [i], Method **, Method *);
        name = GetHeapPtr(method, ->name, Method *, String *);
        if (fastCompareTo(base_name, name) == 0) {
            DestroyFrames(0, 0);
            return method;
        }
        if (CheckPreemption()) {
            PushPtr(base_name);      /* save */
            PreemptTask();
            base_name = PopPtr();    /* restore */
        }
    }
}
```

FIGURE 51.

```
/* NON-PREEMPTIBLE */
static Method *lookupMethod(int method_id) {
    int table1_index, table2_index, table3_index, table4_index;
    Method ****table2, ***table3, **table4, *method;
    /* parse out each tables index */
    table1_index = (method_id >> 24) & 0xff;
    table2_index = (method_id >> 16) & 0xff;
    table3_index = (method_id >> 8) & 0xff;
    table4_index = (method_id) & 0xff;
    table2 =
        GetHeapPtr(_stub_method_lookup_table, [table1_index], Method *****, Method ****);
    table3 = GetHeapPtr(table2, [table2_index], Method ****, Method ***);
    table4 = GetHeapPtr(table3, [table3_index], Method ***, Method **);
    method = GetHeapPtr(table4, [table4_index], Method **, Method *);
    return method;
} /* end lookupMethod() */
```

FIGURE 52.

```
class TaskDispatcher extends Thread {
   public TaskDispatcher(String name) {
      super(name);
      initDispatcher();
      // place the original thread on ready queue
      Thread current_thread = currentThread();
      nrt_ready_q.enqueue(current_thread);
      current_thread.setName("main");
   }
   private native void initDispatcher();
   private native boolean startDispatcher();
   private native void runThread(Thread thread, long time_slice);
   static native void relinquish();
   private static native void exitPVM();

public void run() {
      int daemon_thread_count = 0;
      boolean gc_on = startDispatcher();
      if (gc_on) {
         nrt_ready_q.enqueue(new Thread(new GarbageCollector(), "gc"));
         daemon_thread_count = 1;
      }
      for (;;) {
         if (nrt_ready_q.numElements() == daemon_thread_count)
            // NOTHING BUT DAEMON THREADS TO DISPATCH, SO EXIT PVM
            exitPVM();

// GET THE NEXT THREAD TO RUN
         Thread thread = nrt_ready_q.getNextThread();
         runThread(thread, 25L);          // 25 ms time slice
      }
   }
}
```

FIGURE 53.

```
/* NATIVE METHOD */
void initDispatcher() {
  enum {pTHIS};
#ifdef _WIN32
  HANDLE handle;
  int thread_id;
#endif
    /*** REGISTER ROOT POINTERS ***/
    RegisterRoot(&_gc_thread);
    RegisterRoot(&_dispatcher_thread);
    /*** SET THE DISPATCHER THREAD GLOBALLY ***/
    _dispatcher_thread = GetLocalPtr(pTHIS);
    /*** CREATE THE EVENT FOR WAKING UP THE DISPATHCER ***/
#ifdef _WIN32
    _event = CreateEvent(NULL, FALSE, FALSE, NULL);
    if (_event == NULL) {
      fatal("error creating event\n");
    }
#endif
    /*** CREATE THE WATCHDOG ***/
#ifdef _WIN32
    _watchdog_handle = CreateThread(NULL, 0,
       (LPTHREAD_START_ROUTINE) watchdog, 0, CREATE_SUSPENDED, &thread_id);
#endif
    /*** SET THE WATCHDOG THREAD'S PRIORITY ***/
#ifdef _WIN32
    SetThreadPriority(_watchdog_handle, THREAD_PRIORITY_LOWEST);
#endif
    /*** RAISE THE DISPATCHER THREAD'S PRIORITY ***/
#ifdef _WIN32
    handle = GetHeapNonPtr(_dispatcher_thread, ->handle, Thread *, HANDLE);
    SetThreadPriority(handle, THREAD_PRIORITY_TIME_CRITICAL);
#endif
}

/* NATIVE METHOD */
void startDispatcher() {
    /*** RESUME THE WATCHDOG THREAD ***/
#ifdef _WIN32
    ResumeThread(_watchdog_handle);
#endif
    ReturnInt(_gc_on_flag);
}
```

FIGURE 54.

```
void runThread() {
#ifdef _WIN32
  enum {pTHIS, pTHREAD};
  enum {nTIME_SLICE, nTIME_SLICEb};
  Thread *thread;
  HANDLE handle;
  DWORD rv;
  longlong time_slice;
  /*** GET PARAMETERS FROM RESPECTIVE STACKS ***/
  thread = GetLocalPtr(pTHREAD);
  time_slice = GetLocalLong(nTIME_SLICE);
  /*** GET THE HANDLE OF THE NEW THREAD ***/
  handle = GetHeapNonPtr(thread, ->handle, Thread *, HANDLE);
  /*** SAVE THE DISPATCHER'S STATE ***/
  SaveThreadState();
  /*** SET THE CURRENT THREAD TO THE NEXT THREAD TO RUN ***/
  _current_thread = thread;
  /*** RESTORE THE THREAD'S STATE BEFORE LETTING IT RUN ***/
  RestoreThreadState();
  /*** RESUME THE WATCHDOG ***/
  ResumeThread(_watchdog_handle);
  /*** RESUME THE THREAD TO RUN NEXT ***/
  ResumeThread(handle);
  /*** PUT DISPATCHER TO SLEEP TO LET JAVA THREAD RUN ***/
  rv = WaitForSingleObject(_event, (DWORD)time_slice);
  if ((rv == WAIT_TIMEOUT) &&
      ((GetEventCause(_current_thread) != JIT_EXECUTING) || (_atomic_count != 0))) {
    /*** WAIT FOR TASK TO REACH A PREEMPTION POINT ***/
    /*** ok to preempt JIT_EXECUTING if _atomic_count equals 0 ***/
    _preemption_flag = true;
    WaitForSingleObject(_event, INFINITE);
    _preemption_flag = false;
  }
  /*** SUSPEND THE THREAD THAT JUST RAN ***/
  SuspendThread(handle);
  /*** SUSPEND THE WATCHDOG ***/
  SuspendThread(_watchdog_handle);
  /*** SAVE THE THREAD'S STATE AFTER LETTING IT RUN ***/
  SaveThreadState();
  /*** SET THE CURRENT THREAD TO THE DISPATCHER ***/
  _current_thread = _dispatcher_thread;
  /*** RESTORE THE DISPATCHER'S STATE ***/
  RestoreThreadState();
#endif
}
```

FIGURE 54.

```
/* NATIVE METHOD */
void relinquish() {
  PreemptionEnter(RELINQUISHING);
#ifdef _WIN32
  SetEvent(_event);
#endif
} static void watchdog() {
  for (;;) {
    if (GetEventCause(_current_thread) == MAY_BLOCK) {
      /*** THE JAVA THREAD HAS EITHER BLOCKED OR EXITED ***/
      SetEvent(_event);
    }
    else {
      /* THE WATCHDOG THREAD'S PRIORITY HAS AGED, ALLOWING IT TO
       * PREEMPT THE APPLICATION PROGRAM. YIELD TO ALLOW THE
       * JAVA THREAD TO CONTINUE RUNNING.
       */
      Sleep(0);
    }
  }
}
```

FIGURE 54.

```
#define P_SAFETY_PADDING        30      /* in words */
#define NP_SAFETY_PADDING       15      /* in words */
#define StackOverlowCheck(max_p_stack_growth, max_np_stack_growth) { \
  if ((_psp + max_p_stack_growth) < ((void **)_psbase + P_SAFETY_PADDING)) { \
    stackOverflow(true); \
  } \
  else if (((void **)_npsp + max_np_stack_growth) < \
    ((void **)_npsbase + NP_SAFETY_PADDING)) { \
    stackOverflow(false); \
  } \
}

/* zero out the local variables on the pointer stack */
#define AdjustPSPAndZeroOutLocals(num_p_locals) { \
  int i; \
  for (i = 0; i < num_p_locals; ++i) { \
    --_psp; \
    *_psp = 0; \
  } \
} define AdjustLowWaterMark() { \
  if (_gc_ps_low_water < _pfp) { \
    _gc_ps_low_water = _pfp; \
```

```
#define BuildFrames(num_ptr_args, num_ptr_locals, ptr_stack_growth, \
                    num_nonptr_args, num_nonptr_locals, nonptr_stack_growth) \
    int saved_pfp_offset, saved_npfp_offset; \
    saved_pfp_offset = GetSPOffset(_psbase, _pfp); \
    _pfp = _psp + num_ptr_args; \
    AdjustPSPAndZeroOutLocals(num_ptr_locals); \
    saved_npfp_offset = GetSPOffset(_npsbase, _npfp); \
    _npfp = _npsp + num_nonptr_args; \
    _npsp -= num_nonptr_locals; \
    StackOverlowCheck(ptr_stack_growth, nonptr_stack_growth);
```
FIGURE 56.

```
#define DestroyFrames(num_ptrs, num_non_ptrs) \
    _psp = _pfp - num_ptrs; \
    _pfp = (void **)(GetSP(_psbase, saved_pfp_offset)); \
    AdjustLowWaterMark(); \
    _npsp = _npfp - num_non_ptrs; \
    _npfp = (int *)(GetSP(_npsbase, saved_npfp_offset));
```
FIGURE 57.

```
#define PrepareJavaFrames(num_ptr_args, num_ptr_locals, ptr_stack_growth, \
                          num_nonptr_args, num_nonptr_locals, nonptr_stack_growth) { \
    saved_pfp_offset = GetSPOffset(_psbase, _pfp); \
    _pfp = _psp + num_ptr_args; \
    AdjustPSPAndZeroOutLocals(num_ptr_locals); \
    saved_npfp_offset = GetSPOffset(_npsbase, _npfp); \
    _npfp = _npsp + num_nonptr_args; \
    _npsp -= num_nonptr_locals; \
    StackOverlowCheck(ptr_stack_growth, nonptr_stack_growth); \
}
```
FIGURE 58.

```
/* PrepareNativeFrames prepares the pointer and non-pointer stack for a Java method */
#define PrepareNativeFrames(num_ptr_args, num_nonptr_args) { \
    saved_pfp_offset = GetSPOffset(_psbase, _pfp); \
    _pfp = _psp + num_ptr_args;\
    saved_npfp_offset = GetSPOffset(_npsbase, _npfp); \
    _npfp = _npsp + num_nonptr_args; \
}
```
FIGURE 59.

```
#define ReclaimFrames(num_ptrs, num_non_ptrs) \
        DestroyFrames(num_ptrs, num_non_ptrs)
```
FIGURE 60.

```
#define AllocPVMLocalPointers(num_ptrs, off) { \
  off = _pfp - _psp; \
  _psp -= num_ptrs; \
}
```

FIGURE 61.

```
#define AllocLocalPointers(num_ptrs, off, ptr_stack_growth, nonptr_stack_growth) { \
  off = _pfp - _psp; \
  AdjustPSPAndZeroOutLocals(num_ptrs); \
  StackOverlowCheck(ptr_stack_growth, nonptr_stack_growth); \
}
```

FIGURE 62.

| | |
|---|---|
| #define ReturnPtr(p) | SetLocalPtr(0, p); return; |
| #define ReturnInt(x) | SetLocalInt(0, x); return; |
| #define ReturnFloat(x) | SetLocalFloat(0, x); return; |
| #define ReturnLong(x) | SetLocalLong(0, x); return; |
| #define ReturnDouble(x) | SetLocalDouble(0, x); return; |

FIGURE 63.

| | |
|---|---|
| #define PushPtr(ptr) | (--_psp, *_psp = (void *)(ptr)) |
| #define PopPtr() | (++_psp, *(_psp - 1)) |
| #define PeekPtr(off) | (*(_psp + (off))) |
| #define PokePtr(off, ptr) | (*(_psp + (off)) = (void *)(ptr)) |
| #define GetLocalPtr(off) | (*(_pfp - (off) - 1)) |
| #define SetLocalPtr(off, ptr) | (*(_pfp - (off) - 1) = (void *)(ptr)) |
| #define ShrinkPS(off) | (_psp += (off)) |

FIGURE 64.

| | |
|---|---|
| #define PushInt(val) | (--_npsp, *_npsp = (int)(val)) |
| #define PushFloat(val) | (--_npsp, *(float *)_npsp = (float)(val)) |
| #define PushLong(val) | (_npsp -= 2, *(longlong *)(_npsp) = (longlong)(val)) |
| #define PushDouble(val) | (_npsp -= 2, *(double *)(_npsp) = (double)(val)) |
| #define PopInt() | (++_npsp, *(_npsp - 1)) |
| #define PopFloat() | (++_npsp, *(float *)(_npsp - 1)) |
| #define PopLong() | (_npsp += 2, *(longlong *)(_npsp - 2)) |
| #define PopDouble() | (_npsp += 2, *(double *)(_npsp - 2)) |
| #define PeekInt(off) | (*(int *)(_npsp + (off))) |
| #define PeekFloat(off) | (*(float *)(_npsp + (off))) |
| #define PeekLong(off) | (*(longlong *)(_npsp + (off))) |
| #define PeekDouble(off) | (*(double *)(_npsp + (off))) |
| #define PokeInt(off, val) | (*(int *)(_npsp + (off)) = (int)(val)) |
| #define PokeFloat(off, val) | (*(float *)(_npsp + (off)) = (float)(val)) |
| #define PokeLong(off, val) | (*(longlong *)(_npsp + (off)) = (longlong)(val)) |
| #define PokeDouble(off, val) | (*(double *)(_npsp + (off)) = (double)(val)) |
| #define GetLocalInt(off) | (*(int *)(_npfp - (off) - 1)) |
| #define GetLocalFloat(off) | (*(float *)(_npfp - (off) - 1)) |
| #define GetLocalLong(off) | (*(longlong *)(_npfp - (off) - 2)) |
| #define GetLocalDouble(off) | (*(double *)(_npfp - (off) - 2)) |
| #define SetLocalInt(off, val) | (*(int *)(_npfp - (off) - 1) = (int)(val)) |

FIGURE 65.

```
#define SetLocalFloat(off, val)   (*(float *)(_npfp - (off) - 1) = (float)(val))
#define SetLocalLong(off, val)    (*(longlong *)(_npfp - (off) - 2) = (longlong)(val))
#define SetLocalDouble(off, val)  (*(double *)(_npfp - (off) - 2) = (double)(val))
#define ShrinkNPS(off)            (_npsp += (off))
```

FIGURE 65.

```
/* this is inserted at every branch instruction IT MUST APPEAR AT THE END OF
 * THE INSTRUCTION'S IMPLEMENTATION!!! (due to the fact that 'pc' is not
 * restored since it will be restored at the top of the for loop)
 */
#define PVMPreemptionPoint() \
    if (CheckPreemption()) { \
        next_pc_offset = GetPCOffset(bytecode, next_pc); \
        PreemptTask(); \
        cp = GetCP(GetLocalPtr(constants_offset)); \
        bytecode = GetLocalPtr(bytecode_offset); \
        next_pc = GetPC(bytecode, next_pc_offset); \
    }
```

FIGURE 66.

```
#define PVMSave() \
    next_pc_offset = GetPCOffset(bytecode, next_pc);

#define PVMRestore() \
    cp = GetCP(GetLocalPtr(constants_offset)); \
    bytecode = GetLocalPtr(bytecode_offset); \
    next_pc = GetPC(bytecode, next_pc_offset);

#define PVMInvokeSave() \
    PVMSave(); \
    current_method = false;
#define PVMInvokeRestore() \
    PVMRestore(); \
    current_method = true;
```

FIGURE 67.

```
void pvm(Method *method) {
    /* temporary value holders */
    int index, pad, low, high, offset, size, key, i, nargs;
    int data_size, first_local_offset;
    void *ptr_value, *ptr_value2;
    Boolean is_ptr;
    Class *class, *ref_class;
    Field *field;
    Object *ref, *ref_value, *ref_value2;
    int int_value, int_value2;
    longlong long_value, long_value2;
    float float_value, float_value2;
    double double_value, double_value2;
    MethodTable *mtable;
```

FIGURE 68.

```
StringOfBytes *bytecode;

PERCEnvironment env;
int handler_pc;
int wide_opcode;
Object *exception;
Method *m;
int ret_value;
int access_flags;
int method_offset, bytecode_offset, constants_offset;
Boolean current_method;          /* Executing in this pvm()? */ int pc_offset, next_pc_offset;
register unsigned char *pc, *next_pc;
/* does the method require an exception handler point? */
int env_flag;
/* the constant pool */
unsigned int *cp;
enum { pMETHOD, pBYTECODE, pCONSTANTS };
AllocPVMLocalPointers(3, first_local_offset);
method_offset = first_local_offset + pMETHOD;
bytecode_offset = first_local_offset + pBYTECODE;
constants_offset = first_local_offset + pCONSTANTS;
current_method = true;
bytecode = GetHeapPtr(method, ->bytecode, Method *, StringOfBytes *);
/* start at the beginning of the method NOTE: this needs to be before
 * the exception handling code since the exception handling code can
 * set next_pc to a handler_pc
 */
next_pc = GetPC(bytecode, 0);
class = GetHeapPtr(method, ->class, Method *, Class *);
cp = GetCP(GetHeapPtr(class, ->constants, Class *, unsigned int *));
SetLocalPtr(method_offset, method); /* save */
SetLocalPtr(bytecode_offset, bytecode); /* save */
SetLocalPtr(constants_offset, cp); /* save */

/* check for an exception handler or synchronized method */
access_flags = GetHeapNonPtr(method, ->access_flags, Method *, int);
env_flag = (GetHeapNonPtr(method, ->exception_table_len, Method *, int) > 0) ||
           (access_flags & ACC_SYNCHRONIZED);
if (env_flag) {
  SetJmp(env, ret_value);
  if (ret_value != 0) {
    /* restore method, cp, and bytecode pointer */
    method = GetLocalPtr(method_offset);
    cp = GetLocalPtr(constants_offset);
    bytecode = GetLocalPtr(bytecode_offset);
    /* an exception occurred, attempt to find handler */
    exception = GetException();
    mtable = GetHeapPtr(exception, ->mtable, Object *, MethodTable *);
```

FIGURE 68.

```
            class = GetHeapPtr(mtable, ->class, MethodTable *, Class *);
            if (current_method == true)
                next_pc_offset = GetPCOffset(bytecode, next_pc);
            handler_pc = findExceptionHandler(class, method, next_pc_offset);
            if (handler_pc != -1) {
                ExceptionHandled(exception);
                next_pc = GetPC(bytecode, handler_pc);
                PushPtr(exception);
            }
            else { /* no handler was found in this method, so rethrow */
                Object *so;
                /* if synchronized, release lock */
                if (access_flags & ACC_SYNCHRONIZED) {
                    if (access_flags & ACC_STATIC) {
                        /* if static, then the class' lock needs to be obtained */
                        so = (Object *)GetHeapPtr(method, ->class, Method *, Class *);
                    }
                    else {
                        /* if non-static, then the object's lock needs to be obtained */
                        so = (Object *)GetLocalPtr(0); /* this */
                    }
                    PushPtr(exception);          /* save */
                    exitMonitor(so);
                    exception = PopPtr();        /* restore */
                }
                /* restore the previous environment */
                UnsetJmp();
                /* rethrow the exception */
                throwException(exception);
            }
        }
    }

/* interpret byte codes */
    for (;;) {
        pc = next_pc;
        next_pc = pc + _bytecode_len[*pc];
        switch(*pc) {
            /* cases to handle each byte code go here */
        }
    }

EXIT_PVM:
    /* restore the previous environment if needed */
    if (env_flag) {
        UnsetJmp();
    }
} /* end pvm() */
```

FIGURE 68.

```
case IADD:
    /* Add two integers on top of stack, leaving result on stack */
    PokeInt(1, PeekInt(0) + PeekInt(1));
    ShrinkNPS(1);
    break;
```

FIGURE 69.

```
case AASTORE:
    /* Store object into reference array */
    ref_value = PopPtr();
    index = PopInt();
    ref = PopPtr();
    CheckNull(ref);
    CheckArrayBounds(ref, index);
    mtable = GetHeapPtr(ref_value, ->mtable, Object *, MethodTable *);
    ref_class = GetHeapPtr(mtable, ->class, MethodTable *, Class *);
    mtable = GetHeapPtr(ref, ->mtable, Object *, MethodTable *);
    class = GetHeapPtr(mtable, ->class, MethodTable *, Class *);
    if (!instanceOf(ref_class, class)) {
        /* throw ArrayStoreException exception */
        String *error_msg, *class_name, *method_name;
        Class *class;

method = GetLocalPtr(method_offset); /* restore */
        class = GetHeapPtr(method, ->class, Method *, Class *);
        class_name = GetHeapPtr(class, ->name, Class *, String *);
        error_msg = concat(class_name, fastStaticToJavaString("."));
        method = GetLocalPtr(method_offset); /* restore */
        method_name = GetHeapPtr(method, ->name, Method *, String *);
        error_msg = concat(error_msg, method_name);
        throwVMException(error_msg, ARRAY_STORE);
    }
    SetRefArrayData(ref, index, ref_value);
    break;
```

FIGURE 70.

```
case FCMPL:
    /* Compare two floating point numbers on top of stack, producing 0 if equal,
     * -1 if the first is less than the second, and 1 if the first is greater than the second.
     */
    float_value = PeekFloat(1);
    float_value2 = PeekFloat(0);
    if (FloatIsNaN(float_value) || FloatIsNaN(float_value2)) {
        PokeInt(1, -1);
    }
```

FIGURE 71.

```
else if (float_value > float_value2) {
   PokeInt(1, 1);
}
else if (float_value < float_value2) {
   PokeInt(1, -1);
}
else {
   PokeInt(1, 0);
}
ShrinkNPS(1);
break;
```

FIGURE 71.

```
case IFEQ:
   /* Branch to offset specified by immediate operands if top-of-stack value equals zero */
   int_value = PopInt();
   if (int_value == 0) {
      next_pc = pc + Get2Bytecodes(1);
   }
   PVMPreemptionPoint();
   break;
```

FIGURE 72.

```
case JSR:
   PushInt(GetPCOffset(bytecode, next_pc));    /* save return address */
   next_pc = pc + Get2Bytecodes(1);
   PVMPreemptionPoint();
   break;
```

FIGURE 73.

```
case RET:
   pc_offset = GetLocalInt(GetBytecode(1));
   next_pc = (unsigned char *)GetPC(bytecode, pc_offset);
   PVMPreemptionPoint();
   break;
```

FIGURE 74.

```
case TABLESWITCH:
   index = PopInt();
   pad = GetPad();
   low = Get4Bytecodes(pad + 4);
   high = Get4Bytecodes(pad + 8);
   if (index < low || index > high) {
      next_pc = pc + Get4Bytecodes(pad);
   }
```

FIGURE 75.

```
else {
    next_pc = pc + Get4Bytecodes(pad + 12 + ((index - low) * 4));
}
PVMPreemptionPoint();
break;
```

FIGURE 75.

```
case LOOKUPSWITCH:
    key = PopInt();
    pad = GetPad();
    /* number of pairs to compare */
    int_value = Get4Bytecodes(pad + 4);
    for (i = 0; i < int_value; i++) {
        if (key == Get4Bytecodes(pad + 8 + (i * 8))) {
            /* found a match */
            next_pc = pc + Get4Bytecodes(pad + 8 + (i * 8) + 4);
            break;
        }
    }
    if (i == int_value) {
        /* no match found, use default offset */
        next_pc = pc + Get4Bytecodes(pad);
    }
    PVMPreemptionPoint();
    break;
```

FIGURE 76.

```
case IRETURN:
    int_value = PeekInt(0);           /* return value */
    SetLocalInt(0, int_value);
    goto EXIT_PVM;
```

FIGURE 77.

```
case GETSTATIC_QNP8:
    index = Get2Bytecodes(1);
    field = (Field *)GetPtrConstant(index);
    class = GetHeapPtr(field, ->class, Field *, Class *);
    offset = GetHeapNonPtr(field, ->offset, Field *, unsigned short);
    Get1ByteStaticData(class, offset, int_value);
    PushInt((int)int_value);
    break;
```

FIGURE 78.

```
case PUTFIELD_Q:
    index = Get2Bytecodes(1);
    int_value = Get4BytesConstant(index);
    offset = int_value & 0x1fffffff;
    data_size = int_value & 0x60000000;
    is_ptr = int_value & 0x80000000;
    if (is_ptr) {
        ref_value = PopPtr();
        ref = PopPtr();
        CheckNull(ref);
        SetPtrObjectData(ref, offset, ref_value);
    }
    else {
        ref = PopPtr();
        CheckNull(ref);
        switch (data_size) {
        case NP8:
            int_value = PopInt();
            Set1ByteObjectData(ref, offset, int_value);
            break;
        case NP16:
            int_value = PopInt();
            Set2BytesObjectData(ref, offset, int_value);
            break;
        case NP32:
            int_value = PopInt();
            Set4BytesObjectData(ref, offset, int_value);
            break;
        case NP64:
            long_value = PopLong();
            Set8BytesObjectData(ref, offset, long_value);
            break;
        }
    }
    break;
```

FIGURE 79.

```
case INVOKEVIRTUAL_FQ:
    offset = GetBytecode(1);
    nargs = GetBytecode(2);
    PVMInvokeSave();
    FastInvokeVirtual(nargs, offset);
    PVMInvokeRestore();
    PVMPreemptionPoint();
    break;
```

FIGURE 80.

```
case INVOKESPECIAL_Q:
    index = Get2Bytecodes(1);
```

FIGURE 81.

```
m = (Method *)GetPtrConstant(index);
PVMInvokeSave();
FastInvokeSpecial(m);
PVMInvokeRestore();
PVMPreemptionPoint();
break;
```

FIGURE 81.

```
case INVOKESTATIC_Q:
    index = Get2Bytecodes(1);
    m = (Method *)GetPtrConstant(index);
    PVMInvokeSave();
    FastInvokeStatic(m);
    PVMInvokeRestore();
    PVMPreemptionPoint();
    break;
```

FIGURE 82.

```
case INVOKEINTERFACE_Q:
    index = Get2Bytecodes(1);
    m = (Method *)GetPtrConstant(index);
    nargs = GetBytecode(3);
    offset = GetBytecode(4);
    PVMInvokeSave();
    FastInvokeInterface(nargs, offset, m, offset_found);
    PVMInvokeRestore();
    if (offset_found < 256)
        *(next_pc - 1) = offset_found;    /* Update guess */
    PVMPreemptionPoint();
    break;
```

FIGURE 83.

```
case NEW_Q:
    index = Get2Bytecodes(1);
    class = (Class *)GetPtrConstant(index);
    ref = newObject(class);
    PushPtr(ref);
    break;
```

FIGURE 84.

```
case NEWARRAY:
    size = PopInt();
    CheckArrayLowerBound(size);
    switch (GetBytecode(1)) { /* atype */
        case T_BOOLEAN:
```

FIGURE 85.

```
    class = _classes[BOOLEAN_ARRAY];
    break;
case T_CHAR:
    class = _classes[CHAR_ARRAY];
    break;
case T_FLOAT:
    class = _classes[FLOAT_ARRAY];
    break;
case T_DOUBLE:
    class = _classes[DOUBLE_ARRAY];
    break;
case T_BYTE:
    class = _classes[BYTE_ARRAY];
    break;
case T_SHORT:
    class = _classes[SHORT_ARRAY];
    break;
case T_INT:
    class = _classes[INT_ARRAY];
    break;
case T_LONG:
    class = _classes[LONG_ARRAY];
        break;
}
ref = (Object *)newArray(class, size);
PushPtr(ref);
break;
```

FIGURE 85.

```
case ANEWARRAY_Q:
    size = PopInt();
    CheckArrayLowerBound(size);
    index = Get2Bytecodes(1);
    class = (Class *)GetPtrConstant(index);
    ref = (Object *)newArray(class, size);
    PushPtr(ref);
    break;
```

FIGURE 86.

```
case ATHROW:
    ref = PeekPtr(0);
    throwException(ref);
    break;
```

FIGURE 87.

```
case CHECKCAST_Q:
  ref = PeekPtr(0);
  index = Get2Bytecodes(1);
  class = (Class *)GetPtrConstant(index);
  /* if ref is null, then it is ok */
  if (ref == NULL) {
    break;
  }
  mtable = GetHeapPtr(ref, ->mtable, Object *, MethodTable *);
  ref_class = GetHeapPtr(mtable, ->class, MethodTable *, Class *);
  if (!instanceOf(ref_class, class)) {
    String *error_msg, *class_name, *method_name;
    Class *class;
    method = GetLocalPtr(method_offset); /* restore */
    class = GetHeapPtr(method, ->class, Method *, Class *);
    class_name = GetHeapPtr(class, ->name, Class *, String *);
    error_msg = concat(class_name, fastStaticToJavaString("."));
    method = GetLocalPtr(method_offset); /* restore */
    method_name = GetHeapPtr(method, ->name, Method *, String *);
    error_msg = concat(error_msg, method_name);
    throwVMException(error_msg, CLASS_CAST);
  }
  break;
```

FIGURE 88.

```
case INSTANCEOF_Q:
  ref = PopPtr();
  index = Get2Bytecodes(1);
  class = (Class *)GetPtrConstant(index);
  mtable = GetHeapPtr(ref, ->mtable, Object *, MethodTable *);
  ref_class = GetHeapPtr(mtable, ->class, MethodTable *, Class *);
  if (ref != NULL && instanceOf(ref_class, class)) {
    PushInt(1);
  }
  else {
    PushInt(0);
  }
  break;
```

FIGURE 89.

```
case MONITORENTER:
  ref = PopPtr();
  CheckNull(ref);
  PVMInvokeSave();
  enterMonitor(ref);
  PVMInvokeRestore();
  break;
```

FIGURE 90.

```
case MONITOREXIT:
   ref = PopPtr();
   CheckNull(ref);
   PVMInvokeSave();
   exitMonitor(ref);
   PVMInvokeRestore();
   break;
```

FIGURE 91.

```
void throwException(Object *exception) {
   PERCEnvironment *env;
   assert(exception != NULL);
   SetHeapNonPtr(_current_thread, ->handling_exception, Thread *, char, true);
   SetHeapPtr(_current_thread, ->current_exception, Thread *, Object *, exception);
   env = GetHeapNonPtr(_current_thread, ->env, Thread *, PERCEnvironment *);
   if (env != NULL) {
      LongJmp(env);
   }
   else {
      /* exit the thread since it has an unhandled exception */
      topLevelExceptionHandler();
   }
}
```

FIGURE 92.

```
void topLevelExceptionHandler() {
   Class *class;
   Object *exception;
   MethodTable *mtable;
   String *name, *error_msg;
   char *c_name, *temp;
   BuildFrames(0, 0, 2, 0, 0, 0);
   /* an exception occurred, and it wasn't handled */
   exception = GetException();
   /* set thread's exception to NULL since it is being handled now */
   SetHeapPtr(_current_thread, ->current_exception, Thread *, Object *, NULL);
   mtable = GetHeapPtr(exception, ->mtable, Object *, MethodTable *);
   class = GetHeapPtr(mtable, ->class, MethodTable *, Class *);
   name = GetHeapPtr(class, ->name, Class *, String *);
   /* if the exception isn't java/lang/ThreadDeath, then print out a message */
   if (fastCompareTo(name, fastStaticToJavaString("java/lang/ThreadDeath")) != 0) {
      /* call Throwable.getMessage() and print it out */
      PushPtr(name); /* save */
      PushPtr(exception);
      invokeVirtual(fastStaticToJavaString("java/lang/Throwable"),
                    fastStaticToJavaString("getMessage()Ljava/lang/String;"));
      error_msg = PopPtr(); /* get return value */
```

FIGURE 93.

```
  name = PopPtr(); /* restore */
  /*** REPLACE '/' WITH '.' ***/
  c_name = fastToCString(name);
  /* Not portable: assumes no preemption */
  temp = GetActualAddr(c_name);
  while (*temp != 0) {
    if (*temp == '/') {
      *temp = '.';
    }
    temp++;
  }
  if (error_msg != NULL) {
    PrepareBlockCall();
    printf("%s: %s\n", c_name, fastToCString(error_msg));
    ResumeAfterBlockCall();
  }
  else {
    PrepareBlockCall();
    printf("%s\n", c_name);
    ResumeAfterBlockCall();
  }
 }
 exitThread();
 DestroyFrames(0, 0);        /* NOT REACHED */
}
```

FIGURE 93.

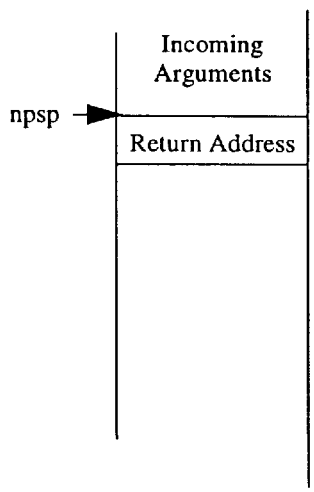
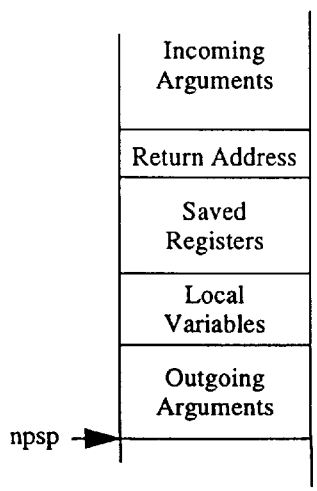

FIGURE 94.

```
public final class Atomic {
   public static native void enter();
   public static native void exit();
}
```

FIGURE 96.

```
/* NATIVE METHOD */
void enterAtomic() {
   assert(_atomic_count >= 0);
   _atomic_count++;
}
/* NATIVE METHOD */
void exitAtomic() {
   assert(_atomic_count > 0);
   _atomic_count--;
   if (_atomic_count == 0) {
      if (CheckPreemption()) {
         PreemptTask();
      }
   }
}
```

FIGURE 97.

```
#define GetException() \
   GetHeapPtr(_current_thread, ->current_exception, Thread *, Object *)

/* Set thread's exception to NULL since it is being handled now. In case the exception is a
** stack overflow, set the flag back to false since we're not handling stack overflow anymore.
*/
#define ExceptionHandled(e) { \
   SetHeapNonPtr(_current_thread, ->handling_exception, Thread *, char, false); \
   SetHeapPtr(_current_thread, ->current_exception, Thread *, Object *, NULL); \
}
```

FIGURE 98.

```
void stackOverflow(Boolean pointer_stack) {
   String *error_msg, *s;
   Boolean handling_exception;
   /* If we're not already handling an exception, then throw an exception; Otherwise, we
   ** are already working on handling the exception, and don't want to throw it again.
   */
   handling_exception =
      GetHeapNonPtr(_current_thread, ->handling_exception, Thread *, char);
   if (!handling_exception) {
      SetHeapNonPtr(_current_thread, ->handling_exception, Thread *, char, true);
      error_msg = GetHeapPtr(_current_thread, ->name, Thread *, String *);
```

FIGURE 99.

```
    if (pointer_stack) {
        s = fastStaticToJavaString(" : pointer stack");
    }
    else {
        s = fastStaticToJavaString(" : non-pointer stack");
    }
    error_msg = concat(error_msg, s);
    throwVMException(error_msg, STACK_OVERFLOW);
  }
}
```

FIGURE 99.

```
#define SetEventCause(t, cause) { \
        SetHeapNonPtr(t, ->state, Thread *, unsigned int, cause); \
}
#define GetEventCause(t) \
        (GetHeapNonPtr(t, ->state, Thread *, unsigned int))
```

FIGURE 100.

METHOD FOR EFFICIENT SOFT REAL-TIME EXECUTION OF PORTABLE BYTE CODE COMPUTER PROGRAMS

CROSS-REFERENCES TO RELATED APPLICATIONS

This application claims the benefit of U.S. Provisional Application Ser. No. 60/034,072, filed Dec. 21, 1996.

STATEMENT REGARDING FEDERALLY-SPONSORED RESEARCH AND DEVELOPMENT (NOT APPLICABLE)

BACKGROUND OF THE INVENTION

Java (a trademark of Sun Microsystems, Inc.) is an object-oriented programming language with syntax derived from C and C++. However, Java's designers chose not to pursue full compatibility with C and C++ because they preferred to eliminate from these languages what they considered to be troublesome features. In particular, Java does not support enumerated constants, pointer arithmetic, traditional functions, structures and unions, multiple inheritance, goto statements, operator overloading, and pre-processor directives. In their place, Java requires all constant identifiers, functions (methods), and structures to be encapsulated within class (object) declarations. The purpose of this requirement is to reduce conflicts in the global name space. Java provides standardized support for multiple threads (lightweight tasks) and automatic garbage collection of dynamically-allocated memory. Furthermore, Java fully specifies the behavior of every operator on every type, unlike C and C++ which leave many behaviors to be implementation dependent. These changes were designed to improve software scalability, reduce software development and maintenance costs, and to achieve full portability of Java software. Anecdotal evidence suggests that many former C and C++ programmers have welcomed these language improvements.

One distinguishing characteristic of Java is its execution model. Java programs are first translated into a fully portable standard byte code representation. The byte code is then available for execution on any Java virtual machine. A Java virtual machine is simply any software system that is capable of understanding and executing the standard Java byte code representation. Java virtual machine support is currently available for AIX, Apple Macintosh, HPUX, Linux, Microsoft NT, Microsoft Windows 3.1, Microsoft Windows 95, MVS, Silicon Graphics IRIX, and Sun Solaris. Ports to other environments are currently in progress. To prevent viruses from being introduced into a computer by a foreign Java byte-code program, the Java virtual machine includes a Java byte code analyzer that verifies the byte code does not contain requests that would compromise the local system. By convention, this byte code analyzer is applied to every Java program before it is executed. Byte code analysis is combined with optional run-time restrictions on access to the local file system for even greater security. Current Java implementations use interpreters to execute the byte codes but future high-performance Java systems will have the capability of translating byte codes to native machine code on the fly. In theory, this will allow Java programs to run approximately at the same speed as C++.

Within Sun, development of Java began in April of 1991. Initially, Java was intended to be an implementation language for personal digital assistants. Subsequently, the development effort was retargeted to the needs of set-top boxes, CD-ROM software, and ultimately the World-Wide Web. Most of Java's recent media attention has focused on its use as a medium for portable distribution of software over the Internet. However, both within and outside of Sun, it is well understood that Java is much more than simply a language for adding animations to Web pages. In many embedded real-time applications, for example, the Java byte codes might be represented in system ROMs or might even be pre-translated into native machine code.

Many of the more ambitious "industrial-strength" sorts of applications that Java promises to enable on the Internet have associated real-time constraints. These applications include video conferencing integrated with distributed white boards, virtual reality, voice processing, full-motion video and real-time audio for instruction and entertainment, and distributed video games. More importantly, the next generation Web client will have even more real-time requirements. Future set-top devices will connect home televisions to the Web by way of cable TV networks. Besides all of the capabilities just mentioned, these systems will also support fully interactive television applications.

Java offers important software engineering benefits over C and C++, two of the more popular languages for current implementation of embedded real-time systems. If Java could be extended in ways that would allow it to support the cost-effective creation of portable, reliable real-time applications, the benefits of this programming language would be realized by a much larger audience than just the people who are implementing real-time Web applications. All developers of embedded real-time software could benefit. Some of the near-term applications for which a real-time dialect of Java would be especially well suited include personal digital assistants, real-time digital diagnosis (medical instrumentation, automotive repair, electronics equipment), robotics, weather monitoring and forecasting, emergency and service vehicle dispatch systems, in-vehicle navigation systems, home and business security systems, military surveillance, radar and sonar analysis, air traffic control, and various telephone and Internet packet switching applications.

This invention relates generally to computer programming methods pertaining to real-time applications and more specifically to programming language implementation methods which enable development of real-time software that can run on computer systems of different designs. PERC (a trademark of NewMonics Inc.) is a dialect of the Java programming language designed to address the special needs of developers of real-time software.

PERC has much to offer developers of embedded real-time systems. High-level abstractions and availability of reusable software components shorten the time-to-market for innovative products. Its virtual machine execution model eliminates the need for complicated cross-compiler development systems, multiple platform version maintenance, and extensive rewriting and retesting each time the software is ported to a new host processor. It is important to recognize that the embedded computing market is quite large. Industry observers have predicted that by the year 2010, there will be ten times as many software programmers writing embedded systems applications as there will be working on software for general purpose computers.

Unlike many existing real-time systems, most of the applications for which PERC is intended are highly dynamic. New real-time workloads arrive continually and must be integrated into the existing workload. This requires dynamic management of memory and on-the-fly schedulability analysis. Price and performance issues are very important, making certain traditional real-time methodologies cost prohibitive. An additional complication is that an application developer is not able to test the software in each environment in which it is expected to run. The same Java byte-code application would have to run within the same real-time constraints on a 50 MHz 486 and on a 300 MHz Digital Alpha. Furthermore, each execution environment is likely to have a different mix of competing applications with which this code must contend for CPU and memory resources. Finally, every Java byte-code program is supposed to run on every Java virtual machine, even a virtual machine that is running as one of many tasks executing on a time-sharing host. Clearly, time-shared virtual machines are not able to offer the same real-time predictability as a specially designed PERC virtual machine embedded within a dedicated microprocessor environment. Nevertheless, such systems are able to provide soft-real-time response.

GLOSSARY OF TERMS

Accurate Garbage Collection, as the term is used in this invention disclosure, describes garbage collection techniques in which the garbage collector has complete knowledge of which memory locations hold pointers and which don't. This knowledge is necessary in order to defragment memory.

Byte code is a term of art that describes a method of encoding instructions (for interpretation by a virtual machine) as 8-bit numbers, each pattern of 8 bits representing a different instruction.

Conservative Garbage Collection, as the term is used in this invention disclosure, describes garbage collection techniques in which the garbage collector makes conservative estimates of which memory locations hold pointers. Conservatively, the garbage collector assumes that any memory location holding a valid pointer value (a legal memory address) contains a pointer. Fully conservative garbage collectors cannot defragment memory. However, partially conservative garbage collectors (in which some pointers are accurately identified) can partially defragment memory.

CPU is an acronym that stands for Central Processor Unit. This is that part of a computer system that executes instructions (in contrast with RAM memory and disk drives).

CPU Time refers to the amount of time that the CPU works on a particular job.

Defragmenting Garbage Collection, as the term is used in this invention disclosure, describes a garbage collection technique that relocates in-use memory objects to contiguous locations so as to coalesce multiple segments of free memory into larger free segments.

Fast function is a term specific to this invention disclosure which describes a function that is considered to be not preemptible. Contrast this with slow function.

Fast Pointer is a term specific to this invention disclosure which describes pointers that are implemented using the fastest possible techniques available on a particular computer system. Fast pointers are "normal" pointers as they would be implemented by a typical compiler for the C language.

Garbage Collection is a term of art describing the automatic process of discovering regions of computer memory that were once allocated to a particular purpose but are no longer needed for that purpose and reclaiming said memory to make it available for other purposes.

Garbage Collection Flip, as the term is used in this invention disclosure, is the process of beginning another pass of the garbage collector. When garbage collection begins, the roles assigned to particular memory regions exchange; thus the use of the term "flip."

Heap is a term of art describing a region of memory within which arbitrary sized objects can be allocated and deallocated to satisfy the dynamic memory needs of application programs.

Interpreter is a term of art describing the process, generally carried out in software, of reading a stream of instructions and performing the work represented by these instructions.

Java, a trademark of Sun Microsystems, Inc., is an object-oriented programming language with syntax derived from C and C++, which provides automatic garbage collection and multi-threading support as part of the standard language definition.

JIT, as the term is used in this invention disclosure, is an acronym standing for "just in time." The term is used to describe a system for translating Java byte codes to native machine language on the fly, just-in-time for its execution. We consider any translation of byte code to machine language which is carried out by the virtual machine to be a form of JIT compilation.

Machine Language is a term of art describing the instruction encodings understood by a particular CPU. Typically, each CPU design is capable of executing different instructions, and even common instructions are encoded using different numbers.

Method is a term of art describing the unit of procedural abstraction in an object-oriented programming system. All methods are associated with particular class definitions. Rather than calling a procedure or function, the object-oriented programmer invokes the method associated with the data object on which the method is intended to operate.

Native Method, as this term is used in relation to the Java and PERC programming languages, describes a method that is implemented in C (or some other low-level language) rather than in the high-level Java or PERC language in which the majority of methods are implemented.

PERC, a trademark of NewMonics Inc., is an object-oriented programming language with similarities to Java, which has been designed to address the specific needs of developers of real-time and embedded software.

Pointer is a term of art describing a value held within computer memory or computer registers for the purpose of identifying some other location in memory. The value "points" to a memory cell.

Read Barrier is a term of art describing a special check performed each time application code fetches a value from a heap memory location. The read barrier serves to coordinate application processing with garbage collection.

Real-Time is a term of art that describes computer systems that must perform work under time constraints. Examples of real-time computer systems include telephone switching, full-motion video playback, audio CD playback, and action video games.

Real-Time Garbage Collection, as the term is used in this invention disclosure, describes a garbage collection technique that allows incremental interleaved execution of garbage collection and application code which is organized such that high-priority application code can preempt the garbage collector when necessary and garbage collection is consistently provided with adequate execution time to allow it to make guaranteed forward progress at a rate sufficient to satisfy the allocation needs of real-time application programs.

Root Pointer is a term of art describing a pointer residing outside the heap which may point to an object residing within the heap. The garbage collector considers all objects reachable through some chain of pointers originating with a root pointer to be "live."

RTVMM, as the term is used in this invention disclosure, is an acronym standing for Real-Time Virtual Machine Method. This acronym represents the invention disclosed by this document.

Signature, as the term is used in this invention disclosure, is a string representation of the type of a PERC object.

Slow function is a term specific to this invention disclosure which describes a function that is considered to be preemptible. We describe such procedures as "slow" because extra work is required by a caller function that invokes a slow function in order to prepare for the possibility of preemption.

Slow Pointer is a term specific to this invention disclosure which describes pointers that are implemented in such a way that they provide coordination with a background garbage collection task. Various implementations of slow pointers are possible. In general, fetching, storing, and indirecting through slow pointer variables is slower than performing the same operation on fast pointer variables.

String is a term of art describing a sequence of characters, typically encoded according to the ASCII standard.

Tending is a term of art describing the garbage collection process of examining a pointer to determine that the object it refers to is live and arranging for the referenced object to be subsequently scanned in order to tend all of the pointers contained therein.

Thread is a term of art describing a computer program that executes with an independent flow of execution. Java is a threaded language, meaning that multiple flows of execution may be active concurrently. All threads share access to the same global memory pool. (In other programming environments, threads are known as tasks.)

Virtual Machine is a term of art that describes a software system that is capable of interpreting the instructions encoded as numbers according to a particular agreed upon convention.

Write Barrier is a term of art describing a special check performed each time application code stores a value to a heap memory location. The write barrier serves to coordinate application processing with garbage collection.

BRIEF SUMMARY OF THE INVENTION

The invention is a real-time virtual machine method (RTVMM) for use in implementing portable real-time systems. The RTVMM provides efficient support for execution of portable byte-code representations of computer programs, including support for accurate defragmenting real-time garbage collection. Efficiency is measured both in terms of memory utilization, CPU time, and programmer productivity. Programmer productivity is enhanced through reduction of the human effort required to make the RTVMM available in multiple execution environments.

The innovations comprised in this disclosure include the following:

1. Extensions to the standard Java byte code instruction set to enable efficient run-time isolation of pointer variables from non-pointer variables. The extended byte codes are described as the PERC instruction set.

2. A mechanism to translate traditional Java byte codes into the extended PERC byte codes at run-time, as new Java byte codes are loaded into the virtual machine's execution environment.

3. An internal data structure organization that enables efficient execution of the PERC instruction set. The Java run-time stack is replaced by two stacks, one for non-pointer and the other for pointer data. Further, the data structures enable efficient interaction between native methods, Java methods represented by byte code, and Java methods translated by a JIT compiler to native machine language. Performance tradeoffs are biased to give favorable treatment to execution of JIT-translated methods.

4. A set of C macros and functions that characterize the native-method application programmer interface (API). This API abstracts the native-method programmer's interface to the internal data structures, the run-time task scheduler, and the garbage collector.

5. A method for implementing mostly stationary defragmenting real-time garbage collection in software.

6. A method for supporting arbitrary numbers of task priority levels and control over dispatching of individual tasks using an underlying operating system that provides fixed priority preemptive scheduling with a minimum of three priority levels.

7. A mechanism for translating traditional Java byte codes into the extended PERC byte codes prior to run-time, in order to reduce run-time overhead and simplify system organization.

BRIEF DESCRIPTION OF THE DRAWINGS

FIG. 7 illustrates the representation of string data. String x represents the string "embedded" and string y represents the string "bed".

FIG. 8 illustrates the organization of a sparse hash table for fast constant-time lookup of the byte-code representations corresponding to particular byte-code stub procedures.

FIG. 9 provides standard type definitions.

FIG. 10 provides C definitions of important global and static variables.

FIG. 11 provides C preprocessor definitions of symbolic constants used to identify standard built-in PERC classes.

FIG. 12 provides C preprocessor definitions of symbolic constants used to describe access flags in the representations of classes, methods, and fields.

FIG. 13 provides C preprocessor definitions of symbolic constants used to describe the encodings of Sun's Java byte code instruction set.

FIG. 14 provides C preprocessor definitions of symbolic constants used to describe the encodings of NewMonics' special extended byte code instruction set, for instructions that defer from Sun's encodings.

FIG. 15 provides the C declaration of the structure used internal to the PERC implementation to represent Array objects. The data[ ] component is expanded as necessary to represent the array elements.

FIG. 16 provides the C declaration of the structure used internal to the PERC implementation to represent Class objects. Each Class object represents the definition of a particular programmer-defined type.

FIG. 17 provides the C declaration of the structure used internal to the PERC implementation to represent a raw class file that has been read into memory. The class-file loader analyzes this object to create an appropriate Class representation.

FIG. 18 provides the C declaration of the structure used internal to the PERC implementation to represent the range of byte code instructions within a byte-code method to which a particular exception handler applies. The handler_pc field is the offset of the exception handler code.

FIG. 19 provides the C declaration of the structure used internal to the PERC implementation to represent a field within a class. The constantvalue_index field is used during loading to represent the offset within the constant pool of the value of each static final field. After the offsets of each field within the class's static data region have been determined (as represented by the Field structure's offset field), the constant is copied out of the constant pool into the corresponding data location.

FIG. 20 provides the C declaration of the structure used internal to the PERC implementation to represent a HashLock structure. Exactly one HashLock structure is allocated for each PERC object that needs either a hash value or a lock, or both.

FIG. 21 provides the C declaration of the structure used internal to the PERC implementation to represent a Hash-Cache structure. Each HashCache structure is capable of representing three recycled hash values. HashCache structures are generally created by modifying the signature field of existing HashLock structures during garbage collection.

FIG. 22 provides the C declaration of the structure used internal to the PERC implementation to represent a Method structure.

FIG. 23 provides the C declaration of the structure used internal to the PERC implementation to represent a MethodTable structure.

FIG. 24 provides the C declaration of the structure template used internal to the PERC implementation to represent an arbitrary PERC object. The data array at the end of the structure is expanded as necessary to represent the object's fields.

FIG. 25 provides the C declaration of the structure used internal to the PERC implementation to represent a PERC stack of non-pointers.

FIG. 26 provides the C declaration of the structure used internal to the PERC implementation to represent a PERC jump buffer environment, which is stored on the C run-time stack.

FIG. 27 provides a C code fragment that demonstrates the implementation of an exception handler and try statement as they would be written in C.

FIG. 28 provides a C macro definition of the SetJmp( ) macro, which is a version of the standard C setjmp( ) function specialized for the PERC virtual machine execution environment.

FIG. 29 provides a C macro definition of the UnsetJmp( ) macro, which is used within the PERC virtual machine execution environment to replace the current exception handling context with the surrounding exception handling context.

FIG. 30 provides a C macro definition of the LongJmpo macro, which is a version of the standard C longjmp( ) function specialized for the PERC virtual machine execution environment. Note that this macro makes use of perclongjmp( ) whose implementation is not provided. perclongjmp( ) expects as parameters a representation of the machine's registers including its instruction pointer, the value of the pointer stack pointer, the value of the non-pointer stack pointer, and the return value to be returned to the point of the JIT version of setjmp( ).

FIG. 31 provides a C declaration of the structure used internal to the PERC implementation to represent a PERC stack of pointers.

FIG. 32 illustrates the signature structure used to represent the memory layout of heap-allocated objects. total_length is the total number of words comprising the object, excluding the object's header words, but including its signature if the signature happens to be appended to the end of the data. All pointers are assumed to be word aligned within the structure. Use last_descriptor to symbolically represent the word offset of the last word within the corresponding object that might contain a pointer. When the garbage collector scans the corresponding object in search of pointers, it looks no further than the word numbered last_descriptor. type_code comprises a 2-bit type tag in its most significant bits, with the remaining 30 bits representing the value of last_descriptor. bitmap is an array of integers with each integer representing 32 words of the corresponding object, so there are a total of ceiling(last_descriptor/32) entries in the array. (bitmap[0]&0x01), which represents the first word of the corresponding object, has value 1 if and only if the first word is a pointer.

FIG. 33 provides C macros that define symbolic constants pertaining to the maintenance of object headers, including the construction and use of Signature structures.

FIG. 34 provides C macros that allow manipulation and access to the fields represented by Signature structures.

FIG. 35 provides a C declaration of the structure used internal to the PERC implementation to represent a PERC String object.

FIG. 36 provides a C declaration of the structure used internal to the PERC implementation to represent a PERC Thread object.

FIG. 37 provides C macros that define symbolic constants pertaining to the state field of the Thread data structure.

FIG. 38 provides C declarations of the standard garbage collection header and accompanying macros for manipulation and access to the header information FIG. 39 provides C macros that can be used to find the "true" address of an object and to compare two addresses for equality. The GetActualAddr macro is a helper macro, not intended for use by application code.

FIG. 40 provides C macros for conversion between integer offsets and actual derived pointer values and for obtaining the actual address of the constant-pool object. These macros are used to improve the efficiency of access to instruction, stack, and constant-pool memory.

FIG. 41 provides C macros to enable the reading and writing of memory representing the fields of heap-allocated structures.

FIG. 42 provides C macros used by the run-time dispatcher to communicate with the application thread. The dispatcher executes the SetPreemptionFlag( ) macro to request that the application preempt itself. The dispatcher checks GetEventCause( ) to verify that the application has preempted itself. The dispatcher executes the ClearPreemptionFlag( ) macro after the application has preempted itself.

FIG. 43 provides C macros used by application code to coordinate with the dispatcher. The application executes the CheckPreemption( ) macro to see if the dispatcher wants it to preempt itself. The application executes PreemptTask( ) when the task is ready to be preempted. The application executes PrepareBlockCall( ) immediately before calling a system routine which may block. It executes ResumeAfterBlockCall( ) upon return from the system routine.

FIG. 44 provides C helper macros for use by application code to coordinate with the dispatcher. TendPointerStack( ), used by SaveThreadState( ), rescans the portion of the pointer stack that is bounded below by __gc__ps__low__water and above by __psp.

FIG. 45 provides C macros for use by C code invocations of PERC methods.

FIG. 46 provides the C implementation of the fastInvoke( ) helper routine.

FIG. 47 provides the C implementation of the invokeStatic( ) helper routine.

FIG. 48 provides the C implementation of the invokeSpecial( ) helper routine.

FIG. 49 provides the C implementation of the invokeVirtual( ) helper routine.

FIG. 50 provides the C implementation of the invokeInterface( ) helper routine.

FIG. 51 provides the C implementation of the interfaceMethodSearch( ) helper routine.

FIG. 52 provides the C implementation of the lookupMethod( ) helper routine.

FIG. 53 provides the Java implemenation of the TaskDispatcher class.

FIG. 54 provides the C implementation of the TaskDispatcher's critical native methods and help routines.

FIG. 55 provides C macros for use in maintaining activation frames on the PERC pointer and non-pointer stacks. The StackOverflowCheck( ) macro is executed each time these stacks expand. The AdjustPSPAndZeroOutLocals( ) macro is executed to zero out the new pointers allocated on the PERC pointer stack. The AdjustLowWaterMacro( ) macro executes each time an activation frame is removed from the pointer stack. The low-water mark identifies the lower limit on the range of the pointer stack that has to be scanned when the task is preempted.

FIG. 56 provides the definition of the BuildFrames( ) C macro.

FIG. 57 provides the definition of the DestroyFrames( ) C macro.

FIG. 58 provides the definition of the PrepareJavaFrames( ) C macro.

FIG. 59 provides the definition of the PrepareNativeFrames( ) C macro.

FIG. 60 provides the definition of the ReclaimFrames( ) C macro.

FIG. 61 provides the definition of the AllocPVMLocalPointers( ) C macro.

FIG. 62 provides the definition of the AllocLocalPointers( ) C macro.

FIG. 63 provides the definitions of C macros for use in returning values from native methods and C helper functions.

FIG. 64 provides the definitions of C macros for manipulation of the PERC pointer stack.

FIG. 65 provides the definitions of C macros for manipulation of the PERC non-pointer stack.

FIG. 66 provides the definition of a C macro used within the implementation of the PERC virtual machine to support preemption of the currently executing thread.

FIG. 67 provides the definitions of C macros for saving and restoring the state of the PERC virtual machine surrounding each preemption point.

FIG. 68 provides the C implementation of the PERC virtual machine, except that cases to handle each byte code are excluded.

FIG. 69 provides the C code to be inserted into the PERC virtual machine template illustrated in FIG. 68 in order to implement the IADD instruction, which adds the two integers on the top of the Java stack, placing the result on the Java stack.

FIG. 70 provides the C code to be inserted into the PERC virtual machine template illustrated in FIG. 68 in order to implement the AASTORE instruction.

FIG. 71 provides the C code to be inserted into the PERC virtual machine template illustrated in FIG. 68 in order to implement the FCMPL instruction.

FIG. 72 provides the C code to be inserted into the PERC virtual machine template illustrated in FIG. 68 in order to implement the IFEQ instruction.

FIG. 73 provides the C code to be inserted into the PERC virtual machine template illustrated in FIG. 68 in order to implement the JSR instruction.

FIG. 74 provides the C code to be inserted into the PERC virtual machine template illustrated in FIG. 68 in order to implement the RET instruction.

FIG. 75 provides the C code to be inserted into the PERC virtual machine template illustrated in FIG. 68 in order to implement the TABLESWITCH instruction.

FIG. 76 provides the C code to be inserted into the PERC virtual machine template illustrated in FIG. 68 in order to implement the LOOKUPSWITCH instruction.

FIG. 77 provides the C code to be inserted into the PERC virtual machine template illustrated in FIG. 68 in order to implement the IRETURN instruction.

FIG. 78 provides the C code to be inserted into the PERC virtual machine template illustrated in FIG. 68 in order to implement the GETSTATIC_QNP8 instruction.

FIG. 79 provides the C code to be inserted into the PERC virtual machine template illustrated in FIG. 68 in order to implement the PUTFIELD_Q instruction.

FIG. 80 provides the C code to be inserted into the PERC virtual machine template illustrated in FIG. 68 in order to implement the INVOKEVIRTUAL_FQ instruction.

FIG. 81 provides the C code to be inserted into the PERC virtual machine template illustrated in FIG. 68 in order to implement the INVOKESPECIAL_Q instruction.

FIG. 82 provides the C code to be inserted into the PERC virtual machine template illustrated in FIG. 68 in order to implement the INVOKESTATIC_Q instruction.

FIG. 83 provides the C code to be inserted into the PERC virtual machine template illustrated in FIG. 68 in order to implement the INVOKEINTERFACE_Q instruction.

FIG. 84 provides the C code to be inserted into the PERC virtual machine template illustrated in FIG. 68 in order to implement the NEW_Q instruction.

FIG. 85 provides the C code to be inserted into the PERC virtual machine template illustrated in FIG. 68 in order to implement the NEWARRAY instruction. FIG. 86 provides the C code to be inserted into the PERC virtual machine template illustrated in FIG. 68 in order to implement the ANEWARRAY_Q instruction.

FIG. 87 provides the C code to be inserted into the PERC virtual machine template illustrated in FIG. 68 in order to implement the ATHROW instruction.

FIG. 88 provides the C code to be inserted into the PERC virtual machine template illustrated in FIG. 68 in order to implement the CHECKCAST_Q instruction.

FIG. 89 provides the C code to be inserted into the PERC virtual machine template illustrated in FIG. 68 in order to implement the INSTANCEOF_Q instruction.

FIG. 90 provides the C code to be inserted into the PERC virtual machine template illustrated in FIG. 68 in order to implement the MONITORENTER instruction.

FIG. 91 provides the C code to be inserted into the PERC virtual machine template illustrated in FIG. 68 in order to implement the MONITOREXIT instruction.

FIG. 92 provides the C implementation of the throwException routine, which is called to explicitly throw an exception to the currently executing thread.

FIG. 93 provides the C implementation of the topLevelExceptionHandler routine, which is the default exception handler in case application code does not provide an exception handler.

FIG. 94 illustrates the PERC non-pointer stack activation frame for JIT-generated code. Upon entry into the JIT function, the non-pointer stack pointer (npsp) points to the list of incoming arguments, and the return address is stored in the slot "above" the top-of-stack entry. The prologue of JIT-compiled method subtracts a JIT-computed constant from npsp to make room on the non-pointer stack for saved machine registers, local variables, and outgoing arguments.

FIG. 96 illustrates the Java implementation of the Atomic class for use on uniprocessor systems that lack the capability to analyze worst-case execution times. Application programmers can prevent threads from being preempted within certain critical regions by surrounding those regions with execution of Atomic.enter( ) and Atomic.exit( ).

FIG. 97 illustrates the native-method implementations of the Atomic.enter( ) and Atomic.exit( ) methods, respectively.

FIG. 98 illustrates C Macro definitions for the GetException( ) and ExceptionHandled( ) macros.

FIG. 99 illustrates the implementation of the stackOverflow( ) help routine, which is invoked whenever the PERC pointer or non-pointer stacks are close to overflowing.

FIG. 100 illustrates the C macro definitions of SetEventCause( ) and GetEventCause( ), which are used to communicate thread state to the task dispatcher.

DETAILED DESCRIPTION OF THE INVENTION

1.0 System Architecture

The PERC virtual machine consists primarily of an interpreter for the PERC byte-code instruction set, a task (thread) dispatcher, and a garbage collector written in C which runs as an independent real-time task. Most of the functionality of the PERC execution environment is provided by standard library and system programs that accompany the virtual machine and are executed by the virtual machine.

PERC (and Java) is an object-oriented programming language. Programs are comprised of object type declarations, known in PERC as classes. Each class definition describes the variables that are associated with each instance (object) of the corresponding class and also defines all of the operations that can be applied to instantiated objects of this type. Operations are known as methods.

Internally, PERC methods are represented using one of three different forms:

1. The PERC programmer can choose to implement certain methods in C. At run-time, these methods are represented by native machine code. Such methods are known as native methods.
2. All other PERC methods are written in PERC. At run time, certain methods written in PERC are represented as PERC byte codes.
3. The PERC-written methods that are not represented as PERC byte codes have been translated to native machine language by a JIT compiler.

2.0 Execution Modes for PERC Methods

There are three different modes of execution for PERC methods. Special effort is required to switch between these execution modes since they use the run-time stack(s) differently.

2.1 Byte-code methods

Figure 5:
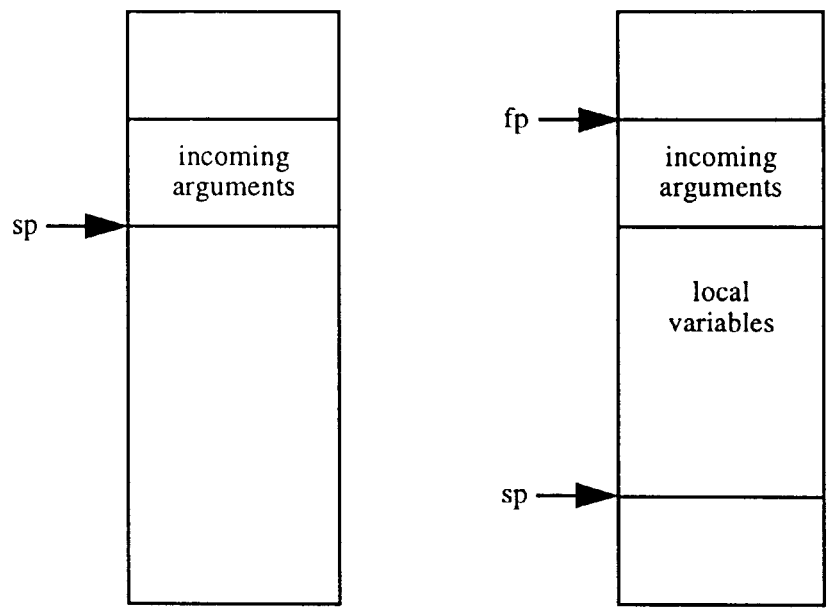
FIG. 5 illustrates the appearance of the pointer and non-pointer stack activation frames immediately before calling and immediately following entry into the body of a Java method. The stacks are assumed to grow downward. In preparation for the call, arguments are pushed onto the stack. Within the called method, the frame pointer (fp) is adjusted to point at the memory immediately above the first pushed argument and the stack pointer (sp) is adjusted to make room for local variables to be stored on the stack.
Figure 6:
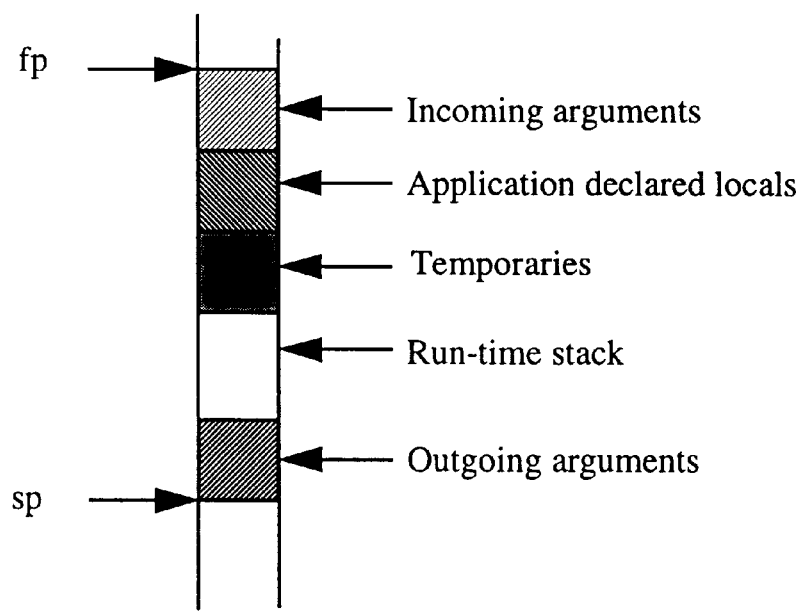
FIG. 6 illustrates the internal organization of the local-variable region of the stack activation frame. This region includes application-declared locals (as declared in bytecode attributes for Java methods and as specified in the parameterization of BuildFrames( ), temporary variables (as might be required to represent the old values of the frame and instruction pointers), a run-time stack (to allow execution of push and pop operations within the method), and space for arguments to be pushed to other methods to be called from this method.

Methods represented as byte codes are interpreted by the PERC virtual machine. The interpreter, known throughout this invention disclosure as pvm( ) (for PERC virtual machine), uses three stacks for execution: (1) the traditional C stack, (2) an explicitly managed stack for representation of PERC pointer values, and (3) an explicitly managed stack for representation of PERC non-pointer values. The C stack holds C-declared local variables and run-time state information associated with compiler generated temporaries. The PERC pointer stack holds the pointer arguments passed as inputs to the method, pointer local variables, temporary pointers pushed during expression evaluation, and pointer values pushed as arguments to methods called by the current method. The PERC non-pointer stack holds non-pointer arguments passed as inputs to the method, non-pointer local variables, temporary non-pointer values pushed during expression evaluation, and non-pointer values pushed as arguments to be called by this method. The pointer and non-pointer stack activation frames are illustrated in FIG. 5 and FIG. 6.

2.2 JIT-compiled methods

Methods that have been translated to native machine code use only two stacks: the PERC pointer stack and the PERC non-pointer stack. The benefit of using only two rather than three stacks is that this reduces the overhead of stack maintenance associated with each method invocation. The activation frames for the two stacks are structured as illustrated in FIG. 94. However, the amount of information stored in the "temporaries" segment of the activation frame differs between JIT-compiled methods and byte-code methods.

2.3 Native methods

Native methods use the same three stacks as are used by the PERC virtual machine to execute byte-code methods.

3.0 Method Invocation

PERC, like Java, supports four distinct forms of method invocation. These are known as (1) virtual, (2) special (non-virtual), (3) static, and (4) interface. With virtual and special method invocations, there is an implicit (not seen by the Java programmer) "this" argument passed to the called method. The "this" argument refers to the object on which the called method will operate. The distinctions between these different method invocations are described in "The Java Virtual Machine Specification", by Lindholm and Yellin, 1996, Addison-Wesley.

3.1 Virtual Invocation of Methods

The PERC implementation represents every PERC object with a data structure patterned after the templates provided in FIG. 15, FIG. 16, and FIG. 24. In all of these structures, the second field is a pointer to a MethodTable data structure (see FIG. 23). The PERC execution environment maintains one MethodTable data structure for each defined object type. All instantiated objects of this type point to this shared single copy. The jit_interfaces array field of the MethodTable structure has one entry for each virtual method supported by objects of this type. The mapping from method name and signature to index position is defined by the class loader, as described in "The Java Virtual Machine Specification", by Lindholm and Yellin, 1996, Addison-Wesley. To execute the JIT version of a PERC method using a virtual method lookup, branch to the code represented by jit_interfaces [method_index]. Normally, the JIT version of the byte code will only be invoked directly from within another JIT-compiled method. If a native or untranslated byte-code method desires to invoke another method using virtual method lookup, the search for the target method generally proceeds differently. First, we find the target object's MethodTable data structure (as above) and then follow the methods pointer to obtain an array of pointers to Method objects. Within the Method object, we consult the access_flags field to determine if the target method is represented by native code (ACC_NATIVE) or JIT translation of byte code (ACC_JIT). If neither of these flags is set, the method is assumed to be implemented by byte codes. See FIG. 49, FIG. 45, and FIG. 46.

3.2 Special Invocation of Methods

When the method to be invoked by a particular operation is known at compile time, the Java compiler treats this as an invokeSpecial instruction. In these cases, there is no need to consult the method table at run time. When performing special method invocation from within a JIT-translated method, the address of the called method (or at least a stub for the called method) is hard-coded into the caller's machine code.

If a native or untranslated byte-code method desires to perform the equivalent of an invokeSpecial operation, we examine the Method object that represents the target procedure and consult its access_flags field to determine if the method is represented by native code (ACC_NATIVE) or JIT translation of byte code (ACC_JIT). If neither of these flags is set, the method is assumed to be represented as byte code. See FIG. 48, FIG. 45, and FIG. 46.

3.3 Static Invocation of Methods

When the method to be invoked is declared as static within the corresponding object (meaning that the method operates on class information rather than manipulating variables associated with a particular instance of the corresponding class), the Java compiler treats this as an invokeStatic method. Execution of static methods is identical to execution of special methods except that there is no implicit pointer to "this" passed as an argument to the called method. See FIG. 47, FIG. 45, and FIG. 46.

3.4 Interface Invocation of Methods

When a method is invoked through an interface declaration, the called method's name and signature is stored as part of the calling method's code representation. The compiler ensures that the object to be operated on has a method of the specified name and signature. However, it is not possible to determine prior to run time the index position within the method table that holds the target method. Thus it is necessary to examine the target object's mtable field, which points to the corresponding MethodTable structure. We follow the MethodTable's methods pointer to find an array of pointers to Method structures. And we search this array for a method that matches the desired name and signature. Once found, we invoke this method. We examine the Method object that represents the target procedure and consult its access_flags field to determine if the method is represented by native code (ACC_NATIVE) or JIT translation of byte code (ACC_JIT). If neither of these flags is set, the method is assumed to be represented as byte code. See FIG. 50, FIG. 51, FIG. 45, and FIG. 46.

4.0 Switching Between Execution Modes

Care must be taken when switching between execution modes. Since mode changes do not occur within methods, all mode changes are associated with calling or returning from a PERC method.

TABLE 1

Mode Changes Between Different Method Implementations

| Calling Function | Called Function | | |
|---|---|---|---|
| | Byte Code | JIT Code | Native Method |
| Byte Code (pvm()) | invokeStatic()<br>invokeSpecial()<br>invokeVirtual()<br>invokeInterface() | invokeStatic()<br>invokeSpecial()<br>invokeVirtual()<br>invokeInterface() | invokeStatic()<br>invokeSpecial()<br>invokeVirtual()<br>invokeInterface() |
| JIT Code | Byte code stub | Direct call | Native method stub |
| Native Method | invokeStatic()<br>invokeSpecial() | invokeStatic()<br>invokeSpecial() | invokeStatic()<br>invokeSpecial() |

TABLE 1-continued

Mode Changes Between Different Method Implementations

| | Called Function | | |
|---|---|---|---|
| Calling Function | Byte Code | JIT Code | Native Method |
| | invokeVirtual() invokeInterface () | invokeVirtual() invokeInterface () | invokeVirtual() invokeInterface () |

Note that native methods and pvm( ), which interprets byte-code methods, use the same stack organization. Thus, calling another method from a native method is the same as calling the method from within the pvm( ) interpreter. In both cases, the caller invokes the callee by passing appropriate parameters to one of several available invocation routines, all of which are written primarily in C. These invocation routines consult internal fields within the Method structure that describes the callee to determine whether the callee is implemented as byte codes, the JIT translation of byte codes, or a native method (See FIG. 46). The invocation routine adjusts the stack and other state information as necessary in order to transfer control to the called method. When the called method returns, the invocation routine restores the stack and other state information to once again support the execution mode of the calling method. To call a byte-code method, the invocation routine saves the offset of the old frame and stack pointers in local C variables, sets up the callee's activation frames (See FIG. 5), and calls pvm( ), passing a pointer to the called method's Method structure as the only argument. To call a native method, the invocation routine saves the offsets of the old stack and frame pointers, sets up the native method's activation frames (See FIG. 5), and calls (*Method.native)( ). To call a JIT-translated method, the invocation routine sets up the callee's activation frames (See FIG. 5), pushes the current C frame pointer onto the C stack and then saves the current value of the C stack pointer in the c_sp field of the currently executing thread's Thread data structure, copies the current values of the _psp and _npsp variables into machine registers dedicated to these purposes (effectively making the PERC stacks become the run-time execution stacks), and branches to (*Method.jit_interface)( ), leaving the return address in the stack slot above the top-of-stack entry on the non-pointer stack. See FIG. 94 for an illustration of the non-pointer stack activation frame as it is organized during execution of JIT code.

If the caller is a JIT-translated method, the callee is invoked in all cases by simply branching to the equivalent of (*Method.jit_interface)( ). A small procedure stub is generated to represent each byte-code and native method in the system. Stub procedures, described below, perform all of the mode switching work that is required in switching execution modes. Note that the JIT-code translation of a static or special (non-virtual) invocation in-lines the address of the callee's code so that the corresponding Method structure does not need to be consulted at run time.

4.1 Invocation Routines

To invoke another method from within pvm( ), we call one of invokeStatic( ), invokeSpecial( ), invokeVirtual( ), or invokeInterface( ), as described in Table 1.

4.1.1 Invocation of Virtual Methods

From within the implementation of the pvmo and within native methods, the standard protocol for invoking other methods depends on the type of the call. A virtual method invocation vectors to the corresponding code by way of the target object's method table. The object to which the method corresponds is passed implicitly on the run-time stack. To invoke a virtual method, first push a pointer to the target object onto the pointer stack and then push all of the method's arguments onto the pointer and non-pointer stacks, depending on their types. Then call invokeVirtual( ), passing as arguments pointers to the String objects that represent the class name and the target method's name and signature (See FIG. 49):

void invokeVirtual(String *class_name, String *method_name_and_sig); Note that invokeVirtual( ) must do a string search within the class representation to find the selected method. This is potentially a costly operation and we would prefer to avoid this cost when possible. When byte code is first loaded into our system, we perform this lookup and save the result, represented by a pointer to a Method structure, within the constant pool. Implementers of native methods may design similar optimizations. There are two mechanisms available to implementers of native methods for the purposes of looking up Method objects: findMethod( ) and getMethodPtr( ). Both of these functions return a pointer to the corresponding Method object. With findMethod( ), the desired method is described by a pointer to the known Class object and a String pointer to the method's name and signature. With getMethodPtr( ), the desired method is described by String representations of the class name and of the method's name and signature. Prototypes for both functions are provided below:

Method *findMethod(Class *class_name, String *method_name_and_sig);

Method *getMethodPtr(String *class_name, String *method_name_and_sig);

Both functions return null if the method was not found.

Within the Method structure, information is available which characterizes the number of pointer arguments of this particular method and the offset of this method within the object's method table (see FIG. 22). To invoke a virtual function without incurring the overhead of a string method lookup, use the FastInvokeVirtualo macro, prototyped below (See FIG. 45):

void FastInvokeVirtual(int num_p_args, int offset);

4.1.2 Invocation of Special Methods

Non-virtual method calls resemble virtual method invocations except that the code to be implemented is determined by the declaration (at compile time) rather than by the current instantiation (at run time). There is no need to consult a method table when implementing non-virtual method calls. To invoke a nonvirtual method, call invokeSpecial( ), passing as arguments two String objects representing the name of the class and the name and signature of the method within the class, as prototyped below (See FIG. 48):

void invokeSpecial(String *class_name, String *method_name_and_sig);

To optimize the performance of nonvirtual method invocations, first lookup the Method object and remember its location. Then invoke the nonvirtual method by executing the FastInvokeSpecial( ) macro, prototyped below (See FIG. 45):

void FastInvokeSpecial(Method *);

4.1.3 Invocation of Interfaces

At the API level, invoking an interface is similar to invoking a virtual or non-virtual method. First push a pointer to the target object onto the pointer stack and then push all of the method's arguments onto the pointer and non-pointer stacks, depending on their types. Then call invokeinterface( ), passing as arguments String objects representing the name of the class and the name and signature of the method within the class, as prototyped below (See FIG. 50):

void invokeInterface(String *class_name, String *method_name_and_sig);

To improve the efficiency with which interface methods can be invoked, it is useful to make an educated guess as to where the matching interface might be found within the target object's method table. In most cases, the best guess is the method table slot at which the match was found the previous time the interface method was invoked. By combining the results of a previous findMethod( ) invocation with recent execution history, programmers can call interface methods using the FastInvokeInterface( ) macro, prototyped below (See FIG. 45):

void FastInvokeInterface(int num_ptr_args, int offset_guess, Method *template);

Note in the above that the purpose of the template argument is to allow FastInvokeInterface to determine the name and signature of the method that it must search for in the object found num_ptr_args slots from the current top-of-stack pointer on the PERC pointer stack.

4.1.4 Invocation of Static Methods

A static method is one that makes use only of information that is associated with the corresponding class (rather than instances of the class). When a static method is invoked, there is no "target object" pushed onto the stack. To call a static method, push all of the method's arguments onto the pointer and non-pointer stacks, depending on their types. Then call invokeStatic( ), passing as arguments String objects representing the name of the class and the name and signature of the method within the class, as prototyped below (See FIG. 47):

void invokeStatic(String *class_name, String *method_name_and_sig);

To improve the efficiency with which static methods can be invoked, lookup the corresponding Method object beforehand and remember its location. Then invoke the static method using the FastInvokeStatic( ) macro, prototyped below (See FIG. 45):

FastInvokeStatic(Method *);

4.2 Byte-Code Stubs

When JIT-translated code invokes a method that is implemented by Java byte code, it is necesary to switch the execution protocol prior to invoking pvm( ). Rather than requiring JIT-generated code to check whether this protocol switch is necessary prior to each method invocation, we provide each byte-code method with a stub procedure that honors the JIT execution protocol. This stub procedure switches from JIT to C protocols and then invokes pvm( ) with appropriate arguments. In more detail, the stub procedure performs the following:

1. Sets the Thread state to RUNNING rather than JIT_EXECUTING. This signifies to the run-time dispatcher that this thread cannot be preempted at arbitrary times, but must wait either for an explicit preemption point or for the thread to return to JIT mode.
2. Copies the register-held psp and npsp registers into global memory locations _psp and _npsp. Then assigns sp and fp (the machine's stack and frame pointer registers) to reflect the current C-stack context, as represented by _current_thread→c_sp.
3. Copies the return address off the non-pointer stack (See FIG. 94) and saves its value in a slot within the C stack frame.
4. Calculates and assigns values to _pfp (pointer stack frame pointer) and _npfp (non-pointer stack frame pointer), based on the current values of the corresponding stack pointers and the number of arguments of each type. The stack activation frames are arranged as illustrated in FIG. 5. Additionally, we adjust the pointer and non-pointer stack pointers to make room for the local variables that are required to execute the method, as represented by the max_ptr_locals and max_non_ptr locals fields of the corresponding Method structure.
5. If the method to be invoked is synchronized, we enter the monitor now, waiting for other threads to exit first if necessary.
6. For coordination with the garbage collector, we keep track of how high the pointer stack has grown during the current execution time slice. Since the stack grows downward, the high-water mark is represented by the minimum value of _psp.
7. Calls pvm( ), passing as a C argument a pointer to the Method object that describes the segment of code to be executed.
8. Upon return from pvm( ), the stub procedure restores the C stack to its original height and copies the machine's sp register back into the _current_thread→c_sp variable.
9. If the invoked method was synchronized, release the monitor now. Note that the pvm( ) itself takes responsibility for exiting the monitor if the code is aborted by throwing of an exception.
10. The stub procedure then removes all local variables from both PERC stacks, leaving a single pushed quantity on one of the stacks to represent the method's return value. Then it restores the psp, pfp, npsp, and npfp registers if appropriate. (This is our implementation of ReclaimFrames( )).
11. For coordination with the garbage collector, we keep track of how low the pointer stack has shrunk during the current execution time slice. Since the stack grows downward, the low-water mark is represented by the maximum value of _pfp.
12. Sets the Thread state to JIT_EXECUTING.
13. Returns to the caller's address that was saved in step 3.

4.3 Native-Method Stubs.

The stub for a native method is identical to the stub for a byte-code method except that the native method is invoked directly rather than invoking pvm( ) and the stub does not allocate any space on the PERC stacks for the called method's local variables (The native method reserves its own local variable space as needed). Since the target native method's address is known at the time the stub is generated, the native method is invoked directly, without requiring interaction with lookupMethod( ).

5.0 Disciplines to Support Accurate Real-Time Garbage Collection

To support real-time performance, garbage collection runs asynchronously, meaning that the garbage collection thread interleaves with application code in arbitrary order. To support accurate garbage collection, it is necessary for the garbage collector to always be able to distinguish a thread's pointer variables (including stack-allocated variables and variables held in machine registers) from the thread's non-pointer variables.

To require each thread to maintain all pointers in variables that are at all times easily identifiable by the garbage collector imposes too great an overhead on overall performance. Thus, the PERC virtual machine described in this invention disclosure implements the following compromises:

1. Threads are not allowed to be preempted at arbitrary times. Instead, preemption of a thread is only allowed if the thread is in a state identified as a preemption point.
2. Between preemption points, the thread is allowed to hold pointers in variables that may not be visible to the garbage collector. In this disclosure, we characterize such variables as "fast pointers." Fast pointers are typically declared in C as local variables, and may be represented either by machine registers or slots on the C stack.
3. Pointer variables that are visible to the garbage collector are known throughout this disclosure as "slow pointers". Slow pointers are typically represented by locations on the PERC pointer stack and by certain C-declared global variables identified as "root pointers".
4. Immediately following each preemption, the thread must consider all of its fast pointers to be invalid. In preparation for each preemption, the thread must copy the values of essential fast-pointer variables into slow pointers. Following each preemption, essential fast pointers are restored from the values previously stored in slow pointer variables. Note that, while the thread was preempted, a drefragmenting garbage collector might have relocated particular objects, requiring certain pointer values to be modified to reflect the corresponding objects' new locations.
5. Each C function in the virtual machine implementation is identified as either preemptible or non-preemptible. Before calling a preemptible function, the caller must copy all of its essential fast pointers into slow pointers. When the called function returns, the caller must restore the values of these fast-pointer variables by copying from the slow-pointer variables in which their values were previously stored. Throughout this disclosure, we refer to preemptible functions as "slow functions" and to non-preemptible functions as "fast functions."

To reduce programming effort and to minimize system dependencies, we have defined a number of standard macros for use in adhering to these protocols. These macros and standard libraries are described in the remainder of this section.

Restrictions. In order to coordinate application processing with garbage collection, it is necessary for authors of native methods and other C libraries to avoid certain "legal" C practices:

1. Do not coerce pointers to integers or integers to pointers.
2. Do not perform any pointer arithmetic unless specifically authorized to do so (e.g. special techniques have been enabled to support efficient instruction and stack pointer operations).
3. Do not store tag information (e.g. low-order bits of a word) within memory locations that are identified as pointers to the garbage collector.
4. Do not store pointers to the C static region or to arbitrary derived addresses in locations identified as garbage-collected pointers, except that pointers to objects residing in the ROMized region are allowed. Note: A derived address is a location contained within an object. The garbage collector assumes all pointers refer to the base or beginning address of the referenced object.
5. Do not directly access the fields contained within heap objects. Instead, use the GetHeapPtr( ), GetHeapNonPtr( ), SetHeapPtr( ), and SetHeapNonPtr( ) macros.
6. When declaring fields and variables that point to the C static region, identify such fields as non-pointers insofar as garbage collection is concerned.
7. Pointers to garbage-collected objects cannot be stored in the C static region unless such pointers have been registered as root pointers.

5.1 Access to Heap Objects

It is necessary to provide parameterized access to heap memory so as to facilitate the implementation of read and write barriers. The following macros serve to copy variables between different kinds of representations. See FIG. 41 for implementations of these macros.

GetHeapPtr(base, field_expr, base_type, field_type)

Given that (base) (field_expr) is an expression representing a pointer residing within a heap-allocated object, that base_type represents the type of base, and that field_type represents the type of (base) (field_expr), return the fast pointer that represents this heap pointer's value. In the process, we may have to "tend" the pointer's value. Optionally, we may overwrite in place the value of (base) (field_expr), so this expression should be a C 1-value. Sample usage:

exception=GetHeapPtr(_current_thread, →current_exception, Thread *, Object *);

SetHeapPtr(base, field_expr, base_type, field_type, field_value)

Given that (base) (field_expr) is an expression representing a pointer residing within a heap-allocated object, that base_type represents the type of base, that field_type represents the type of (base) (field_expr), and that field_value is also of type field_type, assign field_value to (base) (field_expr). In the process, we may have to "tend" field_value. Note that (base) (field_expr) must be a C 1-value. Sample usage: SetHeapPtr(_current_thread, →current_exception, Thread *, Object *, new_exception);

GetHeapNonPtr(base, field_expr, base_type, field_type)

Given that (base) (field_expr) is an expression representing a non-pointer residing within a heap-allocated object, that base_type represents the type of base, and that field_type represents the type of (base) (field_expr), return the non-pointer value that represents this heap location's value. Sample usage:

pc=GetHeapPtr(_current_thread, →pc, Thread *, unsigned short);

SetHeapNonPtr(base, field_expr, base_type, field_type, field_value)

Given that (base) (field_expr) is an expression representing a non-pointer residing within a heap-allocated object, that base_type represents the type of base, that field_type represents the type of (base) (field_expr), and that field_value is also of type field_type, assign field_value to (base) (field_expr). Note that (base) (field_expr) must be a C 1-value. Sample usage:

SetHeapPtr(_current_thread, →pc, Thread *, unsigned short, 28);

Occasionally, application programmers desire to access the elements of an array of a particular type as if certain slots contained elements of a different type. Suppose, for example, that the programmers want to treat the 2nd and 3rd entries of an integer array as a 64-bit integer. This can be achieved using the GetHeapInArrayNonPtr( ) macro, as demonstrated below:

long_integer=GetHeapInArrayNonPtr(base, [1], int *, longlong);

In this code, base is assumed to point to the beginning of a heap-allocated object which is declared to be an array of integers (the type of base should be specified by the third argument of GetHeapInArrayNonPtr( )). The second argument is combined with the first to obtain the object whose address represents the location at which the longlong integer will be fetched. There are four different macros provided for this sort of access to array data:

field_type GetHeapInArrayPtr(base, field_expr, base_type, field_type);

field_type GetHeapInArrayNonPtr(base, field_expr, base_type, field_type);

void SetHeapInArrayPtr(base, field_expr, base_type, field_type, field_value);

void SetHeapInArrayNonPtr(base, field_expr, base_type, field_type, field_value);

The following help macro is intended to facilitate the use of garbage collection macros in application code. See FIG. 39 for the implementation of this macro. int SameObjects(void *p1, void *p2)

With certain garbage collection techniques, it is possible that two fast pointer objects refer to the same object even though their pointer values are different. This might occur, for example, if an object is being copied in order to compact live memory and one pointer refers to the original location of the object and the other pointer refers to the new copy of the object. Programmers should use the SameObject( ) macro to compare fast pointers for equality. This macro returns non-zero if and only if its two pointer arguments refer to the same object.

5.2 Manipulation of String Data

The following macros are used to access and manipulate string data and slice objects. char *GetStringData(String *s)

Given that s points to a String object, returns the base address of the string data that corresponds to this object. The base address is the start of the buffer that holds this string's data.

int GetStringOffset(String *s)

Given that s points to a String object, returns the offset at which the string's data begins within the string buffer represented by GetStringData(s).

int GetStringLen(String *s)

Given that s points to a String object, return the length of the corresponding string.

char GetStringChar(String *s, int i)

Given that s points to a String object and that i is within the range of the corresponding string data, return the character at offset i from the beginning of the string. Offset 0 represents the first character of the string. void SetStringChar(String *s, int i, char c)

Given that s points to a String object and that i is within the range of the corresponding string data, set the character at offset i from the beginning of the string to the value of c. Additionally, we provide the following C functions, which can be assumed to be preemptible unless fast appears in their names or they are specifically being described as not preemptible, for manipulation of string data. Programmers who invoke the fast functions below should take care to avoid passing arguments that represent "long" strings, since doing so would increase preemption latency.

int fastCompareTo(String *string1, String *string2)

Compares the data of string1 to that of string2, returning 0 if the strings are equal, −1 if string1 lexicographically precedes string2, and 1 if string1 lexicographically follows string2.

String *fastSubstring(String *string, int offset)

Returns a String object representing the substring of string that starts at position 0 and includes all characters to the end of string. substring(s, 0) returns a copy of string s.

String *concat(String *string1, String *string2)

Given that string1 and string2 represent String objects, create and return a new String object that represents their catenation.

String *fastReplace(String *string, char old, char new)

Given that string represents a String object, replace all occurrences of character old with character new within the corresponding string data.

char *fastToCString(String, *jstring)

Given that jstring represents a String object, returns a null-terminated array of characters representing the data of jstring. The null-terminated array is heap allocated.

String *fastStaticToJavaString(char *cstring)

Given that cstring represents a statically allocated null-terminated array of characters, returns a String object that represents the same data (without the null terminator).

void setStringDataFromStaticBuf(String *string, unsigned char *buf, int length, int offset)

Given that buf represents a statically allocated array of length characters, this fuiction copies length bytes from buf to string, starting at position offset within string. The first offset bytes of string are left untouched. This function is not preemptible.

void getStringDataIntoStaticBuf(String *string, char *buf)

Given that buf represents a statically allocated array of at least as many characters as are required to represents string, this function copies all of string's characters to buf. This function is not preemptible.

5.3 Manipulation of the Pointer Stack

Native methods and other C functions run fastest if they avoid frequent copying of values between local variables (stored on the PERC pointer stacks) and C-declared fast pointers. But pointers stored in C-declared variables are not necessarily preserved across preemption of the thread. Thus, it is necessary for the application code to copy from C-declared variables to macro-declared variables before each preemption. The following macros are used to manipulate the pointer stack.

void PushPtr(fptr)

Push the fast pointer fptr onto the pointer stack.

void *PopPtr( )

Pop the fast pointer off of the pointer stack.

void *PeekPtr(offset)

Return the fast pointer that is currently offset slots away from the top of the stack.

PeekPtr(0) is the top pointer-stack element.

void PokePtr(offset, fptr)

Insert fptr into the stack slot found offset slots away from the top of the stack. (Not yet implemented.)

void *GetLocalPtr(offset)

Return as a fast pointer the local pointer at the specified offset. The first pointer argument is at offset 0. The second pointer argument is at offset 1, and so on.

void SetLocalPtr(offset, fastptr)

Set the local pointer at the specified offset to the value of fastptr. Offsets are specified as described in the GetLocalFastPtr( ) macro.

void ShrinkPS(offset)

Adjust the pointer stack pointer (psp) by offset entries. If offset is positive, space representing offset pointers is removed from the stack. ShrinkPS should not be used with a negative offset as this might create a situation in which pointers have garbage values.

5.4 Manipulation of the Non-Pointer Stack

The non-pointer stack holds integers, 8-byte long integers, floating point values, and 8-byte double-precision floating point values. The following macros are suggested for manipulation of the non-pointer stack.

void PushInt(val)

Push integer val onto the non-pointer stack.

void PushFloat(val)

Push floating point value val onto the non-pointer stack.

void PushLong(val)

Push 8-byte long value val onto the non-pointer stack.

void PushDouble(val)

Push 8-byte double precision value val onto the non-pointer stack.

int PopInt( )

Pop a single integer from the top of non-pointer stack.

float PopFloat( )

Pop a single floating point value from the top of the non-pointer stack.

longlong PopLong( )

Pop a single 8-byte long value from the top of the non-pointer stack.

double PopDouble( )

Pop a single 8-byte double precision value from the top of the non-pointer stack.

int PeekInt(off)

Given that off words have been pushed onto the non-pointer stack on top of integer item n, return n.

float PeekFloat(off)

Given that off words have been pushed onto the non-pointer stack on top of floating point value x, return x.

longlong PeekLong(off)

Given that off words have been pushed onto the non-pointer stack on top of 8-byte long value m, return m.

double PeekDouble(off)

Given that off words have been pushed onto the non-pointer stack on top of 8-byte double-precision value y, return y.

void PokeInt(off, val)

Given that off words have been pushed onto the non-pointer stack on top of the integer slot representing n, overwrite this slot with val.

void PokeFloat(off, val)

Given that off words have been pushed onto the non-pointer stack on top of the floating point slot representing x, overwrite this slot with val.

void PokeLong(off, val)

Given that off words have been pushed onto the non-pointer stack on top of the 8-byte long integer slot representing m, overwrite this slot with val.

void PokeDouble(off, val)

Given that off words have been pushed onto the non-pointer stack on top of the 8-byte double precision slot representing y, overwrite this slot with val.

int GetLocalInt(off)

Given that off words precede the integer variable j within the local non-pointer stack activation frame, return the value of j.

float GetLocalFloat(off)

Given that off words precede the floating point variable f within the local non-pointer stack activation frame, return the value of f.

longlong GetLocalLong(off)

Given that off words precede the 8-byte long integer variable 1 within the local non-pointer pointer stack activation frame, return the value of 1.

double GetLocalDouble(off)

Given that off words precede the double precision floating point variable x within the local non-pointer stack activation frame, return the value of x.

void SetLocalInt(off, val)

Given that off words precede the integer variable j within the local non-pointer stack activation frame, set the value of j to val.

void SetLocalFloat(off, val)

Given that off words precede the floating point variable f within the local non-pointer stack activation frame, set the value of f to val.

void SetLocalLong(off, val)

Given that off words precede the 8-byte long integer variable 1 within the local non-pointer stack activation frame, set the value of 1 to val.

void SetLocalDouble(off, val)

Given that off words precede the double precision floating point variable x within the local non-pointer stack activation frame, set the value of x to val.

void ShrinkNPS(offset)

Adjust the non-pointer stack pointer (npsp) by offset entries. If offset is positive, space representing offset pointers is removed from the stack. If offset is negative, the specified number of stack slots are added to the stack.

5.5 Optimizations to Support Performance-Critical Data Structures

Strict partitioning between fast and slow pointers, and requiring all heap memory access to be directed by way of heap access macros imposes a high overhead. Certain data structures are accessed so frequently that the PERC implementation treats them as special cases in order to improve system performance. In particular, the following exceptions are supported:

1. Note that the PERC stacks dedicated to representation of pointer and non-pointer data respectively are heap allocated. According to the protocols described above, every access to PERC stack data should be directed by way of heap access macros. Since stack operations are so frequent, we allow direct access to stack data using traditional C pointer indirection. This depends on the following:

a. The stack pointers are represented by C global variables declared as pointers. Access to stack data uses C pointer indirection, without enforcement of special read or write barriers. (See FIG. 64 and FIG. 65)

b. Each time the task is preempted, the global variables representing the currently executing thread's stack pointers are saved by the run-time dispatcher in the thread's structure representation (See FIG. 53 and FIG. 44). Note the use of the GetSPOffset( ) macro (See FIG. 40).

c. Each time a task is scheduled for execution, the dispatcher sets the global stack pointer variables to represent the newly dispatched thread's stack pointers (See FIG. 53 and FIG. 44). Note the use of the GetSP( ) macro (See FIG. 40).

d. During execution of a time slice, the thread's pointer stack is assumed to hold fast pointers. However, when the thread is preempted, the garbage collector needs to see the stack object's contents as slow pointers. When the thread is preempted, the dispatcher scans that portion of the stack that has been modified during the current time slice in order to convert all fast pointers to slow pointers (See FIG. 53 and FIG. 44). We maintain a low-water mark representing a bound on the range of stack memory that has been impacted by execution of the task during its current time slice to reduce the need for redundant stack scanning.

2. When the pvm( ) (PERC Virtual Machine byte code interpreter) is executing byte-code methods, the method's byte code is represented by a string of bytes. The byte-code instructions are stored in heap memory, suggesting that every instruction fetch needs to incur the overhead of a heap-access macro. To improve the performance of instruction fetching, we allow instruction fetching to bypass the standard heap access macro. Doing so depends on the following:

a. The instruction pointer is represented by a fast pointer declared within the implementation of pvm( ). Upon entry into pvm( ), this variable is initialized using the GetPC( ) macro, which expects as arguments a pointer to the ByteString object that represents the method's code and the instruction offset within this method's code (See FIG. 40).

b. Whenever pvm( ) is to be preempted, or whenever it calls another function that might be preempted, pvm( ) computes the current instruction offset relative to the beginning of the ByteString object that represents the currently executing method's byte code. We use the GetPCOffset( ) macro (See FIG. 40).

c. After being preempted (or after returning from a function that may have been preempted), the instruction pointer is recomputed by using GetPC( ).

3. During interpretation of byte-code methods, the constant pool is frequently accessed. Rather than incurring the overhead of a standard heap access macro, we obtain a trustworthy C pointer to the constant pool data structure and refer directly to its contents. For this purpose, we use the GetCP( ) macro (See FIG. 40). C subscripting expressions based on the value returned by GetCP( ) are considered valid up to the time at which the thread is next preempted. Following each preemption, the pointer must be recomputed through another application of the GetCP( ) macro.

5.6 Support for Try Clauses (and monitors)

Exception handling is implemented using C-style longjmp invocations. Our implementation of try and synchronized statements sets a longjmp buffer for each try and synchronized context that is entered. This imposes an overhead on entry into such contexts even when the corresponding exception is not thrown. An alternative implementation would simply build at compile, byte-code loading, or JIT translation time whatever tables are necessary to allow the exception thrower to search and find the appropriate exception handler whenever exceptions must be thrown. We currently prefer our technique for real-time execution because it allows both entry into try and synchronized statements and the throwing of exceptions to be time deterministic. As a future optimization, we intend to minimize the amount of information that is saved by each setjmp( ) invocation. We also intend to further study these issues and may ultimately decide to switch to the alternative table-driven implementation of the exception throwing mechanism.

With native and JIT-generated code, entry into a try clause results in the creation of a new jmpbuf to serve as the default exception handler. For methods implemented in byte code, a jmpbuf is allocated upon entry into method's code. The default exception handler is identified by a thread state variable. If we leave the try clause through normal (unexceptional) termination (or leave the body of a byte-code method that includes a try clause), we restore the default exception handler to whatever value it held before we entered into the body of this try statement (or byte-code method). To implement this, we link the PERC-specific jump buffers within the current C stack (as a local variable).

In the case of native methods, the "body" of the try statement must be implemented as a function call. When an exception is raised, the thrown object is stored in a state variable associated with the currently active thread (current_exception) and the LongJmp( ) macro is invoked. When the try statement catches the LongJmp( ) invocation, it checks first to see if this exception handler desires to handle the thrown exception. If so, we handle it here. If not, we simply throw the exception to the surrounding exception handler. See FIG. 27.

Native methods. Upon entry into a block of code that represents either a try block or a synchronized block, we save the previous value of the exception handling jump buffer in a local variable and set a stack-allocated jump buffer to represent this block's exception handler. Whenever an exception is raised, it performs a longjmp to the currently active exception handler. When this exception handler catches the longjmp invocation, it handles it if possible. Otherwise, it simply forwards the exception to the outer nested exception handling context.

When control leaves the exception handled block, we automatically restore the current exception handler to the value it held before this block was entered.

The PERC virtual machine. The PERC interpreter (virtual machine) is invoked once for each method to be interpreted. If the method to be interpreted contains synchronized or try blocks, a jump buffer is initialized according to the same protocol described above.

5.7 Activation Frame Maintenance

There are four different categories of native code:

1. The virtual machine implementation: pvm( ) deserves special treatment since its performance is so critical. The caller of pvm( ), which may be a stub procedure for a particular byte-code method, must set up the PERC stack activation frames for execution of this pvm( ). Upon return from pvm( ), the caller removes the activation frames from the stacks. In place of the local arguments, the caller leaves a single placeholder to represent the return value on whichever PERC stack is appropriate, or leaves no placeholder if the method is declared as returning void. The activation frame maintenance performed by a stub procedure is described in Section 4.2 on page 18. The activation frame maintenance performed by an invokeVirtual( ), invokeSpecial( ), invokestatico, or invokeInterface( ) function is described later in this section under sub-headings "PrepareJavaFrames( )" and "ReclaimFrames( )".

If the implementation of pvm( ) desires to make use of local variables (required by the C programmer) in addition to the local variables declared as local variables within the PERC method, it should use the AllocLocalPointers( ) macro (See subheading "AllocLocalPointers( )" later in this section).

2. Native methods: Like the virtual machine, each invocation of a native method must be preceded by the preparation of PERC stack activation frames. The format of the activation frames and the protocol for allocation of local pointers is exactly the same for native methods as for pvm( ).

3. Fast procedures: A fast procedure is a C function called by the pvm( ), native methods, or other fast or slow procedures, that is by design, not preemptible. Arguments to a fast procedure are passed on the C stack using traditional C argument passing conventions. Fast procedures should not attempt to access information placed on the PERC stacks by the calling context. (The current PERC implementation makes a non-portable exception to this rule in the implementation of the FastInvokeo macros described in Section 2.0.) This is because the code generated by a custom C compiler that is designed to support accurate garbage collection of C code may place information onto the PERC stacks that would obscure the data placed there by outer contexts.

4. Slow procedures: A slow procedure is a preemptible C function called by the pvm( ), native methods, or other slow procedures. In order to make the C function preemptible, it is necessary to coordinate with certain protocols:
   a. Before calling a slow procedure, all fast pointers that are considered to be live must be saved on the PERC pointer stack.
   b. Pointer arguments can be passed either on the PERC pointer stack or on the C stack (as regular arguments). Any live arguments passed on the C stack must be saved on the PERC pointer stack prior to calling another slow procedure or reaching a voluntary preemption point.
   c. Within the slow procedure, the PERC stack activation frames are established using the BuildFrames( ) macro described below.
   d. Immediately prior to returning from a slow procedure, a DestroyFrames( ) macro, described below, must be invoked.

AllocLocalPointers( ). The AllocLocalPointers( ) macro may be used only within the implementations of the pvm( ) and of native methods. If present, the AllocLocalPointers( ) macro must follow the last local declaration and precede the first line of executable code. The parameterization is as follows:

AllocLocalPointers(num_ptrs, first_local_offset, ptr_stack_growth, non_ptr_stack_growth); num_ptrs specifies the number of pointers for which space is to be reserved within the local activation frame. first_local_offset is an integer variable that is initialized by this macro to represent the location of the first local variable relative to the beginning of this function's activation frame. ptr_stack_growth and non_ptr_stack_growth represent the maximum additional stack expansion that might take place during execution of the corresponding stack (through push operations and/or the allocation of stack slots for outgoing arguments). The information provided by these last two arguments is used to perform stack overflow checking and to adjust the pointer stack high-water mark.

To find the offset of the top-of-stack entry within an activation frame that has no local pointers, use the following:

AllocLocalPointers(0, first_local_offset, ptr_stack_growth, non_ptr_stack_growth); See FIG. 62 for the implementation of this macro.

BuildFrames( ). The BuildFrames( ) macro is required in each slow procedure. This macro must follow the last local declaration and must precede the first line of executable code. The parameterization is as follows:
BuildFrames(num ptr_args,num_ptr_locals,ptr_stack_growth,
    num_non_ptr_args,num_non_ptr_locals, non_ptr_stack_growth);
num_ptr_args and num_ptr_locals represent the number of incoming pointer arguments and the number of local pointer variables respectively. These variables determine the amount by which the pfp and psp pointers must be adjusted in order to establish the pointer stack activation frame. ptr_stack_growth is the number of additional stack slots (beyond the slots set aside for locals and arguments) required on the pointer stack to support execution of this slow procedure. This variable is used to check for pointer stack overflow, if such a check is desired. num_non_ptr_args, num_non_ptr_locals, and non_ptr_stack_growth serve the same roles with respect to the non-pointer stack as the corresponding pointer stack variables.

Within a slow procedure, incoming arguments must be accessed using GetLocal( ) rather than Peek( ) macros. This is because the application programmer does not have full control over what items might be placed onto the run-time stacks. In some implementations, additional information will be pushed onto the stack after setting aside stack memory for locals but before beginning to execute the procedure's code. Thus, the offset that would be used to access particular information on the run-time stack using Peek( ) macros is implementation dependent, and is not readily available to the application code.

See FIG. 56 for the implementation of this macro.

DestroyFrames( ). Upon completion of a slow procedure, it is necessary to dismantle the activation frame that was constructed by the BuildFrames( ) macro. This operation removes all locals and incoming arguments from the corresponding run-time stack. In their place, it leaves the return value for this procedure. Note that the location and size of the return result depends on its type. Thus we need to parameterize the implementation of the DestroyFrames( ) macro:

DestroyFrames(num_pointers, num_non_pointers)
DestroyFrames( ) removes all but num pointers words from the pointer stack and all but num_non_pointers words from the non-pointer stack. Note that a DestroyFrames( ) invocation must occur on each control-flow path that reaches either the end of the function's body or a return statement. Prior to invocation of the DestroyFrames( ) macro, the application code should store the return value into the $0^{th}$ slot of the corresponding stack frame.

See FIG. 57 for the implementation of this macro.

PrepareJavaFrames( ). In preparation for calling the pvm( ), as is done within the invoke routines (invokeVirtual( ), invokeSpecial( ), invokeStatic( ), and invokeInterface( )) and within byte-code stubs, it is necessary to construct the activation frames for the PERC pointer and non-pointer stacks. This is done by executing the PrepareJavaFrames( ) macro, with parameters similar to what was described above for BuildFrames( ):

PrepareJavaFrames(num_ptr_args, num_ptr_locals, ptr_stack_growth, num_nonptr_args, num_nonptr_locals,nonptr_stack_growth)

The values passed as parameters to the PrepareJavaFrames( ) macro are determined by examining the corresponding fields of the Method structure that is to be invoked.

In order to use the PrepareJavaFrames( ) macro, the C function within which this macro is to be expanded must declare local integer variables named saved_pfp_offset and saved_npfp_offset.

See FIG. 58 for the implementation of this macro.

PrepareNativeFrames( ). In preparation for calling a native method, as is done within the invoke routines (invokeVirtual( ), invokeSpecial( ), invokeStatic( ), and invokeInterface( )) and within byte-code stubs, it is necessary to construct the activation frames for the PERC pointer and non-pointer stacks. This is done by executing the PrepareNativeFrames( ) macro, with parameters similar to what was described above for BuildFrames( ):

PrepareNativeFrames(num_ptr_args, num_nonptr_args)

The values passed as parameters to the PrepareNativeFrames( ) macro are determined by examining the corresponding fields of the Method structure that is to be invoked. Note that, unlike byte-code methods, the Method structure has no representation of the number of local variables or the amount of stack growth that will need to be supported during execution of the native method. Once inside the native method, local variables and additional stack growth is specified through the use of the AllocLocalPointers( ) macro described above.

In order to use the PrepareNativeFrames( ) macro, the C function within which this macro is to be expanded must declare local integer variables named saved_pfp_offset and saved_npfp_offset.

See FIG. 59 for the implementation of this macro. ReclaimFrames( ). Upon return from a native method or pvm( ), the activation frames constructed by PrepareJavaFrames( ) or PrepareNativeFrames( ) must be dismantled. This is implemented by the ReclaimFrames( ) macro, parameterized the same as DestroyFrames( ):

ReclaimFrames(num_pointers, num_non_pointers);

In order to use the ReclaimFrames( ) macro, the C function within which this macro is to be expanded must declare local integer variables named saved_pfp_offset and saved npfp_offset. Furthermore, these variables must have been initialized through expansion of a PrepareJavaFrames( ) or PrepareNativeFrames( ) macro prior to execution of the code expanded from the ReclaimFrames( ) macro.

See FIG. 60 for the implementation of this macro. AdjustLowWaterMark. Both ReclaimFrames( ) and DestroyFrames( ) make use of the AdjustLowWaterMark( ) macro, which is defined in FIG. 55. The purpose of this macro is to keep track of the lowest point to which the pointer stack has shrunk during execution of the current time slice. When this task is preempted, all of the pointers between the low-water mark and the current top-of-stack pointer are tended. By tending these pointers at preemption time, it is not necessary to enforce the normal write barrier with each update to the pointer stack.

6.0 The PERC Virtual Machine

The PERC Virtual Machine describes the C function that interprets Java byte codes. This C function, illustrated in FIG. 68, is named pvm( ). The single argument to pvm( ) is a pointer to a Method structure, which includes a pointer to the byte-code that represents the method's functionality. Each invocation of pvm( ) executes only a single method. To call another byte-code method, pvm( ) recursively calls itself. Note that pvm( ) is reentrant. When multiple Java threads are executing, each thread executes byte-code methods by invoking pvm( ) on the thread's run-time stack.

The implementation of pvm( ) allocates space on the PERC pointer stack for three pointer variables. These pointers, known by the symbolic names pMETHOD, pBYTECODF, and pCONSTANTS, represent pointers to the method's Method structure, the StringOfBytes object representing its byte code, and the constant-pool object representing the method's constant table respectively. During normal execution of pvm( ), the values of these variables are stored in the C locals method, bytecode, and cp respectively. Before preemption, and before calling preemptible functions, pvm( ) copies the contents of these C variables onto the PERC pointer stack. In preparation for executing the byte codes representing a byte-code method, pvm( ) checks to determine if the method has any exception handlers. If the method is synchronized, the lock will have been obtained by the fastInvokeo routine prior to calling pvm( ) (see FIG. 46). However, fastInvoke( ) does not set an exception handler to release the lock if the code is aborted by the raising of an exception. For this reason, pvm( ) sets an exception handler if the method is synchronized, so that it can release the lock before rethrowing the exception to the surrounding context.

SetJmp( ) (see FIG. 28) is our specialized version of the standard C setjmp( ) function. Note that the SetJmp( ) macro sets ret_value to 0 to indicate that this is a normal first-time invocation of SetJmp( ). If control returns to the body of SetJmp( ) because of a longjmp( ) invocation, ret_value will be set to a nonzero value to so indicate.

When an exception is caught, pvm( ) searches for the appropriate handler in its exception-handling table. This search proceeds as follows:

1. The current_method local variable is non-zero if and only if this pvm( ) invocation is currently executing. Each time pvm( ) calls another function, current_method is set to 0. When the function returns, current_method is set to 1. The purpose of this variable is to determine whether a caught exception was thrown by this pvm( ) invocation or by some other function which had been called by pvm( ). If the exception was thrown by pvm( ), next_pc_offset is not valid and must be computed from the current value of next_c. See FIG. 68.
2. The next pc_offset variable, which represents the byte offset within the current method's byte code of the next instruction to be executed within this method, is passed to findExceptionHandler( ).
3. findExceptionliandler( ) searches within the current method's exception table for the exception handler that corresponds to the current execution point within the method's byte code.
4. If an exception handler is found, pvm( ) sets next_pc to point to the byte code that represents the exception handler. It then pushes the caught exception onto the stack and falls through the interpreter, which proceeds to execute the exception handling code.
5. If no exception handler is found, pvm( ) first releases the monitor lock if this method was synchronized and then it rethrows the exception to the surrounding exception handling context.

The interpreter loop of pvm( ) repeatedly fetches the next instruction to be executed and performs the work requested by that instruction. Note that FIG. 68 omits the body of the switch statement. This is because the switch statement is very large and most of the cases are very straightforward. Selected cases are illustrated and discussed below.

The IADD instruction removes the top two elements from the non-pointer stack, both of which are known to represent integers, adds these two integer values, and stores the sum onto the top of the same stack. This is illustrated in FIG. 69.

The AASTORE instruction removes from the pointer stack a reference to an array and a reference to an object to be inserted into an array, and removes from the non-pointer stack an integer index representing the position within the array that is to be overwritten with the new value. This instruction makes sure that the array subscript is within bounds and makes sure that the value to be inserted into the array is of the proper type. Then it stores the reference into the array at the specified index position, as illustrated in FIG. 70.

The FCMPL instruction removes the top two elements from the non-pointer stack, both of which are known to represent floating point numbers, compares these two values, and stores an integer representing the result of comparison onto the same stack. The result is encoded as 0 if the two numbers are equal, −1 if the first is less than the second, and 1 if the first is greater than the second. The implementation of FCMPL, is illustrated in FIG. 71.

The IFEQ instruction (See FIG. 72) branches to the byte-code instruction obtained by adding the two-byte signed quantity which is part of the instruction encoding to the current value of the program pointer if the top of the non-pointer stack, which is known to represent an integer, holds the value 0. Note that the PVMPreemptionPointo macro appears before the break statement. pvm( ) allows itself to be preempted at this point. In general, pvm( ) considers each byte-code instruction which may cause control branching to be a preemption point. This guarantees that there is at least one preemption point in each byte-code loop.

The JSR instruction (See FIG. 73) jumps to a subroutine by branching to the byte-code instruction obtained by adding the two-byte signed quantity which is part of the instruction encoding to the current value of the program counter and pushing the return address onto the non-pointer stack. Note that the return address is represented as the integer offset within the current method's byte code rather than an actual pointer. This is because the garbage collector does not deal well with pointers that refer to internal addresses within objects rather than to the objects' starting addresses. Note also that the JSR instruction also invokes the PVMPremptionPoint( ) macro.

The RET instruction (See FIG. 74) returns from a subroutine by fetching the return address from the local integer variable found at the offset specified by the byte-code instruction's one-byte immediate operand. The return address is represented as an offset within the byte-code method, so it is converted into an actual instruction address by using the GetPC( ) macro. Note also that the RET instruction invokes the PVMPreemptionPoint( ) macro.

The TABLESWITCH instruction (See FIG. 75) is used to efficiently implement switch statements in which most of the various cases are represented by consecutive integers. The immediate-mode operands of this instruction are encoded as (1) padding to align the next operand at an address that is a multiple of 4 bytes, (2) a low integer value representing the first integer in the range of cases, (3) a high integer value representing the last integer in the range of cases, (4) the integer representing the byte-code offset of the code that represents the default case, and (5) (high+1−low) integers representing the byte-code offsets of the code that implements each of the cases. This instruction removes the top entry, which is known to be an integer, from the non-pointer stack and uses this value to index into the branch table in order to compute the address of the next instruction to be executed. Note that TABLESWITCH invokes the PVMPreemptionPoint( ) macro.

The LOOKUPSWITCH instruction (See FIG. 76) is used to implement switch statements in which the cases are not consecutive integers. The immediate-mode operands of this instruction are encoded as (1) padding to align the next operand on an address that is a multiple of 4 bytes, (2) an integer representing the total number of cases, (3) the integer representing the byte-code offset of the code that represents the default case, and (4) pairs of key values combined with instruction offsets for each of the cases identified in field number 2. This instruction removes the top entry from the non-pointer stack, which is known to be an integer, and searches for this value among the cases represented in its encoding. Note that LOOKUPSWITCH invokes the PVMPreemptionPoint( ) macro.

The IRETURN instruction (See FIG. 77) is used to return an integer from the currently executing method. This instruction pops the integer value to be returned from the top of the non-pointer stack and stores the integer value into the 0th slot of the non-pointer stack's current activation frame. Then it breaks out of the interpreter loop by using a goto statement.

The GETSTATIC_QNP8 instruction (See FIG. 78) gets an 8-bit non-pointer value from the static area of the class corresponding to the field that is stored in the constant-pool table at the offset specified by this instruction's one-byte immediate-mode operand. The value fetched from the static field is pushed onto the non-pointer stack.

The PUTFIELLD_Q instruction stores a value (provided on one of the PERC stacks) into the specified field of a particular object. A pointer to the object that contains the field is passed on the pointer stack. The two-byte immediate operand of this instruction indexes into the constant pool to find a 4-byte integer value. This integer value encodes the offset of the field within the object as the least significant 29 bits, an encoding of the number of bits to be updated if the field is not a pointer in the next two most significant bits, and a flag distinguishing pointer fields in the most significant bit. The implementation of this instruction is illustrated in FIG. 79.

The INVOKEVIRTUAL_FQ instruction (See FIG. 80) invokes a virtual function. The method-table index is encoded as the first immediate-mode byte operand and the number of pointer arguments is encoded as the second immediate-mode byte operand. Note that most of the work associated with invoking the virtual method is performed by the FastInvokeVirtual( ) macro, which is illustrated in FIG. 45. Note also that pvm( ) saves and restores its state surrounding the method invocation.

The implementation of INVOKESPECIAL_Q (See FIG. 81) closely resembles INVOKEVIRTUAL_Q. The method to be invoked is obtained by fetching the constant-pool entry found at the index position identified by the two-byte immediate operand of this instruction. INVOKESTATIC_Q (See FIG. 82) is encoded the same as INVOKESPECIAL_Q. The implementation is very similar.

Invocation of interfaces is performed by the INVOKEINTERFACE_Q instruction (See FIG. 83). Invoking interfaces is inherently more complicated than the other forms of invocation because the method table of the target object must be searched for a method with a matching name and signature. It is not generally possible to map the name and signature to an integer index prior to execution of the instruction. The immediate-mode operands to this instruction are (1) a one-byte index into the constant pool table to obtain a pointer to a method that has the desired name and signature, (2) a one-byte operand representing the number of pointer arguments passed to the interface method, and (3) a one-byte guess as to the offset within the target object's method table at which the target method will be found. See the definition of the FastInvokeInterface( ) macro in FIG. 45.

The NEW_Q instruction (See FIG. 84) allocates a new object. This instruction takes a two-byte immediate-mode operand, which is an index into the constant pool. The corresponding entry within the constant pool is a pointer to the Class object (See FIG. 16) that describes the type of the object to be allocated. The newly allocated object is pushed onto the pointer stack.

The NEWARRAY instruction (See FIG. 85) allocates a new array of non-pointer data. The type of the non-pointer data is encoded as a one-byte immediate-mode operand to the instruction. The size of the array is passed as an integer on the non-pointer stack. The newly allocated array is pushed onto the pointer stack.

The ANEWARRAY_Q instruction (See FIG. 86) allocates a new array of pointers. The type of the array entry is encoded as a two-byte immediate-mode operand which indexes into the constant-pool table to obtain a pointer to the corresponding Class object. The size of the array is passed as an integer on the non-pointer stack. The newly allocated array is pushed onto the pointer stack.

The ATHROW instruction (See FIG. 87) throws the exception object that is on the top of the pointer stack. Note that this instruction causes control to longjmp out of the current pvm( ) activation. Where the exception is caught, the stacks will be truncated to the appropriate heights. Thus, it is not necessary to pop the thrown exception.

The CHECKCAST_Q instruction (See FIG. 88) ensures that the top pointer stack element is of the appropriate type, where appropriate type is defined to mean that the type of the stack element is derived from the "desired" type. If it is not, this instruction throws an exception. The desired type is encoded as a two-byte immediate-mode operand which indexes into the constant-pool table to obtain a pointer to the Class object that represents the desired type. Note that the NULL value is considered to match any reference type. If the top pointer stack value is of the appropriate type, the value is left on top of the pointer stack.

The INSTANCEOF_Q instruction (See FIG. 89) removes the top pointer stack element and checks to see if it is of the appropriate type, where appropriate type is defined to mean that the type of the stack element is the "desired" type. If it is, this instruction pushes a 1 onto the non-pointer stack. If it isn't, this instruction pushes a 0 onto the non-pointer stack. The NULL value is considered to be of the appropriate type. The desired type is encoded as a two-byte immediate-mode operand which indexes into the constant-pool table to obtain a pointer to the Class object that represents the desired type.

The MONITORENTER instruction (See FIG. 90) removes the object reference on the top of the pointer stack and arranges to apply a semaphore-like lock on that object. If the object is already locked by another thread, the current thread is put to sleep until the object becomes unlocked. Note that the pvm( )'s state is saved and restored surrounding the call to the enterMonitor( ) function, because that call may result in preemption of this thread. Note that if the entry on the top of the pointer stack is NULL, this instruction throws an exception. The MONITOREXIT instruction (See FIG. 91) removes the object reference on the top of the pointer stack and arranges to remove its semaphore-like lock on that object. If the object has been locked multiple times by this thread, this instruction simply decrements the count on how many times this object has been locked rather than removing the lock. As with the MONITORENTER instruction, pvm( )'s state is saved and restored surrounding the call to the exitMonitor( ) function and this instruction throws an exception of the top of the pointer stack is NULL.

6.1 Exception Handling

Within pvm( ), exception handling is implemented using setjmp( ) and longjmp( ) services. Each exception handling context sets a jump buffer. When an exception is raised, this is implemented by executing a longjmp( ) to the most recently established jump buffer. The exception handler associated with this jump buffer checks the thrown exception to see if the handler is capable of handling exceptions of this type. If so, the handler takes care of the exception. Otherwise, the handler rethrows the exception to the surrounding exception handling context.

Note that the PERC virtual machine maintains several stacks. Thus, it is necessary to augment the traditional C jump buffer data structure with the additional fields necessary to represent this information. The supplementary information includes:

1. The current values of the pointer stack and frame pointers.
2. The current values of the non-pointer stack and frame pointers.
3. The explicitly saved value of the C stack pointer, for situations in which the exception handling context is established from within JIT-compiled code. While JIT-compiled code is executing, the C stack is not used, and the value of the C stack pointer is held in a special field of the corresponding Thread object.
4. A pointer to the surrounding exception handling context. The special supplemental information fields are stored within the PERCEnvironment data structure, which is illustrated in FIG. 26.

The SetJmp( ) macro (See FIG. 28) initializes appropriate fields of the PERCEnvironment data structure and then calls the C setjmp( ) function. UnsetJmp( ) (See FIG. 29) has the effect of removing the most recently established exception handling context. Following execution of UnsetJmp( ), whatever exception handling context had been active at the moment this context was established once again becomes the active context. The LongJmp( ) macro (See FIG. 30) takes responsibility for calling longjmp( ) in addition to setting other state variables as appropriate. The throwException( ) function (See FIG. 92) invokes LongJmp( ), but only after first verifying that an exception handling context exists. If there is no current exception handling context, throwException( ) calls the topLevelExceptionHandler( ) routine.

6.2 Hash Values and Monitors

In concept, every Java object has an associated lock and an associated hash value. However, in practice, the large majority of Java objects never make use of either the lock or the hash value. Note that in systems that never relocate objects, converting an object's address to an integer value is probably the easiest way to obtain a hash value. However, in systems that make use of defragmenting garbage collectors, such as in the PERC execution environment, it is necessary to use some other technique to represent hash values.

In the PERC implementation, every object has a HashLock pointer field, which is initialized to NULL. When either a lock or a hash value is needed for the object, a HashLock object (see FIG. 20) is allocated and initialized, and the HashLock pointer field is made to refer to this HashLock object. Note that each HashLock object has the following fields:

1. The hash_value field is non-zero if and only if a hash value has been assigned to the corresponding object.
2. The u field is a union which can represent either a pointer to another HashLock object (in case this HashLock object is currently residing on a free list), or a pointer to the thread that owns this semaphore if the lock is currently set, or NULL if this object is not currently on a free list and the lock is not currently set.
3. In case this semaphore is currently locked, waiting_list points to a linked list of threads that are waiting for access to the locked object. The list is maintained in priority order.
4. In case this semaphore is currently locked, count represents the number of times the lock-holding thread has redundantly placed its lock on the corresponding object. The semaphore will not be released until this thread has removed its lock this many times. If the semaphore is not currently locked, count is zero.

Obtaining a hash value. When application code desires to obtain the hash value of a particular object, it invokes the native hashCode( ) method. This method consults the object's lock field. If this field is NULL, this method allocates a HashLock object, initializes its hash_value field to the next available hash value, and initializes the object's lock pointer to refer to the newly alocated HashLock object. Then it returns the contents of the hash_value field. If the lock field is non-NULL, hashCode( ) consults the hash_value field of the corresponding HashLock object to determine whether a hash value has already been assigned. If this field has value 0, hashCode( ) overwrites the field with the next available hash value. Otherwise, the hash value has already been assigned. In all cases, the last step of hashCode( ) is to return the value of the hash_value field.

In determining the next available hash value, hashCode( ) first consults its list of previously assigned hash values for which the corresponding objects have been reclaimed by the garbage collector. (Once an object has been reclaimed by the garbage collector, its hash value can be reused.) If this list is non-empty, hashCode( ) assigns one of these hash values. Otherwise, it increments a static counter and uses its incremented value as the new hash value.

Obtaining and releasing monitor locks. When application code desires to enter a monitor, it executes the enterMonitor instruction. This instruction first consults the object's lock field. If this field is NULL, it allocates a HashLock object, initializes its count field to 1, sets its u.owner field to represent the current thread, and grants access to the newly locked object. If the lock field is non-NULL, enterMonitor examines the contents of the HashLock object to determine whether access to the lock can be granted. If the count field equals 0, or if the u.owner field refers to the currently executing thread, the count field is incremented, the u.owner field is made to point to the current thread if it doesn't already, and access is granted to the newly locked object. Otherwise, this lock is owned by another thread. The current thread is placed onto the waiting_list queue and its execution is blocked until the object's lock can be granted to this thread. Priority inheritance describes the notion that if a high-priority thread is forced to block waiting for a low-priority thread to release its lock on a particular object, the low-priority thread should temporarily inherit the priority of the higher priority blocked task. This is because, under this circumstance, the urgency of the locking task is increased by the fact that a high-priority task needs this task to get out of its way. The PERC virtual machine implements priority inheritance. Furthermore, the waiting_list queue is maintained in priority order.

When a thread leaves a monitor, it releases the corresponding lock. This consists of the following steps:

1. Verifying that the monitor's u.owner field is the same as the currently executing thread. Otherwise, this is an invalid request to exit the monitor.
2. Decrementing the count field. If the new value of count, following the decrement operation, is non-zero, this is all that must be done. Otherwise, continue by executing the steps that follow.
3. If the waiting_list queue is not empty, remove the leading (highest priority) entry from the queue. Make this the new u.owner of the lock and set the count field to 1. This is all that must be done. Stop. If the waiting_list queue is empty, continue with step 4.
4. Otherwise, there is no longer a need to maintain this lock. Set the u.owner field to NULL.
5. If the HashLock object's hash value field is non-zero, we must retain this HashLock object. In this case, we're done. Otherwise, continue by executing the following step.
6. Set the corresponding object's lock field to NULL and place this HashLock object onto a list of available HashLock objects, threaded through the u.next field. Whenever a new HashLock object is required, allocate from this free list if possible. Otherwise, allocate and initialize a new dynamic object.

7.0 Support for Multiple Threads

In PERC, a thread is an independent flow of control and an independent set of run-time stacks. PERC supports multiple threads, meaning that multiple threads can be executing concurrently. On a single processor implementation of PERC, such as is described here, the independent threads take turns running on the system's CPU. This section describes the special implementation techniques that are required to support multiple threads.

7.1 Representation of Threads

Each thread is represented by a Thread object which includes instance variables representing the critical state information associated with the thread (See FIG. 36). One of the instance variables points to the jump buffer (PERCEnvironment) of the currently active exception handler context. Each thread maintains three stacks, one to represent C activation frames, one to represent non-pointer PERC arguments and local variables, and a third to represent PERC pointer arguments and local variables. JIT-generated code uses only the two PERC stacks. While executing JIT-generated code, the C stack pointer is stored in a Thread field so that the machine's stack-pointer register can refer to the non-pointer PERC stack. We desire to allocate small stacks so as to conserve memory. This is especially important for applications comprised of large numbers of threads. For reliability, we provide stack overflow checking and, in some cases, the capability of expanding stacks on the fly as necessary.

We say that the C stack segments contain no pointers, but this is not entirely true. Since the C activation frame contains return addresses, the stack contains pointers to code. And since the activation frame includes saved registers, it probably contains the saved values of frame and stack pointers. To avoid the complications and efficiency hits that would be associated with the handling of these pointers by a relocating garbage collector, we require stack segments to be non-moving, except for one exception which is discussed below.

The C stack may also contain pointers to heap objects which were saved in registers or local variables within particular activation frames. The usage protocol requires that such variables be treated as dead insofar as the garbage collector is concerned.

Figure 1:
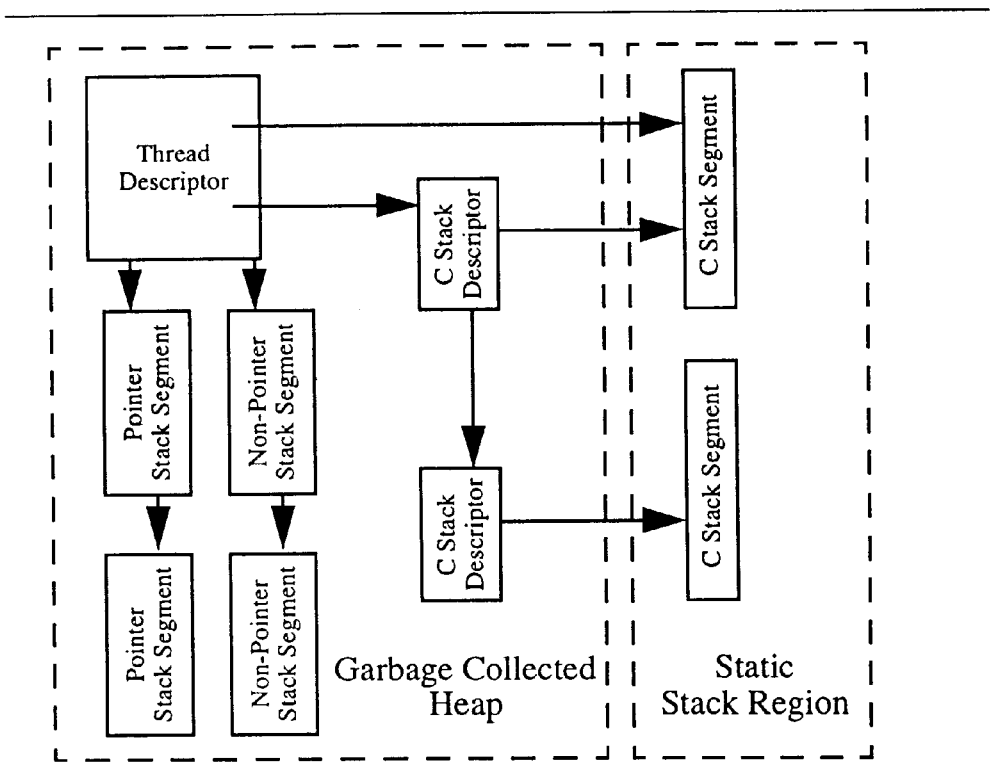
FIG. 1 illustrates the organization of thread memory, with each thread comprised of a C stack, and pointer stack, and a non-pointer stack, and each stack represented by multiple stack segments

All three kinds of stacks are represented by multiple stack segments. In general, each run-time stack is allowed to expand on the fly as necessary. Expansion occurs whenever a stack overflow is detected. Expansion consists of allocating a new stack segment, copying that portion of the original stack segment that is necessary to establish an execution context on the new stack segment (the incoming parameters, for example), adjusting links to represent the addition of the new stack segment and setting the corresponding stack pointer(s) to their new values. The data structures are illustrated in FIG. 1.

Stack overflow checking and expansion is greatly simplified by the presence of MMU hardware. Each of the three stacks associated with every thread can be represented as a number of virtual memory pages with only the first page initially allocated and all other pages unallocated and marked as inaccessible. When the corresponding stack expands into the unallocated region the fault handler allocates and maps a new stack page. Once allocated, stack pages are not discarded until the thread terminates.

The sample implementation characterized by this invention disclosure uses operating system provided stack overflow checking and stack expansion for the C stack, and uses explicit software overflow checks for the PERC pointer and non-pointer stacks. The C stack overflow checking is performed using memory management hardware.

7.2 Thread Dispatching

In general, the PERC virtual machine is intended to support many more priority levels than might be supported by an underlying operating system. Further, the design of the real-time application programmer interface (API) is such that task dispatching cannot be fully relegated to traditional fixed priority dispatchers. Thus, the PERC virtual machine implements its own task dispatcher which communicates with an underlying thread model. To support this architecture, we use three priority levels, as follows:

1. At the highest priority, we run the task dispatcher. Most of the time, this thread is sleeping. However, it may be triggered by one of the following:
   a. The sleep timer may expire, indicating that the currently executing task should be suspended so that another task can run.
   b. An interrupt trigger may arrive, indicating that it is necessary to preempt the currently executing task so that a sporadic task can be executed (Of course, the dispatcher takes responsibility for making sure that the corresponding sporadic task has a higher conceptual priority than the currently executing task before preempting the currently executing task.)
   c. If the most recently dispatched task blocks on an I/O request, the watchdog task (described below) will send a wakeup signal to the dispatcher. When a dispatched task blocks, the dispatcher sets its status to suspended (not ready to run). Later, when the dispatcher next decides to give this task a chance to run, it sets the status to ready to run and dispatches it. If the I/O request is still blocked, the watchdog will once again send a wakeup signal to the dispatcher and the dispatcher will once again set this application task's status to suspended.
2. Application tasks run at a medium priority. The dispatcher is careful to make only one application task at a time ready to run. Thus, the PERC dispatcher can support multiple priority levels by simply deciding which application task to make ready to run.
3. A watchdog task runs at the lowest priority. This is the only task that runs at this priority. In theory, the only time the watchdog runs is when the user thread that is scheduled for execution blocks. So the watchdog's sole responsibility is to notify the dispatcher that the application thread has gone to sleep. In response, the dispatcher will schedule another thread for execution.

Note that each PFRC thread needs to maintain its own versions of the global _psp, _pfp, _npsp, and _npfp variables. When a task is preempted, the dispatcher saves this information into the thread's state variables. Upon resumption, the thread restores these state variables from the saved thread information. In order for this protocol to work, it is necessary to give special consideration to execution of the watchdog and dispatcher threads:

1. The watchdog task is written entirely in C. Thus, it does not make use of the PERC stack and frame pointer variables.
2. The dispatcher task is written partially in PERC. However, it is very important that the portion of the dispatcher that responds to asynchronous "interrupts" from the watchdog task and the alarm timer be written in C. The dispatcher can only use its PERC stacks during times when it is sure that the most recently dispatched PERC task is blocked and/or suspended.

7.3 Implementation of Thread Dispatcher

The Java implementation of the TaskDispatcher class is illustrated in FIG. 53. This class is represented by a combination of Java and native methods. The native methods provide an interface to services provided by the underlying operating system. Note that TaskDispatcher extends Thread.

7.3.1 Construction of TaskDispatcher

When the TaskDispatcher object is instantiated, the constructor invokes the initDispatcher( ) native method, illustrated in FIG. 54. This invention disclosure describes the implementation for the Microsoft Windows WIN32 API. The initDispatcher( ) method performs the following:

1. Registers as root pointers _gc_thread and _dispatcher_thread. These static variables identify the Thread objects that govern the garbage collection thread and the real-time dispatcher thread respectively.
2. Sets the _dispatcher_thread variable to refer to this newly instantiated TaskDispatcher object.
3. Creates a WIN32 event for communication between the watchdog task (described immediately below) and the dispatcher task.
4. Creates a watchdog thread using a WIN32 CreateThread call.
5. Sets the watchdog thread's priority to THREAD_PRIORITY_LOWEST. The purpose of the watchdog thread is to determine when the most recently scheduled Java thread has gone to sleep or been blocked. When this happens, the watchdog thread will begin to run and it will notify the dispatcher that the most recently dispatched Java thread is no longer running.
6. Sets the dispatcher thread's priority to THREAD_PRIORITY_TIME_CRITICAL. This is a high priority, signifying that whenever the dispatcher is ready to run, this thread should be allowed to run.

7.3.2 Running the TaskDispatcher

The implementation of TaskDispatcher.run( ) makes use of the nrt_ready_q object. This is a static field inherited from Thread. The field represents the queue of threads that are ready to run.

When the TaskDispatcher's run method is invoked (automatically by the PERC run-time system since TaskDispatcher extends Thread), we perform the following:

1. Invoke the startDispatcher( ) native method (See FIG. 54). This native method resumes the watchdog thread, allowing it to begin running. This is necessary because when the watchdog thread was originally created, it was configured to be in a suspended state.
2. startDispatcher( ) returns as a Java integer a Boolean flag which indicates whether garbage collection is enabled. In normal operation, garbage collection is always enabled. However, the system supports an option of disabling garbage collection so as to facilitate certain kinds of debugging and performance monitoring analyses.

3. Repeatedly:
   a. Check nrt_ready_q to determine if all non-demon threads have terminated. If so, we shut the virtual machine down.
   b. Select the next thread on the ready queue. A side effect of executing nrt_ready_q.getNextThread( ) is to place the thread at the end of the ready queue (for its next scheduled execution).
   c. Executing the selected thread for a 25 ms time slice by calling the runThreado native method (See FIG. 54).

Note that implementation of task priorities is provided by the nrt_ready_q object. Its getNextThread( ) method always returns the highest priority thread that is ready to run. Note also that it would be straightforward to modify this code so that the duration of each thread's time slice is variable. Some thread's might require CPU time slices that are longer than 25 ms and others might tolerate time slices that are shorter. runThread( ) (See FIG. 54) performs the following:

1. Obtains the operating system handle of the thread to be executed. This is represented by the handle field of the Thread object.
2. Saves the Java state of the executing dispatcher thread by executing the SaveThreadState( ) macro (See FIG. 44).
3. Switches the PERC state to the newly scheduled task by setting _current_thread to refer to the specified thread and executing the RestoreThreadState( ) macro (See FIG. 44).
4. Resumes execution of the watchdog task by invoking the ResumeThread WIN32 call. Note that the watchdog task is at a lower priority than the dispatcher, so the dispatcher will continue to run.
5. Resumes execution of the newly scheduled task by invoking the ResumeThread WIN32 call.
6. Puts the dispatcher to sleep, waiting for one of two things to happen by executing the WaitForSingleObject( ) WIN32 call. The two events that wake the task are:
   a. An event is triggered by the watchdog task, or by the task executing its relinquish( ) method (See FIG. 54). This event will be triggered if the dispatched task blocks (on I/O or sleep, for example).
   b. The system routine times out after time_slice ms.
7. If WaitForSingleObject( ) was timed out, the dispatcher's next responsibility is to preempt the currently executing task. If the task is currently running JIT code and it is not in the body of an atomic statement, it is already in a preemptible state. In other cases, preemption must be delayed until the task reaches a point outside of atomic statements at which garbage collection would be valid. The protocol consists of:
   a. Setting the global_preemption_flag variable to true.
   b. Waiting for the thread to either block or to voluntarily preempt itself (See relinquish( ) in FIG. 54, PreemptTask( ) in FIG. 43, and exitAtomic( ) in FIG. 97).
   c. Clearing the global_preemption_flag variable to prepare for the next scheduled task execution.
8. Suspends the dispatched task.
9. Suspends the watchdog task.
10. Saves the new state of the dispatched task.
11. Sets the global _current_thread pointer to refer to the dispatcher task.
12. Restores the state of the dispatcher task (and returns to the Java method that invoked the native runThread( ) method.

7.4 Thread Stacks and Stack Overflow Checking 7.4.1 Run-Time Stacks

When a new thread is created, the system allocates a C stack, a PERC non-pointer stack, and a PFRC pointer stack. The size of the C stack is determined as a run-time option (specified on the command line if the virtual machine is running in a traditional desktop computing environment). The size of the PERC pointer and non-pointer stacks is specified by compile-time macro definitions, defined to equal 1024 words per stack.

Checking Overflow of the C Stack. The most efficient technique for detecting overflow of the C stack is to use hardware memory protection of the virtual memory pages beyond the end of the allocated stack region. The memory fault handler can either abort the thread because of stack overflow or it can enlarge the stack by mapping a newly allocated virtual memory page to the stack overflow address.

In the absence of hardware memory management protection, overflow checking for the PERC stacks can be incorporated into the implementations of the BuildFrames( ), PrepareJavaFrames( ), and AllocLocalPointers( ) macros, as shown in FIG. 56, FIG. 58, and FIG. 62.

A compile-time constant represents a threshold test for proximity to the PERC stack overflow conditions (See P_SAFETY_PADDING and NP_SAFETY_PADDING in FIG. 55). Within the BuildFrames( ), PrepareJavaFrames( ), and AllocLocalPointers( ) macros, we test whether the current stack pointer is within this threshold of overflowing the corresponding stack. If so, we immediately create a new stack frame for execution of this procedure by:

1. Allocating a new static stack segment
2. Copying whatever information is necessary in order to construct a complete stack frame on the new stack segment.
3. Recursively calling this same procedure by way of a trampoline function which is responsible for restoring the stack to "normal" upon return from the recursive invocation. Note that certain code sequences may result in "thrashing" of the stacks in the sense that every time we call a particular procedure, we grow the stack and every time the procedure returns, we shrink it. If we end up in a loop that repeatedly calls this procedure, we will find ourselves spending too much time managing the stack growth. A solution to this problem is to keep track of how frequently particular stacks need to be expanded. If a particular stack is expanded too frequently, then we will consider it worth our while to expand the stack contiguously. Contiguous expansion of the stack consists of creating a single larger stack segment that is large enough to represent multiple C stack segments and copying the first C stack segment onto this new stack. While copying the stack data, it is necessary to adjust stack pointers that refer to the stack. Primarily, this consists of the frame pointer information that might be stored on the C stack.

7.5 Voluntary Preemption of Native Code

So-called fast pointers refer directly to the corresponding memory objects using traditional C syntax. Fast pointers are stored on the traditional C stack or in machine registers. They are not scanned by the garbage collector. Thus, it is very important to make sure that garbage collection occurs at times that are coordinated with execution of application threads. (If the garbage collector were to relocate an object "while" an application thread was accessing that object by way of a fast pointer, the application thread would become confused.) Each application thread is responsible for periodically checking whether the system desires to preempt it. The following macro serves this purpose:

CheckPreemption( )

CheckPreemption( ) returns 1 if it is necessary to preempt this task and 0 otherwise. See FIG. 43 for the implementation of this macro.

The typical usage of CheckPreemption( ) is illustrated in the following code fragment (See FIG. 43 for the implementation of the PreemptTask( ) macro):

```
if (CheckPrecmption( )) {
SetLocalPtr(x, xf);
PreemptTask( );
xf=(struct baz *) GetLocalPtr(x);
}
```

Note that each time we preempt a task, we must be prepared to save and restore all of the fast pointers that are currently in use. However, in cases where a particular pointer variable is known to have been saved to the stack already, and has not been modified since it was last saved to the stack, it is possible to omit the save operation. The purpose of copying fast pointers into "local" pointer variable slots is to make them visible to the garbage collector. After the task has been preempted, the application task's fast pointers may no longer be valid. Thus, the application task must restore the fast-pointer variables by copying their updated values from the local pointer variables.

The main purpose of PreemptTask( ) is simply to notify the real-time executive that this task has reached a GC-safe execution point. Additional responsibilities include:

1. Storing the offsets relative to the corresponding stack bases of _psp, _pfp, _npsp, _npfp into the thread's state variables before the thread is preempted.
2. Rescanning all of the PERC stack pointer's data found between the stack's low-water mark and the current stack pointer. Then set the low-water stack mark to refer to the current stack activation frame. (The last of these two operations may be postponed until after this thread is resumed.)
3. Restoring the values of _psp, _pfp, _npsp, and _npfp from the saved thread state variables after the thread is resumed.
4. Checking to see whether an exception was "thrown" to this thread while it was preempted. If so, the exception is thrown by the PreemptTask( ) macro to the corresponding exception handler.

7.5.1 Blocking Function and I/O System Calls

Note that PERC threads may be suspended for one of several reasons:

1. The underlying time slice machinery so requests, or
2. A blocking I/O or mutual exclusion request requires the task to be put to sleep
3. The thread may be suspended, either at its own request or at the request of some other thread in the system.
4. The thread may request that it sleep for a period of time.

In the first case, the protocol described immediately above ensures that local variables are in a consistent state at the moment the task is preempted. To handle the second case, we require that any C code in the run-time system that calls a non-fast function consider all of its fast pointers to have been invalidated by invocation of the non-fast function. Further, we require that the invocation of blocking system calls be surrounded by the PrepareBlockCall( ) and ResumeAfterBlockCall( ) macros, as shown below:

PrepareBlockCall( );
read(fd, buf, 128); //Note that buf must refer to static (non-relocatable) memory
ResumeAfterBlockCall( );

The purpose of PrepareBlockCall( ) is to:

1. Set the thread's execution status to MAY_BLOCK.

See FIG. 43 and FIG. 44 for the implementation of the PrepareBlockCall( ) macro.

The purpose of ResumeAfterBlockCall( ) is to:

1. Sets the thread's status to RUNNING.
2. Checks a thread state variable to see if an asynchronous exception was sent to this thread while it was blocked. If so, the macro throws the exception.

See FIG. 43 and FIG. 44 for the implementation of the ResumeAfterBlockCall( ) macro.

What if the dispatcher awakes to trigger a preemption immediately after the task has blocked, but before the watchdog has notified the dispatcher that the most recently dispatched task blocked on an I/O request? In this case, the dispatcher would set the task's thread state to indicate that a preemption is requested. Then the dispatcher would wait for the task to preempt itself. If the task continues to be blocked, the watchdog will notify the dispatcher that the task is now blocked, and the dispatcher will retract its preemption request and mark the thread as having been blocked. If, on the other hand, the task becomes unblocked after the dispatcher awakes but before the watchdog has a chance to complete its notification of the dispatcher that this task had been blocked, the watchdog will not complete its notification of the dispatcher and the dispatcher will never know the task was ever blocked. The task will be allowed to continue execution up to its next preemption point before it is preempted.

7.5.2 Interface to System Libraries

Native libraries are implemented according to a protocol that allows references to dynamic objects to be automatically updated whenever the dynamic object is relocated by the garbage collector. However, if these native libraries call system routines which do not follow the native-library protocols, then the system routines are likely to become confused when the corresponding objects are moved. To avoid this problem, programmers who need to pass heap pointers to system libraries must make a stable copy of the heap object and pass a pointer to the stable copy. The stable copy should be allocated on the C stack, as a local variable. If necessary, upon return from the system library, the contents of the stable copy should be copied back into the heap. Note that on uniprocessor systems a non-portable performance optimization to this strategy is possible when invoking system libraries that are known not to block if thread preemption is under PERC's control. In particular, we can pass the system library a pointer to the dynamic object and be assured that the dynamic object will not be relocated (since the garbage collector will not be allowed to run) during execution of the system library routine.

8.0 Dynamic Memory Management 8.1 Memory Organization

All of real memory is divided into multiple fixed size segments of 512 Kbytes each. These segments are partitioned into a static region and a heap region. At run time, segments can be repartitioned.

1. The static region represents memory that is not relocated by the garbage collector. In general, this region comprises C stack segments for use by threads, segments of code produced by the JIT compiler, and stubs for byte-code and native methods.

2. The heap region comprises all of the remaining memory, which is divided into N equal-sized demispaces.

8.2 Representation of JIT-Generated Code

We intend for byte codes to be stored as part of the dynamic heap. This means they will be relocated as necessary on demand. However, the results of JIT compilation are stored in static memory. Note that each JIT-translated method is represented by a Method object which is stored in the garbage collected heap. The finalize( ) method for the Method object explicitly reclaims the static memory that had been reserved for representation of the method's JIT translation.

8.3 Global Pointer Variables (Roots)

All global root pointers must be registered so that they can be identified by the garbage collector at the start of each garbage collection pass. These root pointers are independently registered using the RegisterRooto macro, prototyped below. Each root pointer must be registered before its first use.

void RegisterRoot(void **rootAddr);

8.4 Static Memory Allocation

There are two static memory segments supported by our run-time system. Static memory segments are never relocated and are not currently garbage collected. The static data region represents the code produced by the JIT translator, native-method and byte-code-method stubs, and C stacks.

8.4.1 Code Segment Memory

To allocate code segment memory for the JIT translation of byte codes, for byte-code stubs, and for dynamically constructed shared signatures, use allocCS( ), prototyped below:

void *allocCS(int num_bytes);

allocCS_returns a word-aligned segment of memory containing at least num_bytes bytes. To deallocate this memory, call freeCS( ), passing as its single argument the void * that was returned by allocCS( ).

8.5 Heap Memory Allocation

This section describes the special techniques that are used to implement allocation of objects within the garbage collected heap. Every newly allocated object can be assumed to contain all zeros.

8.5.1 Run-time Type Signatures

Each heap-allocated object must be identified so that the garbage collector can determine which of its fields contain pointers. The standard technique for identifying pointers within heap objects is to provide a signature for each object. The signature pointer occupies a particular word of each object's header (See FIG. 2).

The signature structure is illustrated in FIG. 32. The total_length field counts the total number of words in the corresponding object. The type_code field comprises two kinds of information: a four-bit code identifying the kind of object and a twenty-eight-bit integer that identifies the word offset of the last pointer contained within this object. If there are no pointers contained within the object, the word offset has value zero. The most significant bit of type_code is set to indicate that the corresponding object needs to be finalized. The next three most-significant bits encode the kind of object, as represented by the preprocessor constants in FIG. 33. These special constants are manipulated using the macros provided in FIG. 34.

Within the signature structure, bitmap is an array of bits with one bit representing each word of the corresponding object. The bit has value zero if the corresponding word is a non-pointer, and value one if the corresponding word is a pointer. The first word of the object is represented by (bitmap[0]& 0x01). The second word is represented by (bitmap[0]& 0x02). The thirty-third word is represented by (bitmap[1]& 0x01), and so forth. Bits are provided only up to the word offset of the last pointer. Note that multiple heap-allocated objects may share the same statically allocated signature structure.

To simplify the creation of signatures, and to reduce the likelihood of programmer errors in specifying signatures, we provide a special C preprocessor that will automatically build signature declarations. The convention is to provide an appropriate preprocessor declaration to accompany each C structure that is defined. The following code fragment serves as an example:

```
struct ClassFile {
    struct GenericConstant_Info **constant_pool;
    struct Method_Info *methods;
    struct GenericAttribute_Info **attributes;
    struct Field_Info *fields;
    int *interfaces;
    int minor_version;
    int major_version;
    int constant_pool_count;
    int access_flags;
    int this_class;
    int super_class;
    int interfaces_count;
    int fields_count;
    int methods_count;
    int attributes_count;
};
``` signature ClassFile {ptr, ptr, ptr, ptr, ptr, int, int, int, int, int, int, int, int, int, int}

The special preprocessor converts the signature macro to the following declaration: static int_sig1234[ ]={5, Record |5, 0x01f,}; static struct Signature *_sigClassFile=(struct Signature *)_sig1234; The codes used to identify fields within a structure are the same as the primitive C types: char, short, int, long, float, double. Note that we need not distinguish unsigned values. The ptr keyword represents pointers (the garbage collector does not need to know the type of the object pointed to).

In case of arrays, put the array dimension in square brackets immediately following the field specifier. For example:

```
struct Bozo {
char buf[12];
char *cp;
};
```
.signature Bozo {char[12], ptr }

In case of nested structures, use curly braces (Placing a field within a nested structure may change its alignment/padding requirements). For example:

```
struct Bonzo {
char c;
struct {
char x, y, z;
} s;
};
```
signature Bonzo {char, {char, char, char }}

Alternatively, programmers may refer to previously declared signatures by enclosing the structure name in angle braces (within the same preprocessor stream) as in the following:

```
struct Circus {
int numClowns;
struct Bozo clowns[50];
};
```
signature Circus {int, <Bozo>[50]}

8.5.2 Allocation of Non-String Data

Every PERC object begins with two special fields representing the object's lock and method tables respectively. See FIG. 23 for the declaration of MethodTable. The method table's first field is a pointer to the corresponding Class object. The second field is a pointer to an array of pointers to Method objects. The third field is a pointer to the JIT-code implementation of the first method, followed by a pointer to the JIT-code implementation of the second method, and so on. The pointers to JIT-code implementations may actually be pointers only to stub procedures that interface JIT code to byte-code or native-code methods.

Allocation routines. When allocating memory from within a native method, the programmer provides to the allocation routine the address of a signature rather than simply the size of the object to be allocated. The Signature pointer passed to each allocate routine must point to a statically allocated Signature structure. The implementation of the PERC virtual machine allocates a static signature for each class loaded. Once this static signature has been created, all subsequent instantiations of this class share access to this signature.

The standard allocator is allocObject( ), whose prototype is provided below:

void *allocObject(struct Signature *sp);

Note that every allocated object is tagged according to which real-time activity allocated it. This is necessary in order to allow the run-time system to enforce memory allocation budgets for each activity. Allocations performed by traditional Java applications that are not executing as part of a real-time activity are identified by a null-valued Activity pointer. All of the allocate routines consult the Thread referenced by_current_thread to determine which Activity the current thread belongs to.

In some cases, such as when a dynamically allocated object contains union fields that contain pointers only some of the time, it is necessary to allocate a private copy of the signature along with the actual object. To minimize allocation overhead, both the signature and the data are allocated as a single contiguous region of memory using the following allocation routine, which assumes that its sp argument points to static memory:

void *allocObjectAndSig(struct Signature *sp);

If the signature itself must be dynamically constructed, use the following variant:

void *allocObjectAndSigWithDynamicSig(struct Signature *sp);

To allocate an array of objects, with an appropriate dynamically constructed signature appended to the end of it, provide the signature of a single element as an argument to the allocArray( ) routine.

void *allocArray(struct Signature *sp, int num_elements);

In some situations, it is necessary to allocate a region of memory within which particular fields will contain both pointer and non-pointer data. Such an object is allocated using the allocUnionArray( ) routine, prototyped below:

void *allocUnionArray(int num_words);

This routine allocates an object with the specified number of words and an accompanying signature within which all tags are initially set to indicate that fields contain non-pointers.

If the type of a particular word of this object must be changed at some later time to a pointer, its type tag is modified by using the setSigPtrTag( ) routine:

void setSigPtrTag(void *obj, int word_offset);

This routine sets the tag for the object at word_offset positions from the start of obj to indicate that the corresponding word contains a pointer. As a side effect, this routine overwrites the corresponding word with NULL. If at some later time it is necessary to change the word from a pointer to a non-pointer, use the clrSigPtrTag( ) routine:

void clrSigPtrTag(void *obj, int word_offset);

Note that setSigPtrTag( ) and clrSigPtrTag( ) may be applied only to objects for which the signature is part of the object, such as those allocated by allocObjectAndSig( ) or allocUnionArray( ).

Note that it is also desirable to provide preemptible versions of each allocation routine.

Slow versions of each routine are prototyped below. These slow functions pass pointer parameters and return pointer results on the C stack. Prior to preemption, the routine saves relevant pointers to slow pointer variables set aside on the PERC pointer stack for this purpose.

void *slowAllocObject(struct Signature *sp);
void *slowAllocObjectAndSig(struct Signature *sp);
void *slowAllocArray(struct Signature *sp, int num_elements);
void *slowAllocUnionArray(int num_words);

8.5.3 Strings and Substrings

String and substring data is special in that we may have arrays of bytes that are shared by multiple overlapping strings. The bytes themselves are represented in a block of memory known to the garbage collector as a String. The programmer represents each string using a String object. FIG. 7 shows string objects x and y, representing the strings "embedded" and "bed" respectively. The value field of each string object is a pointer to the actual string data. The offset field is the offset, measured in bytes, of the start of the string within the corresponding StringData buffer. The count field is the number of bytes in the string. Note that count represents bytes, even though Unicode strings might require two bytes to represent each character.

Unless specifically stated to the contrary, all of the routines described in this section are fast procedures.

The standard way to allocate string data is to call allocStringByteso, whose prototype is shown below:

struct String *allocStringBytes(int num_bytes);

This routine keeps track of the currently active StringData object and allocates as much data out of this object as fits before creating another StringData object. Note that the memory for a newly allocated string's data is charged to whichever activity took responsibility for allocating the StringData object from which this new string's data is set aside. We ignore this problem currently. A future implementation might address this by dedicating a distinct StringData allocation object to each activity. Alternatively, programmers may choose to invoke allocStringWords( ):

struct String *allocStringWords(int num_words);

The only difference between the two functions is that the length is specified in words instead of bytes, and the data is guaranteed to be aligned on a word boundary.

To allocate a substring of an existing string, use the alloeSubString( ) or allocFinalizeSubString( ) function, prototyped below. These routines allocate new String objects which share access to the already existing StringData objects.

struct String *allocSubString(String *s, int offset, int len, Activity *ap);

Slow versions of each of the routines described above are prototyped below. These slow functions pass pointer parameters and return pointer results on the C stack. Prior to preemption, the routine saves relevant pointers to slow pointer variables set aside on the PERC pointer stack for this purpose.

struct String *slowAllocStringBytes(int num_bytes);
struct String *slowAllocStringWords(int num_words);
struct String *slowAllocSubString(String *s, int offset, int len);

8.6 Soft Real-Time Mostly Stationary Garbage Collection

This section describes the software implementation of a mostly stationary garbage collection technique. This represents the "best" stock-hardware compromise for reliable and fast execution within real-time constraints.

We use a mostly stationary garbage collection, in which memory is divided into 5 demispaces, each of size 512 Kbytes. At the start of each garbage collection, we select two regions to serve as to- and from-space respectively. All of the live objects currently residing in from-space are copied into to-space. At the end of garbage collection, the from-space region has been completely vacated of live memory, and thus consists of a large contiguous segment of free memory. One of the other three regions serves as a static region. It is excluded from the garbage collection process. The remaining two regions are garbage collected using an incremental mark and sweep technique. We identify the start of garbage collection as a flip.

8.6.1 General Strategies

Figure 2:
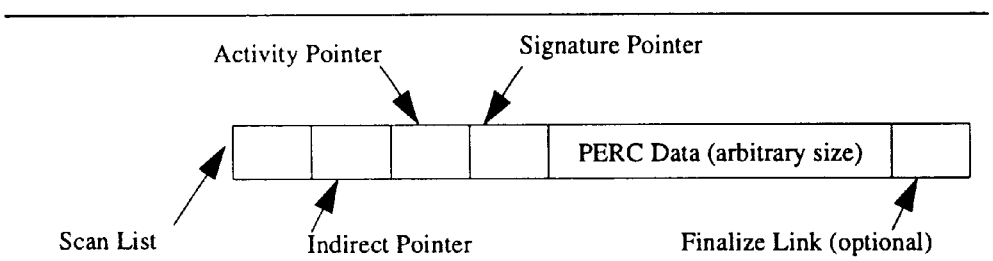
FIG. 2 illustrates the header information attached to each dynamically allocated memory object for purposes of performing garbage collection. These header fields consist of Scan-List, Indirect-Pointer, Activity-Pointer, Signature-Pointer, and optional Finalize-Link pointers.

At startup, flip as soon as ½ of memory has been allocated. Thereafter, flip as soon as the previous garbage collection pass completes. Use the following techniques and heuristics to allocate memory and select from-space:

1. Except for from-space, each demi-space maintains its own free pool. Further, each space remembers the total amount of memory represented by its free pool. See FIG. 95.
2. Each free pool is organized as several linked lists, one for objects of size 4, 8, 16, 32, 64, 128, . . . , 512K words. Free segments of sizes that don't exactly match one of the corresponding list sizes are placed on the list for the next smaller size. Thus, every "object" on the free list for size 64 is between 64 and 127 words large, inclusive. Note that the sizes of the objects represented by the different free lists need not be powers of two. For example, the fibonacci sequence may be a better choice.
3. Each object in memory is organized as illustrated in FIG. 2. The individual fields are as follows:
    a. For objects residing in the mark-and-sweep region, the Scan List field distinguishes objects that have been marked from those that have not been marked. At the start of garbage collection, every object's Scan List field has the NULL value, which is represented by the symbolic constant SCAN_CLEAR. When an object is recognized as live, it is marked by inserting the object onto a list of objects needing to be scanned. This list is threaded through its Scan List field. To identify the last object on the scan list, its Scan List field is assigned the special value 0x01 which is represented by the symbolic constant SCAN_END. For objects residing on a free list within the mark-and-sweep or to-space regions, the Scan List field has the special value 0xffffffff, represented by the symbolic constant SCAN_FREE.

For objects residing in from-space which have been scheduled for copying into to-space, the Scan List field is overwritten with a pointer to the to-space copy. Otherwise, the Scan List field holds NULL.

Within to-space, the Scan List field is used to distinguish live objects from dead ones. Note that there are situations in which the same region might serve as to-space for two consecutive garbage collection passes. In this case, some of the objects residing in to-space at the start of garbage collection may actually be dead. At the start of garbage collection, all of the Scan List fields for objects residing in to-space are initialized to SCAN_CLEAR. During garbage collection, any to-space object that is identified as live through scanning or normal application processing is placed onto the scan list (threaded through the Scan List field) if it had not previously been marked as live. For each object queued for copying into to-space, the Scan List field of the to-space copy is initialized to SCAN_END to denote that the object is live.

b. The Indirect Pointer refers to the currently valid copy of the data that corresponds to this object. For objects in the mark and sweep region, this pointer always points to the object itself. For objects in to- and from-space, the pointer points to whichever version of the object currently represents the object's contents.
    c. Activity Pointer points to the real-time activity object that was responsible for allocation of this object or has the NULL value if this object was not allocated by a real-time activity. When this object's memory is reclaimed, that real-time activity's memory allocation budget will be increased. Furthermore, if this object needs to be finalized when the garbage collector endeavors to collect it, the object will be placed on a list of this real-time activity's objects which are awaiting finalization. To distinguish objects that need to be finalized, the 0x01 bit (FINAL_LINK) and the 0x02 bit (FINAL_OBJ) of the Activity Pointer field are set when a finalizable object is allocated.
    d. Signature Pointer points to a structure that represents the internal organization of the PERC data within the object. For objects requiring finalization, the Finalize Link field is not represented in the signature.
4. Free segments are doubly linked. The Indirect Pointer field is used as a forward link and the Signature Pointer field is used as the backward link. The size of the free segment, in words, is stored in the Activity Pointer field, representing an integer. Note that objects residing on a free list are distinguished by the special SCAN_FREE value stored in their Scan List field.
5. At the time garbage collection begins (flip time), we sort the mark-and-sweep spaces according to amounts of available memory. Our preference is to allocate free memory from the space that is already most full. We link the free lists of the two mark-and-sweep free pools and the to-space free pool to reflect this preference. We always put to-space as the last region on this list, because we prefer to allocate from the mark-and-sweep regions if they have space available to us.
6. To allocate a heap object from a region's free pool, select the first (smallest) free list that is known to contain free segments of sufficiently large size. If the free list is not empty, remove the first segment on that free list, divide that segment into two smaller segments with one being of the requested size and the other being returned to the appropriate free list (if the free segment is sufficiently large), and return the allocated memory. If the selected free list is empty, repeat this algorithm on the next larger size free list (until there are no larger free lists to try).

7. At flip time, select whichever non-empty mark-and-sweep region has the most available free memory to be the next from-space. If the amount of memory allocated from within the selected from-space is less than the amount of free memory currently available as a single contiguous region in the current to-space (i.e. if we can guarantee that the amount of unallocated memory in to-space is large enough to accommodate the copying of all the live data residing in the newly selected from-space), continue to use that to-space. Otherwise, use the old from-space as the new to-space.

8.6.2 Finalizable Objects

In Java, programmers can specify an action to be performed when objects of certain types are reclaimed by the garbage collector. These actions are specified by including a non-empty finalize method in the class definition. Such objects are said to be finalizable. When a finalizable object is allocated, the two low order bits of the Activity Pointer are set to indicate that the object is finalizable. The 0x01 bit, known symbolically as FINAL__LINK, signifies that this object has an extra Finalize Link field appended to the end of it. The 0x02 bit, known symbolically as FINAL__OBJ, signifies that this object needs to be finalized. After the object has been finalized once, its FINAL__OBJ is cleared, but its FINAL__LIINK bit remains on throughout the object's lifetime.

Figure 3:
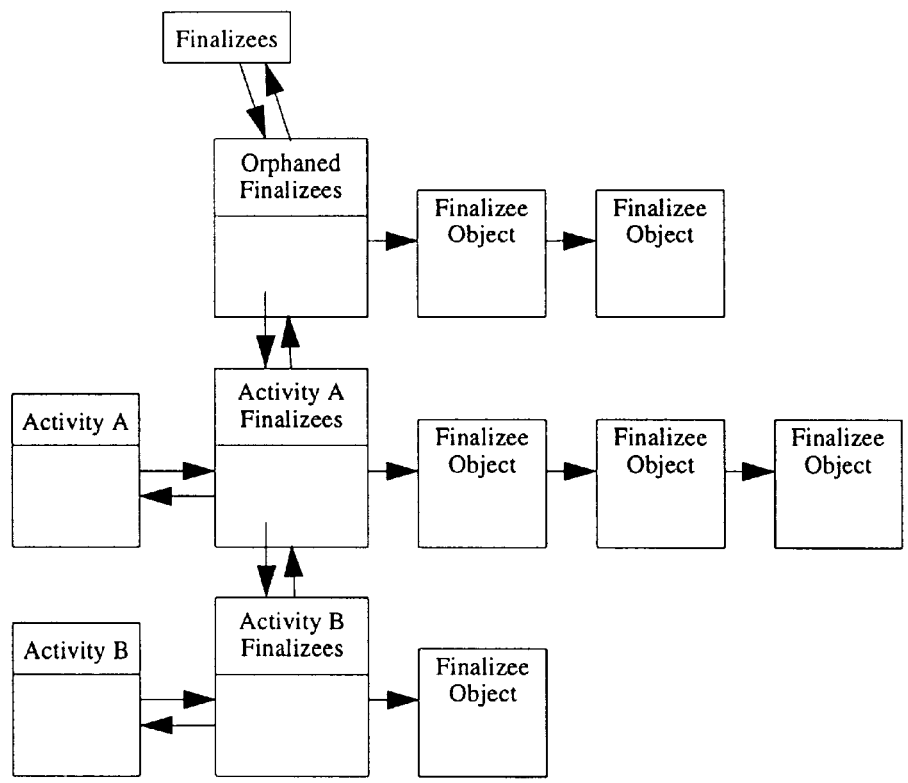
FIG. 3 illustrates the organization of finalization lists, which are sorted into separate categories according to the activities responsible for their allocation.

See FIG. 3 for an illustration of how finalization lists are organized. In this figure, Finalizees is a root pointer. This pointer refers to a list of finalization-list headers. There is one such list for each of the currently executing real-time activities, and there is one other list that represents all of the objects allocated by non-real-time activities. These lists are linked through the Activity Pointer field of the objects waiting to be finalized.

The run-time system includes a background finalizer thread which takes responsibility for incrementally executing the finalizers associated with all of the objects reachable from the Finalizees root pointer. Following execution of the finalizer method, the finalizes object is removed from the finalizes list and its Activity Pointer field is overwritten with a reference to the corresponding Activity object. Furthermore, we clear the FINAL__OBJ so we don't finalize it again. Optionally, each real-time activity may take responsibility for timely finalization of its own finalizee objects. Typically, this is done within an ongoing real-time thread that is part of the activity's workload.

When an Activity object is first allocated, its pointer to the corresponding finalizee list head object is initialized to null. Later, when objects requiring finalization are encountered, a finalizee list head object is allocated and the Activity object's finalizee list head pointer is overwritten with a pointer to this object. Each time the activity's finalizee list becomes empty, we destroy the corresponding finalizee list head object, removing it from the Finalizees list, and overwrite the corresponding pointer within the Activity object with NULL.

The Finalize Link field is only present in objects that have finalization code. Throughout their lifetimes, all such objects have the FINAL__LINK bit of the Activity Pointer field set at all times (and no objects that lack a Finalize Link field ever have this bit set). When first allocated, each finalizable object is linked through the Finalize Link field onto a single shared list (called the finalizable list) that represents all finalizable objects. When an object is recognized as ready for finalization, it is removed from the finalizable list and placed onto a finalizee list threaded through the Activity Pointer field.

8.6.3 Synchronization Between Application Code and Incremental Garbage Collection Garbage collection is performed as an incremental background process. Application code honors the following protocols in order to not interfere with background garbage collection activities.

1. Heap memory that has already been examined by the garbage collector must not be corrupted by writing into such heap objects pointers that have not yet been processed by the garbage collector. Otherwise, it might be possible for a pointer to escape scrutiny of the garbage collector. As a result, the referenced object might be treated as garbage and accidentally reclaimed. To avoid this problem, we impose a write barrier whenever pointers are written into the heap. (See the SetHeapPointer( ) macro in FIG. 41):

a. If the pointer to be written to memory refers to from-space, replace the pointer with the appropriate to-space address. Note that this may require that we set aside memory in to-space to hold the copy of the referenced from-space object.

b. If the pointer to be written to memory refers to a mark-and-sweep object that has not yet been marked, mark the object by placing it on the scan list.

2. We do not impose a read barrier. This means that pointers fetched from the internal fields of heap objects may refer to from-space objects or to mark-and-sweep objects that have not yet been marked. In case a pointer refers to a from-space object that has already been copied into to-space or to a to-space object that has not yet been copied into to-space, all references to heap object are indirected through the Indirection Pointer. (See FIG. 41)

3. Any objects that are newly allocated from the mark-and-sweep region have their Scan List pointer initialized to NULL. Thus, newly allocated objects will survive the current garbage collection pass only if pointers to these objects are written into the live heap.

Figure 95:
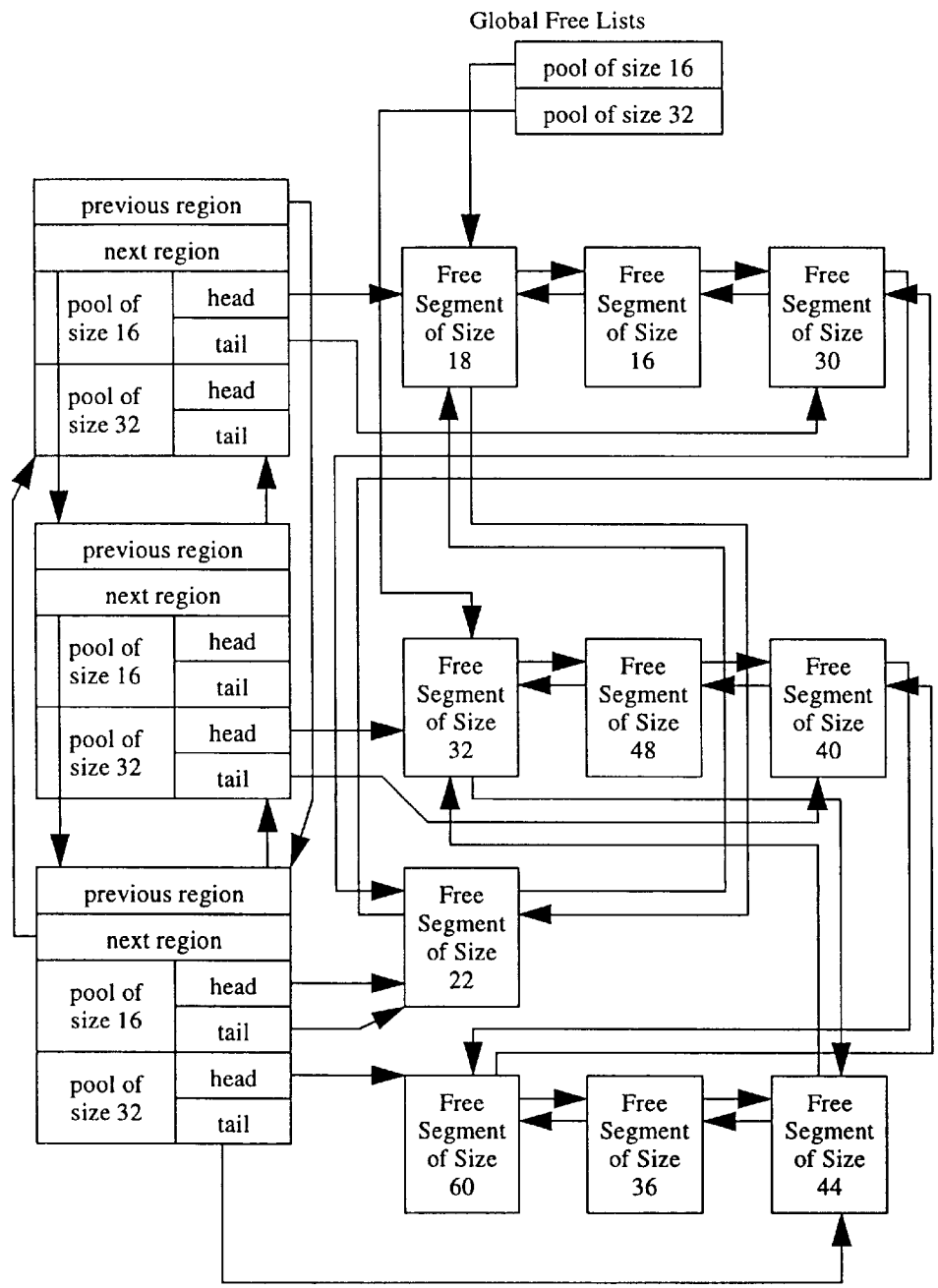
FIG. 95 illustrates the organization of free lists, partitioned by region, but combined into a single global pool to support efficient constant-time allocation. In this figure, the three regions (indicated by the three large objects on the left side of the figure) are prioritized such that preference is given to allocating from the top region first followed by the middle region and then the bottom region. This figure illustrates only two size categories, 16 and 32. In the actual implementation, there are free lists for each size category, ranging from size 4 to size 512K.

There are two garbage collection techniques being carried out in parallel: copying between from- and to-space, and incremental mark-and-sweep in the remaining regions. Garbage collection begins with identification of the live objects that are referenced from the root registers. The flip operation consists, therefore, of the following actions:

1. The garbage collector sorts heap regions in descending order according to amount of allocated memory. The last region on this sorted list is known to be completely free, since at least from-space, and possibly other regions, is known to have serviced no allocation requests during the most recent garbage collection pass.

a. Select as the next from-space the region of memory that has the smallest non-zero amount of allocated data, excluding the current to-space from consideration.

b. If the amount of allocated data in the selected from-space is less than the amount of free space in the current to-space, reuse the current to-space as the next to-space. Otherwise, use the old from-space as the next to-space.

c. Divide the available memory in the newly selected to-space into one segment for allocation of new memory requests and another segment for copying of live from-spacc objects. The region reserved for copying is assigned to lower addresses, and is large enough to hold all of the memory currently allocated in from-space, even though some of the from-space objects are likely to be dead and will not need to be copied. From-space objects are copied into to-space from low to high address. New memory is allocated within to-space from high to low address. At the end of garbage collection, we coalesce whatever is left over from the copy region with whatever is left from the allocate region into a single contiguous segment of free memory.

d. Once to- and from-space have been selected and initialized, the free pools of the remaining regions are linked together in increasing order of amount of free memory. The free pool of the current to-space is linked onto the end of this list. Every request for new memory allocation will be satisfied by searching the free spaces of the various regions in the order determined by these links. FIG. 95 illustrates the results of linking the independent free lists into a single global free pool.

Figure 4:
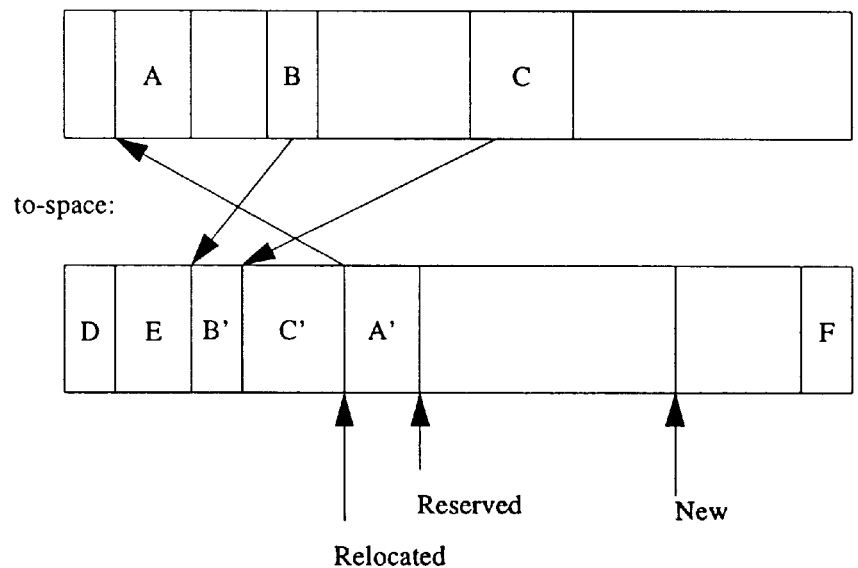
FIG. 4 illustrates from-space and to-space regions, in which three live objects are being copied out of from-space into to-space. In this illustration, objects B and C have already been copied and object A is scheduled for copying. Objects D and E were presumably copied into to-space by a previous garbage collection pass and object F was allocated from to-space during a previous garbage collection pass.

2. Tend each root pointer. This consists of:
   a. If the pointer refers to from-space, allocate space for a copy of this object in to-space and make the to-space copy's Indirect Pointer refer to the from-space object. Set the root pointer to refer to the to-space copy. Set the from-space copy's Scan List pointer to refer to the to-space copy.
   b. Otherwise, if the pointer refers to the mark-and-sweep region or the to-space region and the referenced object has not yet been marked, mark the object. Marking consists of placing the object on the scan list. Each increment of garbage collection effort consists of the following:

1. If we are not searching for objects in need of finalization and if there is garbage collection work to be done for the copy region, do it.
2. Else if we are not searching for objects in need of finalization and if there is memory to be scanned in the mark-and-sweep region, scan it.
3. Else if we are not searching for objects in need of finalization and if the mark process has not terminated:
   a. Rescan the root registers.
   b. Following the root register scan, if there is no more memory to be scanned and there is no more memory to be copied, consider the mark process to have been terminated. Our next job is to search for finalizable objects.
4. Else if we have not yet completed our search for objects requiring finalization, search for them.
5. Else if there is memory to be swept (in either the mark-and-sweep region or in to-space), do some sweeping.
6. Else if from-space has not yet been zeroed, zero it.
7. Else, do a flip operation and restart the garbage collector. To-space and from-space are organized as illustrated in FIG. 4. In this illustration, live objects A, B, and C are being copied into to-space out of from-space. Objects B and C have been copied and object A is on the copy queue waiting to be copied. The arrows indicate the values of the Indirect Pointer fields in each of the invalid object copies. Memory to the right of the New pointer consists of objects that have been allocated during this pass of the garbage collector. Memory to the left of B' represents objects that were copied to to-space during the previous pass of the garbage collector. Garbage collection of the copy region consists of the following:

1. If Relocated is less than Reserved:
   a. Atomically copy the object at position Relocated and update the from-space version of the object so that its Indirect Pointer refers to the to-space copy of the object.
   b. As the object is being copied, tend any pointers that it might contain.

Additionally, tend the Activity Pointer field after masking out its two least significant bits and update the Signature Pointer if the signature is contained within this object. Scanning of the mark-and-sweep region consists of the following:

1. If the scan-list is not empty:
   a. Scan the object at the head of the list. Scanning consists of tending each pointer contained within the object. Note that the scanner must scan the Activity Pointer field (after masking out the two least significant bits). A special technique is used to scan pointer stack objects. When pointer stack objects are scanned, the garbage collector consults the corresponding Thread object to determine the current height of the pointer stack. Rather than scan the entire object, the garbage collector only scans that portion of the stack object that is currently being used.
   b. Make the scan-list pointer refer to the next object on the scan list.

Scanning of PERC pointer stacks is special in the sense that only the portion of the stack that is live is scanned. Memory within the object that is above the top-of-stack pointer is ignored. In order to support this capability, PERC pointer stacks refer to their corresponding Thread object, enabling the garbage collector to consult the thread's top-of-stack pointer before scanning the stack object.

Once we are done with the marking and copying process, our next responsibility is to search for objects in need of finalization. The search process consists of the following steps:

1. Examine each object on the finalizable list one at a time:
   a. If the object has not been marked (Note that from-space objects that have been copied into to-space have a non-NULL Scan List field so they count as having been marked), we recognize this object as requiring finalization. If this object still resides in from-space, we allocate memory for a to-space copy of the object and initialize all of the links necessary to allow the object to be subsequently copied. From this point forward, we consider this object to reside in to-space.

We remove the object from the finalizable list and place it (the newly created to-space copy if the object was originally found in from-space) onto a temporary holding list of finalizees threaded through the Finalize Link field. In order to support the remove operation, the scanning process maintains at all times a pointer to the preceding object on the finalizable list. Additionally, we mark this object by placing it on the scan list if the object resides in the mark-and-sweep region.
   b. If the object had previously been marked, simply skip over it.
2. Consider the search for finalizees to have been completed. This allows the objects newly placed onto the scan or copy queues to be scanned and/or copied.
3. Wait for the scanning and copying process to complete. It is not necessary to rescan the root pointers because all of the objects now being scanned and copied are considered to be dead insofar as the application code is concerned. Thus, there is no possible way for a pointer to one of these "dead" objects to find its way into a root pointer.
4. Now, process the holding list of finalizees that was created in step 1, linking each finalizes onto the appropriate activity's finalizes list (or onto the Orphaned Finalizees list). This list is threaded through the Activity pointer field of the object's header. At this time, overwrite the object's Finalize Link field with NULL. If the activity to which an object corresponds does not currently have a finalizes list, it will be necessary in this step to allocate and initialize the finalizee list head. (See FIG. 3)

Next, we sweep the entire mark-and-sweep and to-space regions. Before sweeping to-space, we coalesce the unused portion of the memory segment which had been reserved for copying of from-space objects with the free segment that immediately follows this segment. Sweeping consists of the following steps:

1. From low to high addresses, examine each object.
    a. If it is marked, unmark it and go on to the next object.
    b. If it is not marked but is already on a free list, merge this free segment with the preceding segment if the preceding segment is free. Merging requires that we unlink this and the preceding object from their respective free lists, create a single larger free segment, and link the larger free segment onto the appropriate free list.
    c. If it is not marked and is not already on a free list, we have discovered a candidate for reclamation. Check to see if this is a HashLock object. If so, the garbage collector first reclaims the hash value by (i) checking to see if there is an available slot in the hash-value manager's list of recycled hash values and copying this object's hash value into that slot if so, or (ii) making this object live, changing its signature to that of a HashCache object, and linking the HashCache object onto the hash-value manager's list of recycled hash values.
    d. Assuming this object has not been converted into a HashCache object, we place this object onto the appropriate free list after first merging with the preceding object if the preceding object is also free. In the process of reclaiming this object's memory, update the corresponding activity's tally that represents the total amount of this activity's previously allocated memory that has been garbage collected. Also, zero out all of the memory contained within the newly reclaimed object.

The final step is to zero out the old from-space so that future allocations from this region can be assumed to contain only zeros. Simply walk through memory from low to high address and overwrite each word with a zero. For each object encountered in from-space, we ask whether it was copied into to-space (by examining its Indirect Pointer). If it was not copied, we check to see if it is a HashLock object with a hash value that needs to be reclaimed. If so, we reclaim the hash value as described above, except that a new HashCache object may need to be allocated to represent the recycled hash value if there are no available slots in the existing list of recycled hash values. We allocate this HashCache object using the standard heap-memory allocator. Otherwise, we update the corresponding activity's tally that represents the total amount of this activity's previously allocated memory that has been garbage collected.

9.0 Byte Code Verification and Transformations

The standard model for execution of Java byte-code programs assumes an execution model comprised of a single stack. Furthermore, the Java byte codes are designed to support dynamic loading and linking. This requires the use of symbolic references to external symbols. Resolving these symbolic references is a fairly costly operation which should not be performed each time an external reference is accessed. Instead, the PERC virtual machine replaces symbolic references with more efficient integer index and direct pointer references when the code is loaded.

In order to achieve good performance, the PERC virtual machine does not check for type correctness of arguments each time it executes a byte-code instruction. Rather, it assumes that the supplied arguments are of the appropriate type. Since byte-code programs may be downloaded from remote computer systems, some of which are not necessarily trustworthy, it is necessary for the PERC virtual machine to scrutinize the byte-code program for type correctness before it begins to execute. The process of guaranteeing that all of the operands supplied to each byte-code instruction are of the appropriate type is known as byte code verification. Once the types of each operation are known, it is possible to perform certain code transformations. Some of these transformations are designed simply to improve performance. In other cases, the transformations are needed to comply with the special requirements of the PERC virtual machine's stack protocols. For example, Java's dup2 byte code duplicates the top two elements on the Java stack. Byte-code verification determines the types of the top two stack elements. If both are of type pointer, the class loader replaces this byte code with a special instruction named dup2__11, which duplicates the top two elements of the pointer stack. If the two stack arguments are both non-pointer values, the PERC class loader replaces this byte code with the dup2__00 instruction, which duplicates the top two elements of the non-pointer stack. If one of dup's stack arguments is a pointer and the other is a non-pointer (in either order), the PERC class loader replaces dup with dup2__10, which duplicates the top element on each stack. A complete list of all the transformations that are performed by the byte code loader is provided in the remainder of this section.

9.1 Implementation of Byte Code Verifier

Byte code verification is performed in two passes. In the first pass, we divide the program into basic blocks and build a data structure that identifies how control flows between basic blocks. A basic block is a straight-line sequence of instructions that does not include any branches into or out. The result of performing this first pass is known as a control-flow graph. The process of creating the control-flow graph is straightforward, and has been described in numerous references. See, for example, "Compilers: Principles, Techniques, and Tools", written by Alfred V. Aho, Ravi Sethi, and Jeffrey Ullman, published in 1988.

During construction of the control-flow-graph, we give special attention to the basic blocks that are targeted by jsr and jsr__w instructions. These blocks represent the starting points for the bodies of finally statements and they receive special treatment.

Before starting the second pass, we identify each of the entry points to the method. We consider the first basic block in the method to be the main entry point. Additionally, we consider the starting block for each finally statement to represent an entry point. And further, we consider the starting block for each exception handler to represent an entry point. Exception handlers are identified in the method's code attribute, in the field named exception__table. The relevant data structures are described in "The Java Virtual Machine Specification", written by T im Lindholm and Frank Yellin, published in 1996.

Each basic block is represented by a data structure with fields representing the following information:

1. The offsets within the method's byte code of the instructions that represent the start and end of the basic block.

2. A list of pointers to the basic block objects that may branch to this block. We call these blocks the predecessors.
3. A list of pointers to the basic block objects that this block may branch to. We call these blocks the successors.
4. A flag that signals whether this basic block has been processed by the second pass.
5. A representation of the types of the values that will be present on the Java stack at the start of executing this block.
6. A representation of the types of the values that will be present on the Java stack at the end of executing this block.
7. An integer that identifies which entry point reaches this basic block. If a particular basic block is reached by multiple entry points, the byte-code program is considered to be invalid.

The second pass consists of examining each entry point and all of the blocks reachable from that entry point, calculating the effects that each block has on the run-time stack and verifying that the proper types sit on the stack for each byte-code instruction that is executed.

Consider analysis of the main entry point and the blocks reachable from this entry point. First, we initialize the entry point's initial stack to empty. Then we simulate execution of the entry block's instructions and record the effects of these instructions in terms of the types of the values that will be popped from and pushed onto the stack. After simulating all of the instructions in this basic block, we examine each of the entry block's successors as follows:

1. If the successor has already been analyzed, we simply verify that it is identified as having been reached from this same entry point and that its notion of initial stack types is the same as this block's notion of ending stack types.
2. Otherwise, we mark the successor as analyzed, identifying it as having been reached from the same entry point that reached this block, initialize its initial stack types to be the same as this block's ending stack types, and recursively analyze this successor node using the same technique that was used to analyze the entry point.

The process continues as outlined above until all of the blocks reachable from the initial entry point have been analyzed.

Analysis of the other entry points is similar, except that the initial contents of the stack for a finally entry point consists of a return address, and the initial contents of the stack for an exception handler entry point is a reference to the thrown exception.

9.2 Instruction variations 9.2.1 Constant-Pool Optimizations

Most of the operations that access the constant pool can be replaced with fast variants. When a Java class is loaded into the Java virtual machine, all of the constants associated with each method are loaded into a data structure known as the constant pool. Because Java programs are linked together at run time, many constants are represented symbolically in the byte code. Once the program has been loaded, the symbolic values are replaced in the constant pool with the actual constants they represent. We call this process "resolving constants." Sun Microsystems Inc.'s descriptions of their Java implementation suggest that constants should be resolved on the fly: each constant is resolved the first time it is accessed by user code. Sun Microsystems Inc.'s documents further suggest that once an instruction making reference to a constant value has been executed and the corresponding constant has been resolved, that byte code instruction should be replaced with a quick variant of the same instruction. The main difference between the quick variant and the original instruction is that the quick variant knows that the corresponding constant has already been resolved.

In our system, we resolve the entire constant pool when the class is loaded. Furthermore, we examine all of the byte codes corresponding to each method and replace them as necessary to represent the appropriate quick variants. Our implementation differs (apparently) from Sun Microsystems Inc.'s in that we do not need to dedicate byte codes to represent the slow variants of these instructions. In our system, all constants are known to be resolved prior to execution of the corresponding byte codes.

ldc1. This operation is represented by code 18. This instruction pushes the item found on the specified one-byte indexed position within the constant pool table onto the stack. If this item is an object pointer, we need to push the pointer value onto the pointer stack. If this item is not a pointer, we push its value onto the non-pointer stack. We use code 18 to represent ldc1_np, which loads a non-pointer constant onto the non-pointer stack. We use code 255 to represent ldc1_p, which loads a pointer constant onto the pointer stack. ldc2. This operation is represented by code 19. This instruction pushes the item found on the specified two-byte indexed position within the constant pool table onto the stack. If this item is an object pointer, we need to push its value onto the pointer stack. If this item is not a pointer, we push its value onto the non-pointer stack. We use code 19 to represent ldc2_np, which loads a non-pointer constant onto the non-pointer stack. We use code 254 to represent ldc2_p, which loads a pointer constant onto the pointer stack.

Putfield. This operation is represented by code 181. It takes a two-byte immediate operand which represents an index into the constant pool. This index indirectly represents the offset of the field within the corresponding object and the width of the field, measured in bits. The loader replaces this code with one of the following:

1. putfield_q encoded as 181: We replace the constant-pool entry with an integer that represents the field's offset, size, and tag to indicate whether the field contains a pointer. This information is encoded such that the most significant bit is on if the field contains a pointer, the next two bits encode the size of the field, and the remaining 29 bits represent the field's offset. The constant-pool entry is tagged so that other putfield and getfield operations that refer to the same constant-pool entry can be appropriately resolved. Only use this instruction if the field offset is larger than can be represented in 16 unsigned bits. The instructions that follow handle cases in which the field offset is less than 64 Kbytes and can thus be represented in the 16-bit immediate operand representing an unsigned integer quantity.
2. putfield_qnp8 encoded as 253: We replace the two-byte immediate operand with the offset of the 8-bit non-pointer field within the corresponding object.
3. putfield_qnp16 encoded as 252: We replace the two-byte immediate operand with the offset of the 16-bit non-pointer field within the corresponding object.
4. putfield_qnp32 encoded as 251: We replace the two-byte immediate operand with the offset of the 32-bit non-pointer field within the corresponding object.

5. putfield_qnp64 encoded as 250: We replace the two-byte immediate operand with the offset of the 64-bit non-pointer field within the corresponding object.
6. putfield_qp encoded as 249: We replace the two-byte immediate operand with the offset of the 32-bit pointer field within the corresponding object.

Getfield. This operation is represented by code 180. It takes a two-byte immediate operand which represents an index into the constant pool. This index indirectly represents the offset of the field within the corresponding object and the width of the field, measured in bits. This code is replaced with one of the following:

1. getfield_q encoded as 180: We replace the constant-pool entry with a 32-bit integer that represents the field's offset, size, and tag to indicate whether the field contains a pointer. This information is encoded such that the most significant bit is on if the field contains a pointer, the next two bits encode the size of the field, and the remaining 29 bits represent the field's offset. The constant-pool entry is tagged so that other putfield and getfield operations that refer to the same constant-pool entry can be appropriately resolved. Only use this instruction if the field offset is larger than can be represented in 16 unsigned bits. The instructions that follow handle cases in which the field offset is less than 64 Kbytes and can thus be represented in the 16-bit immediate operand representing an unsigned integer quantity.
2. getfield_qnp8 encoded as 248: We replace the two-byte immediate operand with the offset of the 8-bit non-pointer field within the corresponding object.
3. getfield_qnp16 encoded as 247: We replace the two-byte immediate operand with the offset of the 16-bit non-pointer field within the corresponding object.
4. getfield_qnp32 encoded as 246: We replace the two-byte immediate operand with the offset of the 32-bit non-pointer field within the corresponding object.
5. getfield_qnp64 encoded as 245: We replace the two-byte immediate operand with the offset of the 64-bit non-pointer field within the corresponding object.
6. getfield_qp encoded as 244: We replace the two-byte immediate operand with the offset of the 32-bit pointer field within the corresponding object.

Putstatic. This operation is represented by code 179. It takes a two-byte immediate operand which represents an index into the constant pool. This index indirectly represents the offset of the field within the corresponding object and the width of the field, measured in bits. We replace the selected constant-pool entry with a pointer to the Field structure that describes the field to be updated. This field structure includes a pointer to the corresponding class object and also includes the offset of the field within the class object. This code is replaced with one of the following:

1. putstatic_qnp8 encoded as 243 if the field is 8 bits wide.
2. putstatic_qnp 16 encoded as 242 if the field is 16 bits wide.
3. putstatic_qnp32 encoded as 241 if the field is a 32-bit non-pointer.
4. putstatic_qnp64 encoded as 240 if the field is a 64-bit non-pointer.
5. putstatic_qp encoded as 239 if the field is a 32-bit pointer.

Getstatic. This operation is represented by code 178. It takes a two-byte immediate operand which represents an index into the constant pool. This index indirectly represents the offset of the field within the corresponding object and the width of the field, measured in bits. We replace the selected constant-pool entry with a pointer to the Field structure that describes the field to be fetched. This field structure includes a pointer to the corresponding class object and also includes the offset of the field within the class object. This code is replaced with one of the following:

1. getstatic_qnp8 encoded as 238 if the field is 8 bits wide.
2. getstatic_qnp16 encoded as 237 if the field is 16 bits wide.
3. getstatic_qnp32 encoded as 236 if the field is a 32-bit non-pointer.
4. getstatic_qnp64 encoded as 235 if the field is a 64-bit non-pointer.
5. getstatic_qp encoded as 234 if the field is a 32-bit pointer.

Anewarray. This operation is represented by code 189. It takes two immediate-mode byte operands which represent a 16-bit index into the constant pool. When resolved, the selected constant must be a class. The result of this operation is a newly allocated array of pointers to the specified class. The loader replaces this instruction with anewarray_q, which is also encoded as operation 189. This instruction differs from anewarray in that it does not need to resolve the constant entry. Rather, it assumes that the specified slot of the constant pool holds a pointer directly to the corresponding class object.

Multianewarray. This operation is represented by code 197. It takes two immediate-mode byte operands to represent a 16-bit constant pool index and a third immediate-mode byte operand to represent the number of dimensions in the array to be allocated. The index position is handled the same as for anewarray. The loader replaces this instruction with multianewarray_q, which is encoded as operation 197. This instruction differs from multianewarray in that it does not need to resolve the constant entry. Rather, it assumes that the specified slot of the constant pool holds a pointer directly to the corresponding class object.

Invokevirtual. This operation is represented by code 182. It takes two immediate-mode byte operands which represent a 16-bit index into the constant pool table. The corresponding constant-pool entry represents the method signature, including its name. If the method-table index of the corresponding method is greater than 255 or if the number of pointer arguments is greater than 255, the loader replaces this instruction with invokevirtual_q, encoded as operation 182. Otherwise, the loader replaces this instruction with invokevirtual_fq, encoded as operation 233.

With the invokevirtual_fq instruction, the first immediate-mode byte operand represents the method table index and the second immediate-mode byte operand represents the number of pointer arguments.

With the invokevirtual_q instruction, the two immediate-mode operands represent the same 16-bit index into the constant pool table as with the original invokevirtual instruction. However, this entry within the constant pool table is overwritten with a pointer to the Method structure that describes this method. (Note that both invokevirtual and invokespecial may share access to this same entry in the constant pool. In fact, there is no difference between the implementations of invokespecial_q and invokestatic_q in certain frameworks.)

invokespecial. This operation is represented by code 183. It takes two immediate-mode byte operands which represent a 16-bit index into the constant pool table. The corresponding constant-pool entry represents the method signature, including its name. This instruction is replaced with invokespecial_q, encoded as 183. With the invokespecial_q instruction, the selected constant pool entry is replaced with a pointer to the Method structure that describes this method. (Note that both invokevirtual and invokespecial may share access to this same entry in the constant pool.)

invokestatic. This operation is represented by code 184. It takes two immediate-mode byte operands which represent a 16-bit index into the constant pool table. The corresponding constant-pool entry represents the method's class and signature, including its name. The loader replaces this instruction with invokestatic_q, encoded as 184. The distinction of invokestatic_q is that the selected constant pool entry is a pointer to the Method structure that describes this method.

Invokeinterface. This operation is represented by code 185. The instruction takes a 2-byte constant pool index, a one-byte representation of the number of arguments, and a one-byte reserved quantity as immediate-mode operands. The corresponding constant-pool entry represents the method's signature. The loader replaces this instruction with invokeinterface_q, encoded as 185. The distinction of invokeinterface_q is that the constant pool entry is overwritten with a pointer to a Method structure that represents the name and signature of the interface method and the reserved operand is overwritten with a guess suggesting the "most likely" slot at which the invoked object's method table is likely to match the invoked interface. If this slot does not match, this instruction searches the object's method table for the first method that does match. On each execution of invokeinterface_q, the guess field is overwritten with the slot that matched on the previous execution of this instruction.

When byte codes are processed by the ROMizer tool for placement in ROM memory, the invokeinterface instruction is replaced with invokeinterface_qrom, encoded as 216. This instruction is distinguished from invokeinterface_q only in that the reserved operand is an index into a 256-element array of guesses maintained by the PERC virtual machine for the purpose of supporting customization of invokeinterface instructions. If the ROMizer's output contains fewer than 256 invokeinterface_qrom instructions, then each one's reserved operand will have a different integer value in the range 0 to 255 inclusive. Otherwise, certain invokeinterface_qrom instructions will share access to the same slot in the guess array.

New. This operation is represented by code 187. The instruction takes a 2-byte constant pool index. The constant pool entry is a class name that can be resolved to a class pointer. The loader replaces this instruction with new_q, also encoded as 187. The distinction of new_q is that the constant pool entry is replaced with a pointer to the resolved class object.

Checkcast. This operation is represented by code 192. The instruction takes a 2-byte constant pool index. The constant pool entry is a class name that can be resolved to a class pointer. The loader replaces this instruction with checkcast_q, also encoded as 192. The distinction of checkcast_q is that the constant pool entry is replaced with a pointer to the resolved class object.

Instanceof. This operation is represented by code 193. The instruction takes a 2-byte constant pool index. The constant pool entry is a class name that can be resolved to a class pointer. The loader replaces this instruction with instanceof_q, also encoded as 193. The distinction of instanceof_q is that the constant pool entry is known to have been replaced with a pointer to the resolved class object.

9.2.2 Access to local variables

The standard Java byte code assumes that all local variables and all push and pop operations refer to a single shared stack. Offsets for local variables are all calculated based on this assumption. Our implementation maintains two stacks, one for non-pointers and another for pointers. Pointer local variables are stored on the pointer stack. And non-pointer locals are stored on the non-pointer stack. Thus, our byte-code loader has to remap the offsets for all local variable operations. The affected instructions are: iload, iload_<n>, lload, lload_<n>, fload, fload_<n>, dload, dload_<n>, aload, aload_<n>, istore, istore_<n>, lstore, lstore_<n>, fstore, fstore_<n>, dstore, dstore_<n>, astore, astore_<n>, iinc.

There is one special context in which astore and astore_<n> instructions require special handling. In the code generated for the body of a finally statement, javac uses an astore instruction to store the return address. The PERC virtual machine treats the return address as an integer, and thus replaces this astore instruction with an istore.

9.2.3 Stack Manipulation Optimization

We want to make sure that operations that manipulate the stack are properly configured to differentiate between the pointer stack and the non-pointer stack.

Pop. This operation is represented by code 87. It removes the top item from the stack. We use code 87 to represent pop_0, which pops from the non-pointer stack, and code 232 to represent pop_1, which pops from the pointer stack.

pop2. This operation is represented by code 88. It removes the top two items from the stack. We use code 88 to represent pop2_00, which pops two values from the non-pointer stack, code 231 to represent pop2_10 which pops one value from each stack, and code 230 to represent pop2_11, which pops two values from the pointer stack.

Dup. This operation is represented by code 89. It duplicates the top stack item. We use code 89 to represent dup_0, which duplicates the top non-pointer stack entry, and code 229 to represent dup_1, which duplicates the top pointer stack entry.

dup2. This operation is represented by code 92. It duplicates the top two stack items. We use code 92 to represent $dup_2$_00, which duplicates the top two non-pointer stack entries, code 228 to represent dup2_10, which duplicates the top entry on each stack, and code 227 to represent dup2_11, which duplicates the top two pointer stack entries.

dup x1. This operation is represented by code 90. It duplicates the top stack item, shifts the top two stack items up one position on the stack, and inserts the duplicated top stack item into the newly vacated stack position. Note that the translation of this instruction depends on the types of the top two stack values at the time this instruction is executed. Each stack entry is either a pointer or a non-pointer. Use a binary 1 to represent pointers and a binary 0 to represent non-pointers. Assemble the type codes from left to right, with the top stack entry being represented by the right-most binary digit. Thus, the number 01 represents the condition in which the top stack element is a pointer and the next entry is a non-pointer. We characterize the handling given to each case as tagged by the binary representation of the stack type codes:

00: We use code 90 to represent dup_x1_00, which does its manipulations entirely on the non-pointer stack.

01: Reuse code 229 to represent dup_1, which duplicates only a single pointer value (this is the appropriate action to perform when the top stack element is a pointer, and the second element is a non-pointer).

10: Reuse code 89 to represent dup_0, which duplicates only a single non-pointer value (this is the appropriate action to perform when the top stack element is a non-pointer and the second element is a pointer).

11: Use code 226 to represent dup_x1_11, which does all of its manipulations on the pointer stack.

dup ×2. This operation, encoded as 91, duplicates the top stack entry, shifts the top three stack entries up one stack position, and inserts the duplicated stack entry into the newly vacated stack position. Note that the translation of this instruction depends on the types of the top three stack values at the time this instruction is executed. Each stack entry is either a pointer or a non-pointer. Use a binary 1 to represent pointers and a binary 0 to represent non-pointers. Assemble the type codes from left to right, with the top stack entry being represented by the right-most binary digit. Thus, the number 001 represents the condition in which the top stack element is a pointer and the next two entries are non-pointers. We characterize the handling given to each case as tagged by the binary representation of the stack type codes:

000: We use code 91 to represent dup_x2_000, which does its manipulations entirely on the non-pointer stack.

001: Reuse code 229 to represent dup_1, which duplicates only a single pointer value (this is the appropriate action to perform when the top stack element is a pointer, and the next two elements are non-pointers).

010: Reuse code 90 to represent dup_x1_00, which duplicates the non-pointer value and inserts it into the appropriate position on the non-pointer stack.

011: Reuse code 226 to represent dup_x1_11, which duplicates the pointer value and inserts it into the appropriate position on the pointer stack.

100: Reuse code 90 to represent dup_x1_00, which duplicates the non-pointer value and inserts it into the appropriate position on the non-pointer stack.

101: Reuse code 226 to represent dup_x1_11, which duplicates the pointer value and inserts it into the appropriate position on the pointer stack.

110: Reuse code 89 to represent dup_0, which duplicates only a single non-pointer value (this is the appropriate action to perform when the top stack element is a non-pointer and the second element is a pointer).

111: We use code 225 to represent dup_'2_111, which does its manipulations entirely on the pointer stack.

dup2 ×1. This operation, encoded as 93, duplicates the top two stack entries, shifts the top three stack entries up two stack positions, and inserts the duplicated stack entries into the newly vacated stack slots. Note that the translation of this instruction depends on the types of the top three stack values at the time this instruction is executed. Each stack entry is either a pointer or a non-pointer. Use a binary 1 to represent pointers and a binary 0 to represent non-pointers. Assemble the type codes from left to right, with the top stack entry being represented by the right-most binary digit. Thus, the number 001 represents the condition in which the top stack element is a pointer and the next two entries are non-pointers. We characterize the handling given to each case as tagged by the binary representation of the stack type codes:

000: We use code 93 to represent dup2_x1_000, which does its manipulations entirely on the non-pointer stack.

001: Use code 224 to represent dup2_x1_001. This instruction represents the combination of a dup_1 and a dup_x1_00.

010: Reuse code 224, which represents dup2_x1_001.

011: Reuse code 227 to represent dup2_11, which duplicates the top two values on the pointer stack.

100: Reuse code 92 to represent dup2_00, which duplicates the top two values on the non-pointer stack.

101: Use code 223 to represent dup2_x1_101. This instruction represents the combination of a dup_0 and a dup_x1_11.

110: Reuse code 223, which represents dup2_x1_101.

111: We use code 222 to represent dup2_x1_111, which does its manipulations entirely on the pointer stack.

dup2 ×2. This operation is represented by code 94. It duplicates the top two stack items, shifts the top four stack items up two positions on the stack, and inserts the duplicated stack items into the newly vacated stack positions. Note that the translation of this instruction depends on the types of the top four stack values at the time this instruction is executed. Each stack entry is either a pointer or a non-pointer. Use a binary 1 to represent pointers and a binary 0 to represent non-pointers. Assemble the type codes from left to right, with the top stack entry being represented by the right-most binary digit. Thus, the number 0001 represents the condition in which the top stack element is a pointer and the next three are non-pointers. Each combination of four binary digit type codes represents a decimal number. We characterize the handling given to each case as tagged by the binary representation of the stack type codes:

0000: We use code 94 to represent dup2_x2_0000, which does all its manipulations on the non-pointer stack.

0001: We use code 221 to represent dup2_x2_0001. This instruction represents the combination of dup_1 and dup_33 2_00.

0010: We reuse dup$_2$_x2_0001 for this case, since both situations require the same handling.

0011: We reuse the code for dup2_11 (which is the right thing to do if the top two stack elements are pointers, and the next two are non-pointers).

0100: We reuse code for dup2_x1_000. This instruction duplicates the top two entries on the non-pointer stack, shifts the top three entries of the non-pointer stack up two positions, and inserts the duplicated values into the vacated stack slots.

0101: We use code 220 to represent dup2_x2_0101. This instruction represents the combination of dup_x1_00 and dup_x1_11.

0110: We reuse the code for dup2_x2_0101 here.

0111: We reuse the code for dup2_x1_111. This instruction duplicates the top two entries of the pointer stack, shifts the top three values of the pointer stack up two positions on the stack, and inserts the duplicated pointer values into the vacated stack position.

1000: We reuse dup2_x1_000 for this case.

1001: We reuse the code for dup2_2_0101 here.

1010: We reuse the code for dup2_x2_0101 here.

1011: We reuse the code for dup2_x1_111 here.

1100: We reuse the code for dup2_00 here.

1101: We use code 219 to represent dup2_x2_1101. This instruction represents the combination of dup_0 and dup_x2_11.

1110: We reuse dup2_x2_1101 for this purpose.

1111: We use code 218 to represent dup2_x2_1111. This instruction duplicates the top two entries on the pointer stack, shifts the top four entries on the pointer stack up two positions, and inserts the duplicated pointer values into the newly vacated pointer slots.

Swap. This operation, represented by code 95, causes the top two stack values to be exchanged. Our handling of this instruction depends on the types of the top two stack values:

00: We use code 95 to represent swap_00, which exchanges the top two values on the non-pointer stack.

01: We reuse the code for nop here.

10: We reuse the code for nop here.

11: We use code 217 to represent swap_11, which exchanges the top two values on the pointer stack.

10.0 Aspects of JIT Code Interface

JIT-generated methods use only the PERC pointer and non-pointer stacks. All pointer information is stored on the pointer stack and all non-pointer information is stored on the non-pointer stack. The non-pointer activation frame is illustrated in FIG. 94. The pointer activation frame is identical except that there is no return address stored in the pointer activation frame.

Within a JIT-generated method, all local variables, including incoming and outgoing arguments are referenced at fixed offsets from the register that represents the corresponding stack pointer. There is no need for a frame pointer because the stack pointer remains constant throughout execution of the method.

Note that the JIT method's prologue subtracts a constant value from the stack pointer and the JIT method's epilogue adds the same constant value to the stack pointer.

When JIT-compiled methods invoke byte-code or native-code methods, the corresponding byte-code stub sets up the frame and stack pointers necessary for execution of the corresponding C routines. Additionally, the return address is removed from the non-pointer stack and stored temporarily in a C local variable within the stub procedure.

Within a JIT-compiled method, machine registers are partitioned so that certain registers are known to only contain base pointers and other machine registers are known to only contain non-pointers. An additional class of registers may contain derived pointers which refer to the internal fields of particular objects. Each derived-pointer register is always paired with a base-pointer register which is known to identify the starting address of the corresponding object. Otherwise, the derived-pointer register holds the NULL value.

During execution of JIT-compiled methods, the thread status is set to JIT_EXECUTION. This signals to the task dispatcher that the task can be preempted at any time.

The JIT compiler provides special translations of exception handling contexts, so that the equivalents of setjmp( ) and longjmp( ) are specialized for the local execution environment. Rather than saving and restoring all machine registers, only those registers that are actually live on entry into the exception handling context are saved and restored.

11.0 ROMizer

The ROMizer tool analyzes and verifies byte code and performs byte-code and constant-pool transformations described in the previous section. Additionally, the ROMizer tool supports standard compiler transformations designed to optimize the performance of executed code. These optimizations include in-lining of small and/or performance critical methods, relocation of loop-invariant code outside the loop, and constant folding (including elimination of redundant array subscript checking).

When transformed byte code is targeted to ROM, the invokeinterface instruction is replaced by invokeinterface_qrom.

The ROMizer also has the ability to translate byte code to native code, by applying the JIT compiler to the byte code prior to constructing the ROM load image. In performing these translations, additional optimizations are applied. These include global register allocation, optimal instruction selection, and pipeline scheduling.

The output of the ROMizer tool is a load file designed to be burned into a ROM. This load file is organized as follows:

| Field Name | Field Size | Description |
| --- | --- | --- |
| Object_Size | 32 bits | This represents the total number of words in the object region (Object_Region). |
| Relocatable_Map | (Object_Size/32) words (rounded up) | This field maintains 1 bit for each word of the object region. The bit is on if the corresponding word holds a non-null pointer and is off otherwise. All non-null pointers are assumed to point within the object region. The first word of the object region (Object_Region) is represented by bit 0x01 of the first word of the Relocatable_Map. |
| Class_Table | 32 bits | This field represents the offset within the object region (Object_Region) of the table that represents all of the classes defined by this object. |
| Object_Region | Object_Size words | This represents the ROM memory image. Each object in this memory region is provided with a standard garbage collection header (See Figure 2), including a Scan List pointer, Indirect Pointer, Activity Pointer, and Signature Pointer. In the ROM image, all pointers, including the pointers stored within object headers, are represented by offsets relative to the beginning of the Object_Region. All objects are initialized to belong to the 0 Activity. |

Several aspects regarding the organization of the load file's memory image deserve special attention:

1. All objects placed into the Object_Region are marked by setting their Scan List field to SCAN_END. This prevents on-the-fly write barrier enforcement from attempting to place these objects on the scan list.
2. All Indirect Pointers are initialized to refer to the object itself. This enables standard heap-access macros to work correctly when referring to ROM objects.
3. All byte codes are pre-transformed into the PERC extended instruction set and all references to the constant pool have already been resolved.
4. There are two configurations for the load file. One configuration is intended simply for preloading directly into RAM. The other configuration is intended for preloading into ROM.
   a. For ROM preloading, the representation of a class data structure is simply a template which will be copied into RAM when the system actually executes. Since the executing application code must be able to modify the class's static variables, the class representation's static variable pointer points to a signature (represented within the load file) which is used by the bootstrap "loader" to allocate the class's static variable structure.

b. For RAM preloading, the preloaded image is overwritten as necessary at run time. In this case, the class structure's static variables are set aside as part of the load file. Initialization is postponed until the load file is loaded.

5. The machine code that results from JIT compilation is stored within a PERC object whose signature is array of integer. All of the code for JIT-translated methods is stored in a single array of integer object.

6. If there are multiple constant strings, the ROMizer tool searches for common strings and eliminates redundancy by making multiple string objects refer to the same substring data. All string data is represented by a single array of character object.

An important consideration in the architecture of a large software system such as the PFERC virtual machine is the need to minimize the effort required to implement and maintain the various capabilities of the system. There are several innovations represented in the design of our ROMizer tool:

1. The code used in the implementation of the ROMizer tool to read in a Java class file, verify the validity of the byte code, and transform the byte code into the PERC instruction set is the exact same code that is used by the PERC implementation to support dynamic (on-the-fly) loading of new byte-code functionality into the PERC virtual machine.

2. The code used in the implementation of JIT compilation within the ROMizer tool is exactly the same code that is used to support JIT compilation of newly loaded byte-code functionality as byte-codes are loaded on the fly.

3. To obtain improved performance for dynamic execution of the ROMizer and JIT tools, the byte-code verifier, transformer, and JIT optimizer can be preloaded through the ROMizer program. During preload, the ROMizer optionally applies the JIT optimizer to the code.

What is claimed is:

1. A real-time virtual machine method (RTVMM) for implementing real-time systems and activities, the RTVMM comprising the steps:

implementing an O-OPL program that can run on computer systems of different designs, an O-OPL program being based on an object-oriented programming language (O-OPL) comprising object type declarations called classes, each class definition describing the variables that are associated with each object of the corresponding class and all of the operations called methods that can be applied to instantiated objects of the specified type, a "method" being a term of art describing the unit of procedural abstraction in an object-oriented programming system, an O-OPL program comprising one or more threads wherein the run-time stack for each thread is organized so as to allow accurate identification of type-tagged pointers contained on the stack without requiring type tag information to be updated each time the stack's content changes, the O-OPL being an extension of a high-level language (HLL) exemplified by Java, HLL being an extension of a low-level language (LLL) exemplified by C and C++, a thread being a term of art for an independently-executing task, an O-OPL program being represented at run time by either O-OPL byte codes or by native machine codes.

2. The RTVMM of claim 1 wherein an O-OPL program utilizes a pointer stack and a non-pointer stack.

3. The RTVMM of claim 1 wherein an O-OPL program comprises one or more classes represented in read-only memory, the methods thereof h aving been converted into O-OPL byte codes prior to run time.

4. The RTVMM of claim 1 wherein an O-OPL program comprises one or more classes represented in read-only memory, the methods thereof having been converted into native machine language prior to run time.

5. The RTVMM of claim 1 wherein a byte-code O-OPL method is an O-OPL method represented at run time by O-OPL byte codes, a byte-code O-OPL method being written in O-OPL, an O-OPL, method represented at run time by native machine codes being either a native O-OPL method or a native-translated O-OPL method, a native O-OPL method being written in LLL, a native-translated O-OPL method being written in HLL, the implementing step comprising the steps:

compiling the byte-code O-OPL methods into HLL byte codes and transforming the HLL byte codes into O-OPL byte codes;

compiling the native O-OPI, methods into native machine codes;

compiling the native-translated O-OPL methods into HLL byte codes and compiling HLL byte codes into native machine codes.

6. The RTVMM of claim 1 wherein a calling function is a native-translated O-O-OPL method and the called function is a byte-code method, a native-translated O-OPL method being an O-OPL method written using byte codes which are translated into native machine language at the time of execution, a byte-code method being a method written using O-OPL or HLL and translated into O-OPL, byte codes prior to execution, the implementing step comprising the steps:

providing each byte-code method with a stub procedure which honors the native-translated method execution protocol, the stub procedure switching from native-translated method to O-OPL byte code interpretation protocols and then invoking an O-OPL, interpreter.

7. The RTVMM of claim 6 wherein the stub procedure switches back to the native-translated O-OPL mode when the O-OPL, interpreter returns.

8. The RTVMM of claim 1 wherein a calling function is a native-translated O-OPL method and the called function is a native method, a native-translated O-OPL method being a method written using byte codes which are translated into native machine language at the time of execution, a native method being a method written in LLL, the implementing step comprising the steps:

providing each native method with a stub procedure which honors the native-translated method execution protocol, the stub procedure switching from native-translated method to LLL-code protocols and then invoking the native method.

9. The RTVMM of claim 8 wherein the stub procedure switches back to the native-translated O-OPL mode when the O-OPL interpreter returns.

10. The RTVMM of claim 1 wherein the implementing step comprises the step:

causing an application thread to periodically check whether the system desires to preempt the thread.

11. The RTVMM of claim 1 wherein the implementing step comprises the step:

causing an application thread that is to be preempted to provide notification as to when the thread is at a point where safe garbage collection can take place.

12. The RTVMM of claim 1 wherein one of the implemented threads is a garbage collection thread that operates asynchronously thereby resulting in the garbage collection thread being interleaved with other threads in arbitrary order, objects subject to garbage collection being either finalizable or non-finalizable, a finalizable object being subject to an action that is performed when the memory space allocated to the finalizable object is reclaimed by the garbage collection thread, the finalizing action being specified by including a non-empty finalizer method in the class definition, the garbage collection thread being able to distinguish a thread's pointer variables from the thread's non-pointer variables, preemption of a thread being allowed only if the thread is in a state identified as a preemption point, a thread being allowed to hold pointers in variables between preemption points that may not be visible to the garbage collection thread, pointer variables that may not be visible to the garbage collection thread being called fast pointers, pointer variables that are visible to the garbage collection thread being called slow pointers, each LLL function being identified as either preemptible or non-preemptible.

13. The RTVMM of claim 12 wherein the implementing step comprises the steps:

causing the values of essential fast pointers to be copied into slow pointers immediately prior to a preemption point of a preemptible thread. (5.0/4)

causing the values of essential fast pointers to be restored after preemption by causing the values of the slow pointers to be copied to the locations where the values of the fast pointers were previously stored.

14. The RTVMM of claim 12 wherein the implementing step comprises the steps:

causing the values of all of the essential fast pointers of a preemptible LLL function to be copied into slow pointers prior to calling the preemptible LLL function;

causing the values of the essential fast pointers to be restored when the called preemptible LLL function returns by causing the values of the slow pointers to be copied to the locations where the values of the fast pointers were previously stored.

15. The RTVMM of claim 12 wherein the implementing step comprises the steps:

providing a plurality of macros representing (1) an interface that permits the use of different garbage-collection techniques and (2) an implementation of a mostly-stationary garbage-collection technique.

16. The RTVMM of claim 12 wherein the implementing step comprises the step:

providing parameterized access to heap memory in order to facilitate the implementation of read and write barriers, heap memory being a region of memory wherein objects of arbitrary size can be allocated space to satisfy the dynamic memory needs of application programs, heap memory being subject to garbage collection.

17. The RTVMM of claim 16 wherein the implementing step comprises the step:

providing a macro that returns the value of a fast pointer in the heap given the identity of the pointer and its type.

18. The RTVMM of claim 16 wherein the implementing step comprises the step:

providing a macro that assigns a value from a fast pointer in heap memory given the identity of the pointer, its type, and the value.

19. The RTVMM of claim 16 wherein the implementing step comprises the step:

providing a macro that returns the value of a nonpointer in heap memory given the identity of the nonpointer and its type.

20. The RTVMM of claim 16 wherein the implementing step comprises the step:

providing a macro that assigns a value to a nonpointer in heap memory given the identity of the nonpointer, its type, and the value.

21. The RTVMM of claim 16 wherein the implementing step comprises the step:

providing direct access to stack data using LLL pointer indirection.

22. The RTVMM of claim 21 wherein the implementing step comprises the step:

representing stack pointers by LLL global variables declared as pointers.

23. The RTVMM of claim 12 wherein the implementing step comprises the step:

maintaining a finalizable list of finalizable objects that have not been finalized, a finalizable object being removed from the finalizable list after it has been finalized, the finalizable list of objects being linked through a "finalize link" field.

24. The RTVMM of claim 12 wherein the implementing step comprises the steps:

partitioning memory into at least three demi-spaces, at least one of the demi-spaces being a static space excluded from the garbage collection process;

designating two of the demi-spaces as to-space and from-space at the beginning of a garbage collection cycle, live objects residing in from-space subsequently being copied into to-space;

designating the remaining demi-spaces as mark-and-sweep spaces at the beginning of a garbage collection cycle, the mark-and-sweep spaces being garbage collected using a mark-and-sweep technique.

25. The RTVMM of claim 24 wherein the implementing step comprises the step:

including an "activity pointer" field for each object in memory, the "activity pointer" identifying the activity that was responsible for allocating the object, the "activity pointer" field containing a "null" value if the object was not allocated by a real-time activity.

26. The RTVMM of claim 25 wherein the implementing step comprises the step:

maintaining a free pool of space segments for to-space and for each mark-and-sweep sweep space, a free pool being organized as a plurality of doubly-linked lists, each linked list being a list of free space segments ranging in size from a lower value to an upper value, the size ranges for the plurality of linked lists being non-overlapping;

causing the "activity pointer" field to specify the size of a free space segment.

27. The RTVMM of claim 24 wherein the implementing step comprises the step:

including a "signature pointer" field for each object in memory, the "signature pointer" field containing a pointer to a structure that represents the internal organization of the O-OPL data within the object.

28. The RTVMM of claim 27 wherein the implementing step comprises the steps:

maintaining a free pool of space segments for to-space and for each mark-and-sweep space, a free pool being organized as a plurality of doubly-linked lists, each linked list being a list of free space segments ranging in size from a lower value to an upper value, the size ranges for the plurality of linked lists being non-overlapping;

causing the "signature pointer" field to be used as a backward link to the preceding segment.

29. The RTVMM of claim 24 wherein a garbage-collection cycle begins, the implementing step comprising the steps:

causing the non-empty mark-and-sweep space having the most available free space to be designated as the new from-space;

causing the old to-space to be designated as the new to-space if the allocated space within the new from-space is less than the free space available as a single contiguous region in the old to-space; otherwise, causing the old from-space to be designated as the new to-space.

30. The RTVMM of claim 24 wherein the implementing step comprises the step:

including a "scan list" field for each object in memory, the "scan list" field distinguishing marked and unmarked objects residing in a mark-and-sweep space but not on a free list, the "scan list" field for each object in a mark-and-sweep space having a "scan clear" value at the beginning of a garbage collection cycle, an object recognized as being a live object being placed on a list of recognized live objects, the "scan list" field for an object on the list of recognized live objects having either a "scan end" value denoting the last object on the list of recognized live objects or a value identifying the next object on the list of recognized live objects, the "scan list" field for an object residing on a free list within a mark-and-sweep space or to- space having the "scan free" value, the "scan list" field for an object residing in from-space which has been scheduled for copying into to-space being a pointer to the to-space copy, the "scan list" field otherwise being assigned the "scan clear" value, the "scan list" field for an object residing in to-space having the "scan clear" value at the beginning of a garbage collection cycle, a to-space object recognized as live during garbage collection being placed on a list of recognized live objects, the "scan list" field for a to-space object on the list of recognized live objects having a value identifying the next object on the list of recognized live objects, the "scan list" field for each object queued for copying into to-space having the "scan end" value denoting that the object is live.

31. The RTVMM of claim 24 wherein the implementing step comprises the steps:

providing a memory allocation budget for each real-time activity;

allocating memory from the memory allocation budget to an object associated with the real-time activity;

causing the garbage collection thread to credit the memory allocation budget of the real-time activity when the memory allocated to the object is reclaimed.

32. The RTVMM of claim 24 wherein a real-time activity has allocated memory to an object which is subject to finalization and the garbage collection thread endeavors to reclaim the allocated memory, the implementing step comprising the step:

causing the garbage collection thread to place the object on a list of the real-time activity's objects that are awaiting finalization.

33. The RTVMM of claim 24 wherein the implementing step comprises the step:

causing memory space to be allocated, memory space being preferably allocated in the mark-and-sweep space having the requisite space available and that is most full, memory space being allocated in to-space only if the allocation cannot be made in any of the mark-and-sweep sweep spaces.

34. The RTVMM of claim 24 wherein the implementing step comprises the steps:

causing a "finalize link" bit and a "finalize object" bit in an "activity pointer" field of a finalizable object to be set when space is allocated to the finalizable object, the "finalize link" bit being set indicating that the object has a "finalize link" field appended to the object, the "finalize object" bit being set indicating that the object needs to be finalized;

causing the "finalize object" bit to be cleared when a finalizable object has been finalized.

35. The RTVMM of claim 24 wherein a pointer is to be written into memory, the implementing step comprising the steps: causing the pointer to an object in from-space to be replaced by a pointer to the object's new address in to-space;

causing an object in mark-and-sweep space to which the pointer points to be marked if the object has not yet been marked.

36. The RTVMM of claim 24 wherein the implementing step comprises the steps:

causing the available memory in a newly-selected to-space to be divided into a new-object segment for allocation of memory to new objects and an old-object segment for receiving copies of live from-space objects, the old-object segment being equal to or larger than the allocated space in from-space, new objects being allocated space in sequence from the end of the new-object segment away from the old-object segment, old objects being copied in sequence from the end of the old-object segment away from the new-object segment;

causing the unallocated portions of the old-object segment and the new-object segment to be coalesced into a single contiguous segment of free memory at the end of a garbage collection cycle.

37. The RTVMM of claim 24 wherein, after to-space and from-space have been selected at the beginning of a garbage collection cycle, the implementing step comprises the steps:

causing the free pools of memory in the mark-and-sweep spaces and to-space to be linked together into a global free pool, the free pools of the mark-and-sweep spaces being linked in increasing order of amount of free memory, the free pool of to-space being linked to the mark-and-sweep space having the greatest amount of free memory, a request for a new memory allocation being satisfied by the first memory segment of sufficient size found by searching the global free pool according to the linking order.

38. The RTVMM of claim 24 wherein the implementing step comprises the steps:

maintaining a list of root pointers to live objects;

causing space for a copy of an object in to-space to be allocated if a root pointer to the object refers to from-space;

causing the from-space address of the object to be written in an "indirect pointer" field of the object's allocated space in to-space;

causing the root pointer to be replaced with the address of the object in to-space;

causing the to-space address of the object to be written into a "scan list" field of the object in from-space.

39. The RTVMM of claim 24 wherein the implementing step comprises the steps:

maintaining a list of root pointers to live objects;

causing an object to be marked if the root pointer to the object refers to a mark-and-sweep space or to-space and the object has not yet been marked, marking consisting of placing the object on a scan list.

40. The RTVMM of claim 24 wherein the marking and copying processes for a particular garbage collection cycle have been completed, the implementing step comprising the steps:

causing all objects needing finalization to be transferred from a list of finalizable objects to a finalizee list;

causing the transferred objects residing in mark-and-sweep space to be placed on a scan list;

causing the transferred objects residing in from-space to be placed on a copy list.

41. The RTVMM of claim 40 wherein the marking and copying processes for a particular garbage collection cycle have been completed, the implementing step comprising the steps:

causing an object from a list of finalizable objects to be transferred to a finalizee list if the object has not been marked or if the object is a from-space object that has not been copied into to-space, the object being placed on the copy list and space being allocated in to-space if the object resides in from-space, the object being marked by being placed on the scan list if the object resides in mark-and-sweep space.

42. The RTVMM of claim 41 wherein the implementing step comprises the step:

implementing the finalizee list by causing the address of the next finalizee on the activity's finalizee list to be placed in a "finalize link" field of a finalizee.

43. The RTVMM of claim 40 wherein the transfer of objects needing finalization on the list of finalizable objects to the finalizee list has been completed, the implementing step comprising the steps:

causing the objects on the copy list to be copied to to-space;

causing the objects on the scan list to be scanned, scanning consisting of tending each pointer contained within an object, tending being a term of art describing the garbage collection process of (1) examining a pointer and, if the object has not already been recognized as live, arranging for the referenced object to be subsequently scanned by placing the object on a scan list if it resides in a mark-and-sweep space or in to-space or by arranging for the object to be copied into to-space if it resides in from-space and (2) updating the pointer to refer to the object's new location if it has been queued for copying into to-space.

44. The RTVMM of claim 24 wherein the transfer of objects needing finalization from a list of finalizable objects to a finalizee list has been accomplished, the implementing step comprising the step:

causing each finalizee on the finalizee list to be transferred to the appropriate activity's finalizee list or onto an orphaned finalizee list.

45. The RTVMM of claim 44 wherein an activity's finalizee list is implemented by placing in an "activity pointer" field of a finalizee the address of the next finalizes on the activity's finalizee list.

46. The RTVMM of claim 44 wherein after transferring a finalizee on the finalizee list to the appropriate activity's finalizee list or onto an orphaned finalizee list, the implementing step comprises the step:

causing a "finalize link" bit in an "activity pointer" field of the object corresponding to the finalizee to be cleared, a cleared "finalize link" bit indicating that the object is no longer on the list of finalizable objects.

47. The RTVMM of claim 24 wherein the transfer of objects needing finalization from a list of finalizable objects to an activity's finalizee list or an orphaned finalizee list has been accomplished, the implementing step comprising the steps:

causing the mark-and-sweep spaces and to-space to be swept and identifying each object that is not marked, that is not on a free list, and that is a "hashlock object";

causing the garbage collection thread to copy the value of a "hash value" field of the "hashlock object" onto a list of recycled hash values if the list is not full; otherwise:

causing the garbage collection thread to (1) make the "hashlock object" live, (2) change a "signature" field in the "hashlock object" to represent a "hashcache object", (3) add the "hashcache object" to the list of recycled hash values, and (4) copy the value of the "hash value" field of the original "hashlock object" onto a list of recycled hash values.

48. The RTVMM of claim 24 wherein the transfer of objects needing finalization from a list of finalizable objects to an activity's finalizee list or an orphaned finalizee list has been accomplished, the implementing step comprising the steps:

causing from-space to be examined and each object to be identified that was not copied into to-space and that is a "hashlock object" with a hash value that needs to be reclaimed;

causing the garbage collection thread to copy the value of a "hash value" field of the "hashlock object" into a list of recycled hash values if the list is not full; otherwise:

causing the garbage collection thread to (1) make the "hashlock object" live, (2) change a "signature" field in the "hashlock object" to represent a "hashcache object", (3) add the "hashcache object" to the list of recycled hash values, and (4) copy the value of the "hash value" field of the original "hashlock object" onto a list of recycled hash values;

causing zeros to be written into all of from-space.

49. The RTVMM of claim 12 wherein the implementing step comprises the step:

designating portions of memory as a to-space and zero or more mark-and-sweep spaces;

maintaining a free pool of space segments for to-space and for each mark-and-sweep space, a free pool being organized as a plurality of linked lists, each linked list being a list of free space segments ranging in size from a lower value to an upper value, the size ranges for the plurality of linked lists being non-overlapping.

50. The RTVMM of claim 49 wherein an object of specified size is to be allocated space in a demi-space by an allocation routine, the allocation routine comprising the steps:

causing the linked list with the smallest size range having space segments equal to or greater than the specified size of the object to be selected from the free pool of the demi-space;

causing a portion of the space segment equal in size to the object to be allocated to the object;

causing the unallocated portion of the space segment to be returned to the appropriate linked list.

51. The RTVMM of claim 12 wherein the implementing step comprises the step:

designating portions of memory as a to-space, from-space, and zero or more mark-and-sweep spaces;

including an "indirect pointer" field for each object in memory, the "indirect pointer" field containing a pointer to the location of the currently valid copy of the data that corresponds to the object, the pointer pointing to the object itself for objects in a mark-and-sweep space, the pointer pointing to the location of the object that currently represents the object's contents for objects in to-space and from-space.

52. The RTVMM of claim 51 wherein the implementing step comprises the steps:

maintaining a free pool of space segments for to-space and for each mark-and-sweep space, a free pool being organized as a plurality of doubly-linked lists, each linked list being a list of free space segments ranging in size from a lower value to an upper value, the size ranges for the plurality of linked lists being non-overlapping;

causing the "indirect pointer" field to be used as a forward link to the succeeding segment.

53. The RTVMM of claim 12 wherein the implementing step comprises the step:

including an "activity pointer" field for each object in memory, the "activity pointer" identifying the real-time activity object that was responsible for allocation of the object, the "activity pointer" field containing a "null" value if the object was not allocated by a real-time activity;

maintaining a finalizees list of objects waiting to be finalized for each real-time activity, the objects on the finalizees list being linked through the "activity pointer" field;

maintaining a list of the headers of the finalizees lists, the pointer "finalizees" being a root pointer to the headers list.

54. The RTVMM of claim 53 wherein the implementing step comprises the step:

implementing a finalizer thread that operates in the background and is responsible for incrementally executing the finalizer methods associated with finalizee objects reachable from the "finalizees" pointer.

55. The RTVMM of claim 54 wherein the finalizer thread comprises the steps:

causing a finalizer method associated with a finalizee object to be executed;

causing the finalizee object to be removed from the associated finalizee list;

causing the "activity pointer" field of the finalizee object to be overwritten with a reference to the allocating object;

causing a "finalize object" bit in the "activity pointer" field of the finalizee object to be cleared indicating that the object has been finalized.

56. The RTVMM of claim 53 wherein the implementing step comprises the step:

implementing a finalizer thread that is part of a real-time activity and is responsible for incrementally executing the finalizer methods associated with finalizee objects associated with the real-time activity and reachable from the "finalizees" pointer.

57. The RTVMM of claim 56 wherein the finalizer thread comprises the steps:

causing a finalizer method associated with a finalizee object to be executed;

causing the finalizee object to be removed from the associated finalizee list;

causing the "activity pointer" field of the finalizee object to be overwritten with a reference to the allocating object;

causing a "finalize object" bit in the "activity pointer" field of the finalizee object to be cleared indicating that the object has been finalized.

58. The RTVMM of claim 53 wherein the implementing step of claim 1 comprises the steps:

causing memory space to be allocated to a finalizee list head object when an object associated with a particular activity and requiring finalization is encountered;

causing a finalizee list head pointer associated with the activity to be overwritten with a pointer to the finalizee list head object;

causing the finalizee list head object to be destroyed when the finalizee list becomes empty and overwriting the finalizee list head pointer with the "null" value.

59. The RTVMM of claim 1 wherein each object has a "lock" field initialized to a "null" value, the implementing step comprising the steps:

causing a "hashlock object" to be allocated memory space if the "lock" field of the object contains a "null" value;

causing the next available hash value to be identified;

causing the "hash value" field of the "hashlock object" to be initialized to the next available hash value;

causing the "lock" field of the object to be initialized to refer to the newly-allocated "hashlock object".

60. The RTVMM of claim 59 wherein the implementing step comprises the step:

causing the "hash value" field of the "hashlock object" to be overwritten to the next available hash value if the "lock" field of the object does not have a "null" value and if the "hash value" field has the value zero.

61. The RTVMM of claim 59 wherein one of the implemented threads is a garbage collection thread the implementing step comprising the steps:

maintaining a list of available hash values consisting of previously assigned hash values for which the corresponding objects have been reclaimed by the garbage collection thread;

causing one of the hash values on the list of available hash values to be designated as the next available hash value to be assigned to a "hash object" if the list of available hash values is non-empty;

causing a static counter to be incremented if the list of available hash values is empty and causing the new counter value to be designated as the next available hash value to be assigned to a "hash object".

62. The RTVMM of claim 1 wherein each object has a "lock" field initialized to a "null" value, the implementing step comprising the steps:

causing a "hashlock object" for each object needing either a lock or a hash value to be allocated memory space and initialized, the "hashlock object" having a "hash value" field;

causing the address of the "hashlock object" to be written into the "lock" field of the object;

causing the hash value of an object to be retrieved by reading the "hash value" field of the associated "hashlock object".

63. The RTVMM of claim 62 wherein a monitor object is to be accessed and a "lock" field of the monitor object has a "null" value, the implementing step comprising the steps:

causing memory space to be allocated for a "hashlock object";

causing a "count" field of the "hashlock object" to be initialized to 1;

causing a "u-owner" field of the "hashlock object" to be set to represent the current thread;

causing access to be granted to the monitor object.

64. The RTVMM of claim 62 wherein a monitor object is to be accessed and a "lock" field of the monitor does not have a "null" value thereby indicating the existence of a "hashlock object", the implementing step comprising the steps:

causing a "count" field of the "hashlock object" to be incremented;

causing a "u-owner" field of the "hashlock object" to be set to represent the current thread;

causing access to be granted to the monitor object; provided the "count" field is 0 or the "u-owner" field refers to the currently-executing thread; otherwise:

causing the currently-executing thread to be placed on a waiting list queue;

causing the execution of the currently-executing thread to be blocked until access can be granted to the monitor object.

65. The RTVMM of claim 62 wherein threads are assigned priorities and a higher-priority thread's access to an object is being blocked by a lower-priority thread, the implementing step comprising the step:

causing the priority of the higher-priority thread to be assigned to the lower-priority thread until the lower-priority thread releases its lock on the object.

66. The RTVMM of claim 62 wherein a thread requests access to a monitor object be terminated, the implementing step comprising the steps:

causing verification that a "u-owner" field of the "hashlock" object associated with the monitor object represents the thread;

causing a "count" field in the "hashlock" object to be decremented; if the new value in the "count" field is zero, then:

causing the "u-owner" field of the "hashlock" object to be set to represent the highest-priority member of a waiting list for the monitor object;

causing the "count" field of the "hashlock" object to be set to 1;

causing the removal of the highest-priority member of the waiting list for the monitor object;

provided the waiting list is not empty; otherwise:

causing the "u-owner" field of the "hashlock" object to be set to a "null" value.

67. The RTVMM of claim 62 wherein a thread's access to a monitor object has been terminated and a "hash value" field of a "hashlock object" associated with the monitor object is 0, the implementing step comprising the steps:

causing a "lock" field in the monitor object to be set to a "null" value;

causing the placement of the "hashlock object" on a list of available "hashlock objects" to be used in satisfying new requests for "hashlock objects".

68. The RTVMM of claim 67 wherein the placing step is accomplished by the step:

causing a "u-next" field in the "hashlock object" to be set to point to the next "hashlock object" on the list of "hashlock objects".

69. The RTVMM of claim 1 wherein the implementing step comprises the steps:

creating a normally-sleeping thread called a thread dispatcher;

causing the thread dispatcher to be awakened if an interrupt arrives from an alarm timer that has determined that a specified time period has expired, the thread dispatcher then suspending execution of the currently-executing thread;

causing the thread dispatcher to be awakened if an interrupt arrives indicating the necessity of preempting the currently-executing thread so that a sporadic task can be executed;

causing the thread dispatcher to be awakened if the currently-executing thread blocks on an I/O request, the thread dispatcher then suspending execution of the currently-executing thread.

70. The RTVMM of claim 69 wherein the implementing step comprises the step:

creating a watchdog thread that sends an interrupt to the thread dispatcher when a thread that is scheduled for execution blocks.

71. The RTVMM of claim 1 wherein the implementing step comprises the step:

creating a thread called a thread dispatcher which makes only one application task ready to run at a time in accordance with the priorities of the application tasks waiting to run.

72. The RTVMM of claim 1 wherein the implementing step comprises the step:

causing symbolic references to be replaced with integer indices and direct pointer references when a program is loaded into a computer system.

73. The RTVMM of claim 1 wherein the implementing step comprises the step:

causing all operands supplied to each byte-code instruction to be of the appropriate type prior to execution of a program.

74. The RTVMM of claim 1 wherein an O-OPL byte-code loader is used to load a program into a computer system, the implementing step comprises the step:

causing each byte code of an HLL program to be translated into an O-OPL byte code.

75. The RTVMM of claim 1 wherein the implementing step comprises the step:

causing symbolic values for constants to be replaced with the actual values when a class is loaded into a computer.

76. The RTVMM of claim 1 wherein there is a slow variant and a fast variant of every byte code instruction, a program to be loaded into a computer consisting of one or more slow variants, the implementing step comprising the step:

causing all byte codes corresponding to each method to be examined;

causing the slow variants to be replaced by the quick variants when a class is loaded into a computer.

77. The RTVMM of claim 1 wherein an O-OPL byte-code loader is used to load an HLL byte-code program into a computer system, the implementing step comprises the step:

causing each byte code to be examined when a class is loaded to determine whether it operates on pointer or non-pointer data;

causing pointers to be pushed onto and popped from a pointer stack;

causing non-pointers to be pushed onto and popped from a non-pointer stack.

78. The RTVMM of claim 77 wherein the implementing step comprises the step:

causing the O-OPL byte-code loader to remap the offsets for all local-variable operations.

79. The RTVMM of claim 1 wherein the implementing step comprises the step:

utilizing only O-OPL pointer and non-pointer stacks in executing methods compiled by a JIT compiler, JIT standing for "just in time" and denoting a process for translating HLL, byte codes to native machine language codes on the fly, just in time for its execution, the translation of byte codes to native codes being a form of JIT compiling.

80. The RTVMM of claim 79 wherein a method compiled by a JIT compiler invokes a byte-code or native-code method, the implementing step comprises the step:

causing the frame and stack pointers necessary for the execution of the corresponding LLL routines to be set up;

causing the return address to be removed from the non-pointer stack and stored temporarily in an LLL local variable.

81. The RTVMM of claim 79 wherein a method of a thread is being executed, the method having been compiled by a JIT compiler, the implementing step comprising the step:

causing the status of the thread to be set to a value indicating that the thread can be preempted at any time.

82. The RTVMM of claim 79 wherein the implementing step comprises the step:

causing the JIT compiler to provide special translations of exception handling contexts so that only the contents of those registers are saved and restored that are actually live on entry into the exception handling context.

83. The RTVMM of claim 1 wherein the implementing step comprises the steps:

creating a thread called a thread dispatcher;

creating a watchdog thread that sends an interrupt to the thread dispatcher when a thread that is scheduled for execution blocks, the thread dispatcher then scheduling another thread for execution.

84. The RTVMM of claim 1 wherein each thread maintains its own versions of global variables "pointer stack pointer" (psp), "pointer stack frame pointer" (pfp), "non-pointer stack pointer" (npsp) and "non-pointer stack frame pointer" (npfp), the implementing step comprising the steps:

creating a thread called a thread dispatcher, the thread dispatcher saving psp, pfp, npsp, and npfp into the state variables of an executing thread when the executing thread is preempted, the preempted thread restoring these state variables when the preempted thread resumes execution.

85. The RTVMM of claim 1 wherein the implementing step includes providing a ROMizer tool which produces a load file appropriate for ROM storage, the ROMizer tool comprising the steps:

analyzing and verifying byte code;

performing byte code and constant-pool transformations;

supporting standard compiler transformations designed to optimize the performance of executed code.

86. The RTVMM of claim 85 wherein the implementing step relating to the load file includes the step:

causing an object placed into the object region to be marked by setting a "scan list" field of the object to SCAN-END.

87. The RTVMM of claim 85 wherein the implementing step relating to the load file includes the step:

causing the "indirect pointer" field of each object to refer to itself.

88. The RTVMM of claim 85 wherein the implementing step relating to the load file includes the steps:

causing all byte codes to be pre-transformed into an O-OPL instruction set;

causing all references to the constant pool to have been resolved.

89. The RTVMM of claim 85 wherein the implementing step relating to the load file includes the steps:

causing a search to be made for common strings;

causing multiple—string objects to refer to the same substring data.

* * * * *